US009684211B2

(12) United States Patent
Itou et al.

(10) Patent No.: US 9,684,211 B2
(45) Date of Patent: Jun. 20, 2017

(54) LIQUID CRYSTAL DISPLAY DEVICE

(71) Applicant: JAPAN DISPLAY INC, Tokyo (JP)

(72) Inventors: Osamu Itou, Hitachi (JP); Takato Hiratsuka, Chiba (JP)

(73) Assignee: JAPAN DISPLAY INC, Tokyo (JP)

( * ) Notice: Subject to any disclaimer, the term of this patent is extended or adjusted under 35 U.S.C. 154(b) by 0 days.

(21) Appl. No.: 15/057,799

(22) Filed: Mar. 1, 2016

(65) Prior Publication Data

US 2016/0178975 A1    Jun. 23, 2016

Related U.S. Application Data

(62) Division of application No. 13/547,504, filed on Jul. 12, 2012, now abandoned.

(30) Foreign Application Priority Data

Jul. 13, 2011    (JP) .................. 2011-154440

(51) Int. Cl.
*G02F 1/1339* (2006.01)
*G02F 1/1343* (2006.01)
*G02F 1/1333* (2006.01)
*G02F 1/1337* (2006.01)
*G02F 1/1335* (2006.01)

(52) U.S. Cl.
CPC .... *G02F 1/134336* (2013.01); *G02F 1/13394* (2013.01); *G02F 1/133345* (2013.01); *G02F 1/133514* (2013.01); *G02F 1/133707* (2013.01); *G02F 1/133377* (2013.01); *G02F 2001/133357* (2013.01)

(58) Field of Classification Search
CPC combination set(s) only.
See application file for complete search history.

(56) References Cited

U.S. PATENT DOCUMENTS

| 2004/0227891 | A1 | 11/2004 | Hirota |
| 2004/0263749 | A1 | 12/2004 | Jeong et al. |
| 2006/0215100 | A1 | 9/2006 | Ito |

(Continued)

FOREIGN PATENT DOCUMENTS

| CN | 1527113 A | 9/2004 |
| CN | 1837910 A | 9/2006 |
| CN | 1892328 A | 1/2007 |

(Continued)

OTHER PUBLICATIONS

Office Action in connection with corresponding Chinese Patent Application No. 201210246341.8, mailed Sep. 1, 2014.

(Continued)

*Primary Examiner* — Wen-Ying P Chen
(74) *Attorney, Agent, or Firm* — Typha IP LLC

(57) ABSTRACT

A liquid crystal display device having a second substrate and a first substrate that is placed so as to face the above-described second substrate with pixel regions aligned in a matrix is provided with: protrusions that are formed on pixel boarders and protrude from the second substrate on the liquid crystal side; first electrodes made of sidewall electrodes formed on sidewalls of protrusions and a lower end side electrode extending from the sidewall electrodes on the bottom side; and second electrodes made of a first linear electrode formed within a pixel region and a second linear electrode that is formed on the second substrate and faces the first linear electrode.

11 Claims, 44 Drawing Sheets

(56) References Cited

U.S. PATENT DOCUMENTS

2006/0290868 A1  12/2006  Cho
2012/0257156 A1  10/2012  Hiratsuka et al.

FOREIGN PATENT DOCUMENTS

| JP | H09-258265 A | 10/1997 |
|---|---|---|
| JP | H11-258624 A | 9/1999 |
| KR | 10-2004-0091184 A | 10/2004 |
| KR | 10-2004-0098545 A | 11/2004 |
| TW | 200416462 A | 9/2004 |

OTHER PUBLICATIONS

Office Action dated on Jan. 30, 2015 regarding a counterpart Taiwanese patent application No. 101125194.

LIQUID CRYSTAL DISPLAY DEVICE

CROSS-REFERENCE TO RELATED APPLICATION

This application is a divisional application of U.S. patent Ser. No. 13/547,504, filed on Jul. 12, 2012, which claims priority from Japanese Patent Application JP2011-154440 filed on Jul. 13, 2011, the contents of which are hereby incorporated into this application by reference.

BACKGROUND OF THE INVENTION (1) Field of the Invention

The present invention relates to a liquid crystal display device, and in particular, to an in-plane switching mode liquid crystal display device where an electrical field is applied parallel to the surface of the substrates.

(2) Description of the Related Art

In in-plane switching (IPS) mode liquid crystal display devices, liquid crystal molecules are aligned parallel to the surface of the panel and an electrical field (lateral electrical field) is applied parallel to the surface of the panel so that the liquid crystal molecules rotate by 90° in the plane. In such IPS mode liquid crystal display devices, a common electrode is formed on the first substrate where video signal lines (drain lines), scan signal lines (gate lines), thin film transistors and pixel electrodes are formed, and thus, the liquid crystal layer is operated through an electrical field in the plane of the first substrate, which is generated by the difference in the voltages applied to the pixel electrodes and the common electrode. In IPS mode liquid crystal display devices having this structure, pixel electrodes in linear form are formed so as to overlap the common electrode in sheet form of a transparent conductive film in a layer above the common electrode with an insulating film in between. As a result, liquid crystal molecules incline relative to the surface of the panel instead of being parallel thereto in the layer above the electrodes in linear form and in the portions between adjacent electrodes in linear form due to the electrical field generated in the direction of the normal of the first substrate, and thus, it is known that this causes the efficiency of the display mode to lower.

An example of a method for increasing this efficiency of the display mode is used in the liquid crystal display device in JP9-258265A. This liquid crystal display device has such a structure that protrusions are formed of an interlayer insulating film on the first substrate where thin film transistors are formed on the liquid crystal side, and a pixel electrode and a common electrode (counter electrode) are formed for each pixel so as to cover the surface of the protrusions. In particular, the structure provides protrusions along a pair of sides of each pixel that face each other and at the center between them with conductive films covering the protrusions along the pair of sides as pixel electrodes and with a conductive film covering the protrusion at the center as being a common electrode. Furthermore, the structure provides video signal lines in a layer beneath the pixel electrodes, that is to say, in a layer beneath the interlayer insulating film on which the pixel electrodes are formed.

SUMMARY OF THE INVENTION

In the mode where a lateral electrical field is applied parallel to the plane of the first substrate through the liquid crystal layer between the pixel electrodes and the common electrodes that protrude into the liquid crystal layer, as in JP9-258265A, an ideal lateral electrical field can be applied to the liquid crystal layer. However, the alignment of liquid crystal cannot be controlled in the places of the pixel electrodes, the common electrodes and the vicinity thereof, and thus, it is known that the aperture ratio is low. As a result, conventional liquid crystal display devices have such a structure that the pixel electrodes and the common electrodes which protrude into the liquid crystal layer are provided so as to overlap the light blocking film, such as a black matrix formed in the end portions of the pixels.

In the liquid crystal display devices having this structure, however, the pixel electrodes in the adjacent pixels are proximate to the end portions of a pixel, and therefore, there is an electrical field distribution in and around the pixel electrode due to the difference in the potential between a pixel and its adjacent pixels. This difference in the potential becomes maximum when white is displayed through the driving for inverting the display pixel by pixel, and in this case, there is a concern that the efficiency in the display mode for white display may lower due to the lack of balance in the distribution of the lateral electrical field. Likewise, during the driving for inverting the display pixel by pixel when a pixel displays black and its adjacent pixels display white, the brightness for displaying black increases, that is to say, the transmittance increases at the time when black is displayed, and therefore, there is a concern that the contrast ratio may lower.

In another structure for reducing the area that pixel electrodes occupy in the area for pixels, protrusions are formed ranging from adjacent pixels and pixel electrodes are formed on the sidewalls of the protrusions so as to correspond to the respective pixels. In this case, pixel electrodes for different pixels (adjacent pixels) are formed on the sidewalls of each protrusion so as to face each other with the protrusion in between, and therefore, the pixel electrodes in the adjacent pixels are located in further proximity, and thus, a resolution for the above-described problem is urgently desired.

The present invention is provided in view of these problems, and an object of the present invention is to provide a liquid crystal display device where the efficiency in the display mode can be made high even in the case where electrodes are formed so as to stand in a liquid crystal layer.

(1) In order to solve the above-described problems, the present invention provides a liquid crystal display device, having: a second substrate having scan signal lines which run in an X direction and are aligned in a Y direction and video signal lines which run in the Y direction and are aligned in the X direction; and a first substrate that is provided so as to face the above-described second substrate with a liquid crystal layer in between, with pixel regions between the above-described scan signal lines and between the above-described video signal lines being arranged in a matrix, wherein the liquid crystal display device includes: protrusions formed in borders between adjacent pixels and protruding from the above-described second substrate on the liquid crystal side; first electrodes made of sidewall electrodes formed on sidewalls of protrusions, and lower end side electrodes which extend from the above-described sidewall electrodes on bottoms of the protrusions and run along the above-described second substrate on the liquid crystal side, each of the above-described first electrodes being made of at least a pair of sidewall electrodes formed along sides that face each other with a pixel region in between and a lower end side electrode located between the sidewall electrodes; and second electrodes made of first linear electrodes which are formed within the above-described pixel regions on the above-described first substrate side and run in the direction in which the above-described first electrodes run, and second linear electrodes which are formed within the above-described pixel regions on the above-described second substrate side and run so as to face the above-described first linear electrodes with the above-described liquid crystal layer in between, and the above-described pixel regions are made of at least first pixel regions where the above-described first electrodes and the above-described second electrodes run in a first direction and second pixel regions where the above-described first electrodes and the above-described second electrodes run in a second direction.

(2) In order to solve the above-described problems, the present invention provides a liquid crystal display device, having: a second substrate having scan signal lines which run in an X direction and are aligned in a Y direction and video signal lines which run in the Y direction and are aligned in the X direction; and a first substrate that is provided so as to face the above-described second substrate with a liquid crystal layer in between, with pixel regions between the above-described scan signal lines and between the above-described video signal lines being arranged in a matrix, wherein the liquid crystal display device includes: protrusions formed in borders between adjacent pixels and protruding from the above-described second substrate on the liquid crystal side; first electrodes made of sidewall electrodes formed on sidewalls of protrusions, and lower end side electrodes which extend from the above-described sidewall electrodes on bottoms of the protrusions and run along the above-described second substrate on the liquid crystal side, each of the above-described first electrodes being made of at least a pair of sidewall electrodes formed along sides that face each other with a pixel region in between and a lower end side electrode located between the sidewall electrodes; and second electrodes made of first linear electrodes which are formed within the above-described pixel regions on the above-described first substrate side and run in the direction in which the above-described first electrodes run, and second linear electrodes which are formed within the above-described pixel regions on the above-described second substrate side and run so as to face the above-described first linear electrodes with the above-described liquid crystal layer in between, and the above-described first electrodes that reach from a lower side portion on the above-described second substrate side on which the above-described sidewall electrodes are formed to an upper side portion on the above-described first substrate side have a height that is greater than a thickness of the above-described liquid crystal layer in the pixel region sandwiched by the above-described first electrodes.

(3) In order to solve the above-described problems, the present invention provides a liquid crystal display device, having: a second substrate having scan signal lines which run in an X direction and are aligned in a Y direction and video signal lines which run in the Y direction and are aligned in the X direction; and a first substrate that is provided so as to face the above-described second substrate with a liquid crystal layer in between, with pixel regions between the above-described scan signal lines and between the above-described video signal lines being arranged in a matrix, wherein the liquid crystal display device includes: protrusions formed in borders between adjacent pixels and protruding from the above-described second substrate on the liquid crystal side; first electrodes made of sidewall electrodes formed on sidewalls of protrusions, and lower end side electrodes which extend from the above-described sidewall electrodes on bottoms of the protrusions and run along the above-described second substrate on the liquid crystal side, each of the above-described first electrodes being made of at least a pair of sidewall electrodes formed along sides that face each other with a pixel region in between and a lower end side electrode located between the sidewall electrodes; second electrodes made of first linear electrodes which are formed within the above-described pixel regions on the above-described first substrate side and run in the direction in which the above-described first electrodes run, and second linear electrodes which are formed within the above-described pixel regions on the above-described second substrate side and run so as to face the above-described first linear electrodes with the above-described liquid crystal layer in between; and third electrodes formed in a layer beneath the above-described lower end side electrodes so as to at least partially overlap a lower end side electrode with an insulating film in between, and the above-described third electrodes and the above-described first electrodes are electrically connected to each other.

(4) In order to solve the above-described problems, the present invention provides a liquid crystal display device, having: a second substrate having scan signal lines which run in an X direction and are aligned in a Y direction and video signal lines which run in the Y direction and are aligned in the X direction; and a first substrate that is provided so as to face the above-described second substrate with a liquid crystal layer in between, with pixel regions between the above-described scan signal lines and between the above-described video signal lines being arranged in a matrix, wherein the liquid crystal display device includes: protrusions formed in borders between adjacent pixels and protruding from the above-described second substrate on the liquid crystal side; first electrodes made of sidewall electrodes formed on sidewalls of protrusions, and lower end side electrodes which extend from the above-described sidewall electrodes on bottoms of the protrusions and run along the above-described second substrate on the liquid crystal side, each of the above-described first electrodes being made of at least a pair of sidewall electrodes formed along sides that face each other with a pixel region in between and a lower end side electrode located between the sidewall electrodes; second electrodes made of first linear electrodes which are formed within the above-described pixel regions on the above-described first substrate side and run in the direction in which the above-described first electrodes run, and second linear electrodes which are formed within the above-described pixel regions on the above-described second substrate side and run so as to face the above-described first linear electrodes with the above-described liquid crystal layer in between; and fourth electrodes formed on the above-described first substrate and placed so as to overlap the above-described first electrodes as viewed from above, and the same signal is supplied to the above-described fourth electrodes and the above-described second electrodes.

According to the present invention, the efficiency in the display mode can be increased even in the case where electrodes are formed so as to stand in the liquid crystal layer.

The other effects of the present invention will be clarified from the description of the entirety of the specification.

DESCRIPTION OF THE EMBODIMENTS

In the following, embodiments of the present invention are described in reference to the drawings. In the following descriptions, same symbols are attached to the same components, and the descriptions thereof are not repeated. X, Y and Z indicate the X axis, the Y axis and the Z axis, respectively.

First Embodiment

Entire Structure

Figure 1:
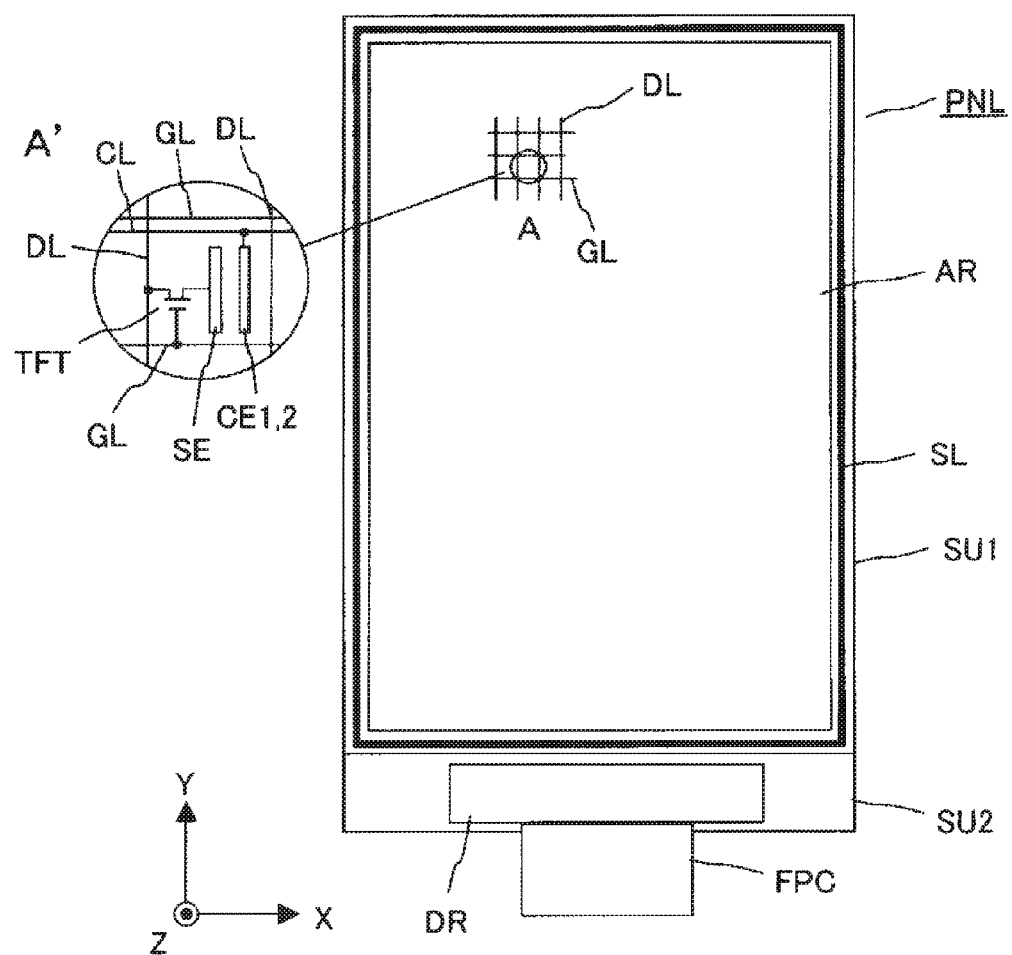
FIG. 1 is a diagram for illustrating the entire structure of the liquid crystal display device according to the first embodiment of the present invention.

FIG. 1 is a diagram for illustrating the entire structure of the liquid crystal display device according to the first embodiment of the present invention. In the following, the entire structure of the liquid crystal display device according to the first embodiment is described in reference to FIG. 1. In the present specification, the transmittance, excluding the effects of absorption by color filters CF, polarizing plates POL1, POL2 and the like and the effects of the aperture ratio, is regarded as the efficiency in the display mode. Accordingly, the efficiency in the display mode is 100% in the case where the direction of the oscillation of linearly polarized light emitted from the polarizing plate POL1 on the backlight unit side is rotated by 90° when it enters into the polarizing plate POL2 on the display side.

As shown in FIG. 1, the liquid crystal display device according to the first embodiment has a liquid crystal display panel PNL that is formed of: a first substrate SU1 where color filters (color layer), which face a second substrate SU2, and a light blocking layer, which is referred to as black matrix, are formed; the second substrate on which all pixel electrodes (first electrodes) SE, which are pixel electrodes in wall form, and thin film transistors TFT are formed; and a liquid crystal layer sandwiched between the first substrate SU1 and the second substrate SU2. The liquid crystal display device is formed by combining the liquid crystal display panel PNL and a backlight unit (backlight device), not shown, which works as a light source for the liquid crystal display panel PNL. The first substrate SU1 and the second substrate SU2 are secured to each other using a sealing material SL applied in the periphery portion of the first substrate in annular form, and this structure allows liquid crystal to be sealed in the sealing material SL. In the liquid crystal display device according to the first embodiment, the region where display pixels (hereinafter simply referred to as pixels) are formed within the region where liquid crystal is sealed works as a display region AR. Accordingly, the region where no pixels are formed and which does not relate to display does not work as a display region AR even within the region where liquid crystal is sealed.

The first substrate SU1 has an area smaller than that of the second substrate SU2 so that a side portion of the second substrate SU2 on the bottom side in the figure is exposed. A driving circuit DR formed of a semiconductor chip is mounted on this side portion of the second substrate SU2. This driving circuit DR drives the pixels arranged on the display region AR. In the following description, the word "liquid crystal display device" may be used for the liquid crystal display panel PNL. In addition, well-known glass substrates are generally used as the bases of the first substrate SU1 and the second substrate SU2, but transparent insulating substrates made of a resin may be used instead.

In the liquid crystal display device according to the first embodiment, scan signal lines (gate lines) GL are formed within the display region AR on the surface of the second substrate SU2 on the liquid crystal side so as to run in the X direction and be aligned in the Y direction in FIG. 1 so that scan signals can be supplied from the driving circuit DR. In addition, video signal lines (drain lines) DL are formed so as to run in the Y direction and be aligned in the X direction in FIG. 1 so that video signals (gradation signals) can be supplied from the driving circuit. Pixels are formed in the regions sandwiched between two adjacent drain lines DL and between two adjacent gate lines GL, and thus, a number of pixels are arranged in a matrix within the display region AR along the drain lines DL and the gate lines GL.

As shown in the diagram A' showing an equivalent circuit within a circle A in FIG. 1, each pixel has a thin film transistor TFT that is driven so as to be turned on/off by a scan signal from the gate line GL, a wall pixel electrode SE to which a video signal from the drain line DL is supplied through this thin film transistor TFT when turned on, and a first common electrode (first linear electrode) CE1 and a second common electrode (second linear electrode) CE2 to which a common signal having such a potential as to be used as a reference for the potential of the video signal is supplied through the common line CL. Though in the diagram A' showing an equivalent circuit within a circle A in FIG. 1 the first and second common electrodes CE1 and CE2 as well as the wall pixel electrode SE are schematically shown in linear form, the structures of the first and second common electrodes CE1 and CE2 as well as the wall pixel electrode SE in the first embodiment are described in detail below. Though the thin film transistors TFT in the first embodiment are driven in such a manner that the drain electrode and the source electrode are switched due to the application of the bias, the electrodes connected to drain lines DL are referred to as drain electrodes, and the electrodes connected to the wall pixel electrodes SE are referred to as source electrodes for the purpose of convenience in the present specification.

An electrical field having a component parallel to the main surface of the second substrate SU2 is generated between the wall pixel electrode SE and the first and second common electrodes CE1 and CE2 so that the liquid crystal molecules can be driven by this electrical field. Such liquid crystal display devices are known as those where a so-called wide view angle display is possible and are referred to as IPS mode or lateral electrical field mode due to the specificity of the application of an electrical field to the liquid crystal. In addition, in the liquid crystal display devices having this structure, light transmittance is minimum (black display) in the case where no electrical field is applied to the liquid crystal, and thus, the display is in the normally black mode where the light transmittance increases by applying an electrical field.

The drain lines DL and the gate lines GL respectively run beyond the sealing material SL in an end portion so as to be connected to the driving circuit DR for generating a drive signal, such as a video signal or a scan signal, on the basis of an input signal inputted through the flexible printed circuit board FPC from an external system. Though the liquid crystal display device according to the first embodiment has such a structure that the driving circuit DR is formed of a semiconductor chip, which is mounted on the second substrate SU2, either or both of the video signal driving circuit for outputting a video signal and the scan signal driving circuit for outputting a scan signal may be mounted on the flexible printed circuit board FPC in a tape carrier method or in a COF (chip on film) method so as to be connected to the second substrate SU2 in the structure.

<Detailed Structure of a Pixel>

Figure 2:
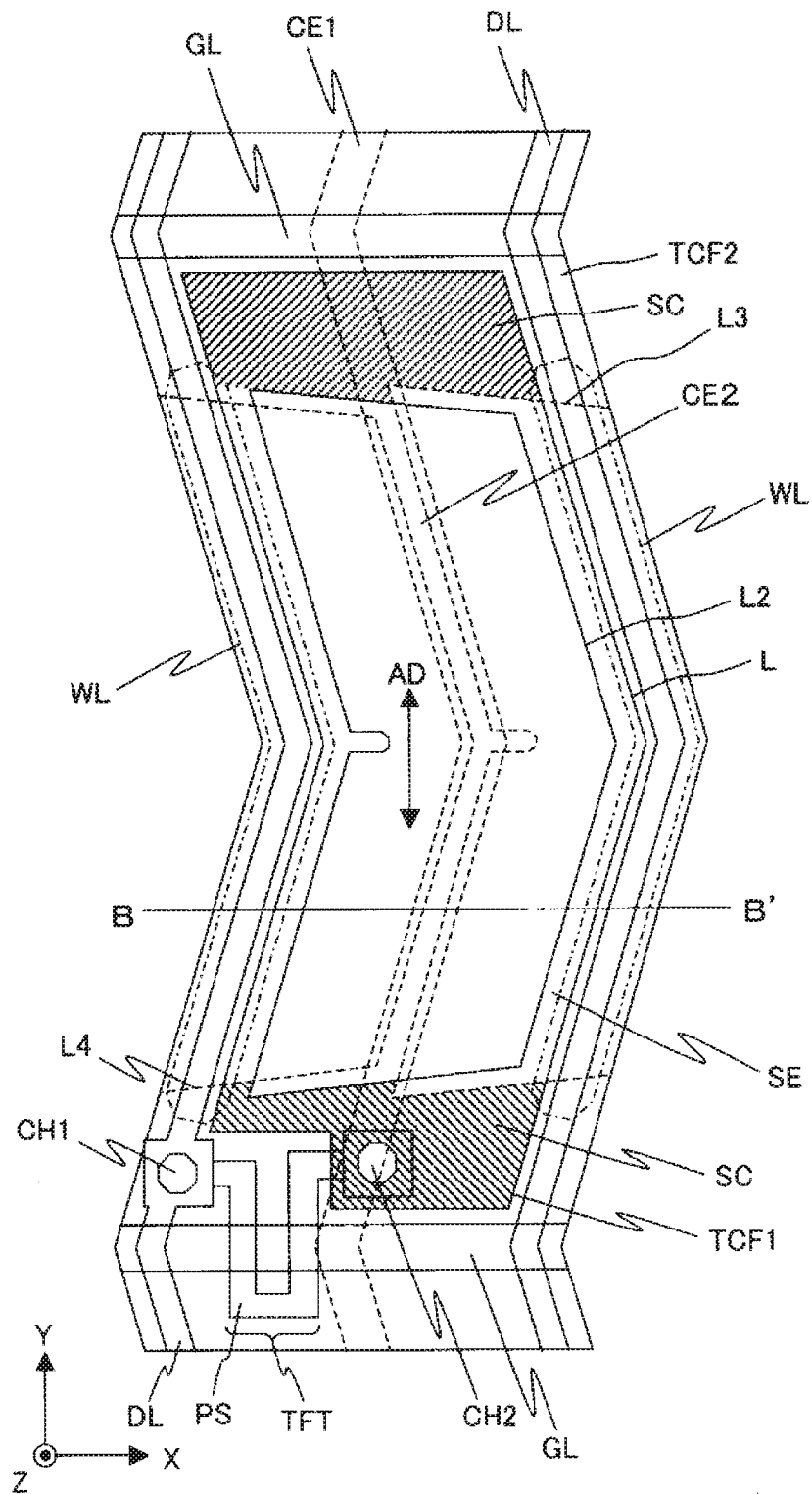
FIG. 2 is a plan diagram for illustrating the structure of a pixel in the liquid crystal display device according to the first embodiment of the present invention.
Figure 3:
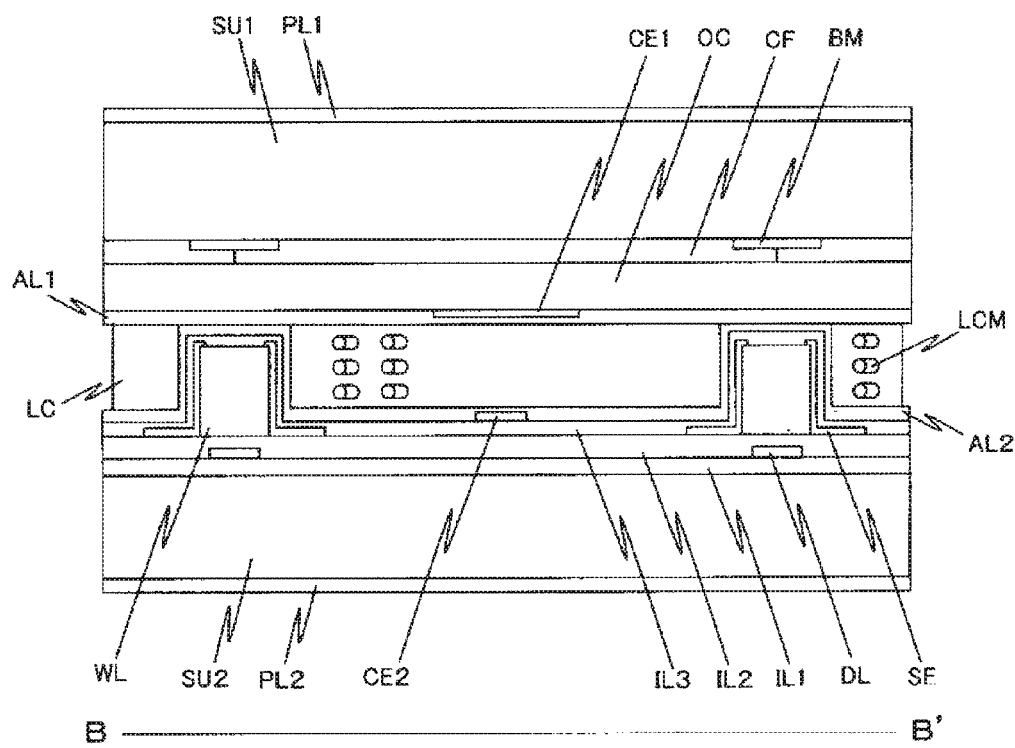
FIG. 3 is a cross-sectional diagram along line B-B' in FIG. 2.
Figure 4:
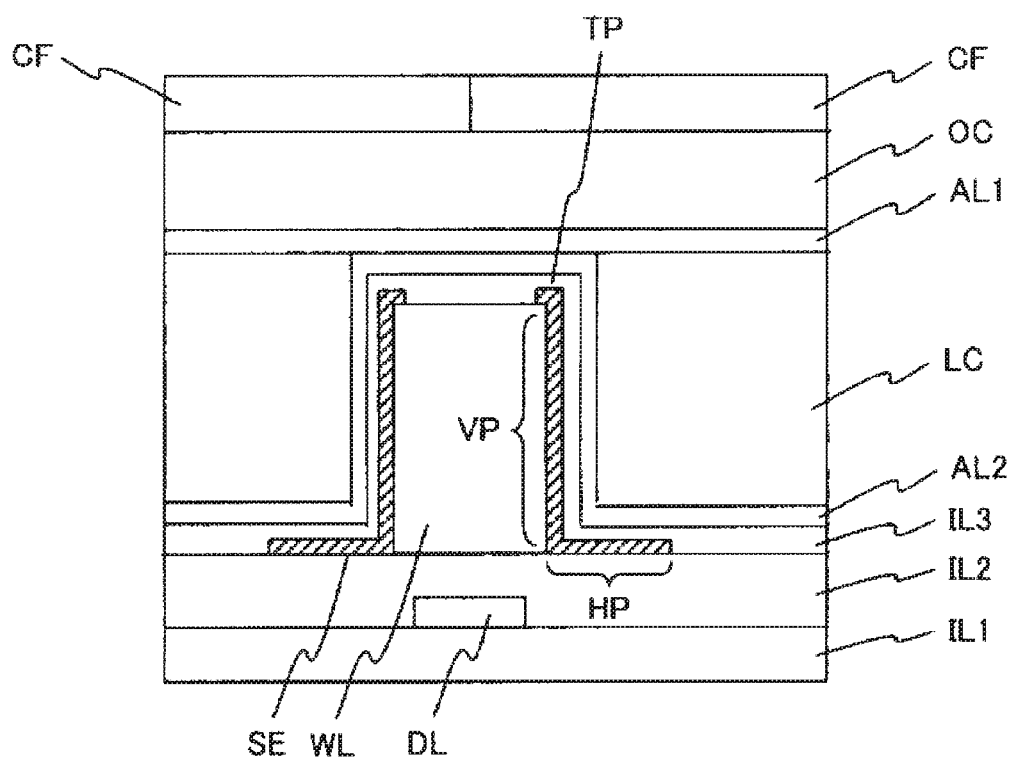
FIG. 4 is a diagram for illustrating the structure in detail of electrodes in wall form in the liquid crystal display device according to the first embodiment of the present invention.

FIG. 2 is a plan diagram for illustrating the structure of a pixel in the liquid crystal display device according to the first embodiment of the present invention, FIG. 3 is a cross-sectional diagram along line B-B' in FIG. 2, and FIG. 4 is a diagram for illustrating the detailed structure of electrodes in wall form in the liquid crystal display device according to the first embodiment of the present invention. In FIG. 2, the dotted lines show the outlines of the first common electrode CE1 and the second common electrode CE2, and the one-dot chain lines show the outlines of the wall bases (protrusions, wall structures) WL according to the present invention.

As shown in FIG. 2, a pixel in the first embodiment is in a region between drain lines (video signal lines) DL, which run in the X direction and are aligned in the Y direction, and between gate lines (scan signal lines) GL, which run in the Y direction and are aligned in the X direction, and pixels are arranged in a matrix within the display region AR in the liquid crystal display panel PNL. Here, in the pixel in the first embodiment, the upper region (first region) in FIG. 2 and the lower region (second region) are inclined in different directions so that the upper region and the lower region are symmetrical in the Y direction and connected in the center portion of the pixel. Here, the liquid crystal molecules are initially aligned in the direction indicated by the arrow AD in the figure both in the upper and lower regions. In addition, though the pixels in the first embodiment have such a structure that the upper region is inclined counterclockwise (first direction) relative to the Y direction and the lower region is inclined clockwise (second direction), they may be inclined in the opposite directions.

As described above, in the liquid crystal display panel according to the first embodiment, each pixel is bent at the center and the liquid crystal molecules are aligned in the direction indicated by the arrow AD (longitudinal direction in FIG. 2). As a result, the liquid crystal molecules rotate in the opposite directions when a voltage is applied in the upper and lower regions that make contact through the bent portion. That is to say, liquid crystal molecules rotate counterclockwise in the upper region above the bent portion and rotate clockwise in the lower region beneath the bent portion. In a uniaxial alignment model, the liquid crystal layer maintains the homogenous alignment and only the azimuth thereof rotates, and in the azimuth direction, including the alignment direction, white display tinges blue, and in the direction perpendicular to that, white display tinges yellow. Accordingly, in the first embodiment, regions where the direction of rotation is opposite to each other are formed in one pixel so that the tinging of colors depending on the direction of the view angle is offset, and thus, the display can be made closer to white.

In the liquid crystal display panel PNL according to the first embodiment, a polysilicon film (polysilicon layer) PS that becomes a semiconductor layer makes electrical contact through contact holes CH1, which are created so as to overlap the drain lines DL, and thus, the drain electrodes of the thin film transistors TFT are formed. As shown in the lower left portion of FIG. 2, this polysilicon film PS overlaps the gate line GL with a gate insulating film, not shown, in between, and in this overlapping region, the gate electrode GT works as the gate electrode of the thin film transistor TFT. In addition, the other end of the polysilicon film PS works as a drain electrode and is electrically connected to a first transparent conductive film (first conductive film) TCF1 through a contact hole CH2. Though the first embodiment is a case where a polysilicon layer is used as the semiconductor layer (semiconductor film), the structure allows for the use of other semiconductor layers, such as an amorphous silicon layer or a microcrystal silicon layer.

The first transparent conductive film TCF1 is formed in annular form along the drain lines DL and the gate lines GL in such a manner that the first transparent conductive film TCF1 is formed in the region between the outer periphery portion, shown by the solid line L1 in FIG. 2, and the inner periphery portion, shown by the solid line L2. Here, the portions of the first transparent conductive film TCF1 that run along the drain lines DL overlap the wall bases WL on the side closer to the drain lines DL, that is to say, on the outer periphery side. As a result, pairs of wall pixels electrodes SE formed along the drain lines DL stand so as to sandwich pixel regions according to the first embodiment.

In the liquid crystal display panel PNL according to the first embodiment, second transparent conductive films (second conductive films) TCF2 run along the gate lines GL in the X direction and are aligned in the Y direction so as to cross the gate lines GL and work as the common lines CL. In addition, in a middle part of a pixel region in the X direction, a second common electrode CE is formed so as to connect the second transparent conductive films TCF2 formed on the upper side and the lower side within the pixel region. Here, the second common electrode CE2 is also formed so as to incline relative to the Y direction in the upper part and the lower part of the pixel region and makes electrical connection in the middle part between the upper part and the lower part. That is to say, in the second common electrode CE2 as well, the pixel region is bent in the middle part between the upper part and the lower part. The second common electrodes CE2 having this structure can be formed as a film by creating openings, shown by dotted lines L3 and L4, in the transparent conductive film that is formed so as to cover the second substrate SU2 on the liquid crystal side, and second common electrodes CE2 in linear form that is bent in the middle part are formed in a region sandwiched between a pair of wall pixel electrodes SE. As described below in detail, in the liquid crystal display panel PNL according to the first embodiment, first common electrodes CE1 for supplying a common signal at the same potential to a location facing a second common electrode CE2 are formed on the first substrate SU1 on the liquid crystal side. In addition, the first common electrodes CE1 and the second common electrodes CE2 are electrically connected in the peripheral portion of the liquid crystal display panel PNL in accordance with a well-known technology so that a common signal having the same potential is supplied to the first common electrodes CE1 and the second common electrodes CE2.

In the liquid crystal display panel PNL according to the first embodiment, the first transparent conductive films TCF1 that form the wall pixel electrodes SE and the second transparent conductive films TCF2 that form the second common electrodes CE2 are provided with a third insulating film IL3 in between. Accordingly, in the upper and lower parts of a pixel region, which are hatched in FIG. 2, a first transparent conductive film TCF1 and a second transparent conductive film TCF2 overlap with a third insulating film IL3 in between, and thus, the structure according to the first embodiment allows the regions where a first transparent conductive film TCF1 and a second transparent conductive film TCF2 overlap (hatched regions SC) to be used as a capacitor.

In the first transparent conductive films TCF1 in the first embodiment, a protrusion is formed in the middle part between the upper part and the lower part of a pixel so as to protrude in the X direction in FIG. 2, and this structure lowers the abnormal domain caused by the difference in the direction of rotation of liquid crystal molecules between the upper part and the lower part. Likewise, in the transparent conductive films that form the second common electrodes CE2, a protrusion is formed in the middle part between the upper part and the lower part of a pixel so as to protrude in the X direction in FIG. 2, and this structure reduces the abnormal domain.

In the liquid crystal display panel PNL having the structure according to the first embodiment, as shown in FIG. 3, the first substrate SU1 and the second substrate SU2 are provided so as to face each other with the liquid crystal layer LC in between. Gate lines GL, not shown, are formed on the first substrate SU1 on the liquid crystal side, and a first insulating film IL1 is formed on the entire surface of the second substrate SU2 on the liquid crystal side so as to cover the gate lines GL. This structure allows the first insulating film IL1 to function as the gate insulating film in regions where a thin film transistor TFT is formed.

Drain lines DL are formed on a layer above the first insulating film ILL and a second insulating film IL2 is formed on the entire surface of the second substrate SU2 so as to cover the drain lines DL. Wall bases WL are provided and stand in a layer above the second insulating film IL2 so as to overlap the drain lines DL. First transparent conductive films TCF1 that form a wall pixel electrode SE are formed on the sides and on the top of these wall bases WL and in a layer above the second insulating film IL2 in the vicinity of the wall bases WL. In the wall pixel electrodes WL according to the first embodiment, as described above, the wall pixel electrode SE of an adjacent pixel is formed on a sidewall of one wall base WL, and the wall pixel electrodes SE of adjacent pixels are located so as to face each other with the wall base WL in between in the direction in which the gate lines GL run.

A third insulating film IL3 is formed on the entire surface of the second substrate SU2 in a layer above the wall bases WL and the wall pixel electrodes SE so as to cover the wall bases WL and the wall pixel electrodes SE, and second common electrodes CE2 are formed in a layer above this. In addition, a second alignment film AL2 is formed on the entire surface of the second substrate SU2 in a layer above the third insulating film IL3 so as to cover the second common electrodes CE2, and this structure allows the liquid crystal molecules LCM in the liquid crystal layer LC to be aligned in the initial alignment direction ADH, shown by the arrow in FIG. 2. In particular, the second alignment film AL2 is a well-known optical alignment film having such properties as to align the liquid crystal molecules LCM in the direction parallel to the direction in which polarized ultraviolet rays oscillate when irradiated with the polarized ultraviolet rays. In the first embodiment, an optical alignment film is used as the second alignment film AL2, and thus, such particular effects can be gained that mechanical friction, such as in a rubbing method, is unnecessary. As a result, it becomes possible to align the liquid crystal molecules LCM on the surface of the second substrate SU2 that is uneven because the wall bases WL are provided. Here, other well-known alignment films, such as those using a rubbing method, can be applied.

In addition, a black matrix BM, which works as a light blocking film, is formed on the first substrate SU1 on the liquid crystal side so as to include locations facing the drain lines DL with the liquid crystal layer LC in between, and color filters CF are formed in a color layer so as to cover the black matrix BM. The color filters CF in each pixel region are any of red (R), green (G) or blue (B), and thus form a RGB unit pixel for a color display.

An overcoat layer (overcoat film or flattening layer) OC is formed in a layer above the color filters CF, and first common electrodes CE1 are formed in a layer above the overcoat layer OC. A first alignment film AL1 is formed in a layer above the overcoat layer OC so as to cover the first common electrodes CE1. The first alignment film AL1 is used in the structure where wall bases WL that protrude greatly from the first alignment film AL1 towards the liquid crystal layer side are not formed, and therefore may be any type of alignment film, such as an optical alignment film or an alignment film using a rubbing method.

Here, the first common electrodes CE1 are formed so as to overlap the second common electrodes CE2 with the liquid crystal layer LC in between, and at the same time have a width that is greater than that of the second common electrodes CE2 in the direction in which the wall pixel electrodes SE are placed according to the first embodiment. According to the first embodiment, this structure allows regions having the same potential to be created in the liquid crystal layer LC within the regions where a first common electrode CE1 and a second common electrode CE2 overlap, and thus, pseudo-wall common electrodes (second electrodes) where these regions are regarded as wall electrodes (pseudo-wall electrodes) are created.

In this case, an electrical field is generated between the wall pixel electrode SE on the side B and the pseudo-wall common electrode in FIG. 3, which shows the pseudo-wall common electrode at the center, so as to be parallel to the main surface of the second substrate SU2, while an electrical field is generated between the wall pixel electrode SE on the side B' and the pseudo-wall common electrode so as to be parallel to the main surface of the second substrate SU2 when an image is displayed. These electrical fields on the sides B and B' allow the liquid crystal molecules LCM in the respective regions to be rotated parallel to the main surface of the second substrate SU2.

The structure according to the first embodiment allows the wall bases WL to overlap regions that mainly include a wall pixel electrode SE within a first transparent conductive film TCF1. That is to say, a wall base WL is formed only in a portion where the wall base WL makes a pair with a first common electrode CE1 or a second common electrode CE2 so as to apply an electrical field to the liquid crystal layer LC, and this structure allows the wall bases WL to overlap a first transparent conductive film TCF1, and thus does not allow the wall bases WL to extend in the vicinity of a gate line GL. Furthermore, the structure does not allow the wall bases WL to be formed along the sides of a pixel region on the gate line GL side (in the Y direction). Thus, the wall structures WL are not formed on or in the vicinity of the gate wires GL and are not continuous because they do not cross pixels in the direction in which the drain wires DL run. Accordingly, the wall bases WL according to the first embodiment make it easy to form the liquid crystal layer LC by reducing the hindrance for the movement of the liquid crystal molecules LCM or by not preventing the injection of liquid crystal when the liquid crystal layer LC is formed in accordance with either a vacuum sealing method or a dropping method. After being injected, the liquid crystal molecules LCM move through the spaces where no wall base WL is formed so as to form the liquid crystal layer LC. In addition, the wall bases WL function to maintain the thickness of the liquid crystal layer LC at constant in order to hold the liquid crystal layer LC.

As for the transparent conductive film material for forming the transparent conductive films TCF1 and TCF2, of which the wall pixel electrodes SE, the first common electrodes CE1 and the second common electrodes CE2 are formed, it is possible to use ITO (indium tin oxide) or zinc oxide-based materials, such as AZO (aluminum-doped zinc oxide) and GZO (gallium-doped zinc oxide).

In particular, in the structure according to the first embodiment, as shown in FIG. 4, which shows an enlargement of a wall pixel electrode SE, the wall bases WL are rectangular in a cross-section, and the second alignment film AL2 formed on the top surface of a wall base WL is in proximity or makes contact with the first alignment film AL1 formed on the first substrate SU1. Here, the wall surfaces of the wall bases WL are perpendicular or inclined so as to be almost perpendicular to the main surface of the second substrate SU2, and thus, the wall bases WL may be in forms other than rectangular in a cross-section, which may be a trapezoid, a curve of the second order or a curve of the fourth order.

In the pixel structure according to the first embodiment, wall bases WL are formed so as to cross adjacent pixels, and therefore, as shown in FIG. 4, wall pixels electrodes SE of pixels adjacent to each other are formed on the sidewalls of a wall base WL so as to face each other in the direction in which the drain lines DL are aligned (in the direction B-B' in FIG. 4). That is to say, a pair of sidewalls that respectively face pixels adjacent to each other have wall pixel electrodes SE for their respective adjacent pixels. The wall pixel electrodes SE in the first embodiment are formed of a vertical portion (sidewall electrode) VP formed on a sidewall of a wall base WL, a top portion TP formed on the top surface of the wall base WL that extends from the end portion of the vertical portion VP on the top side along the top surface, and a flat portion (lower end side electrode) HP that extends towards the pseudo-wall common electrode side from the end portion of the wall base WL on the bottom side (on the second substrate SU2 side) along the surface of the second insulating film IL2 in the lower layer with a predetermined width.

Here, the top surface of a wall base WL has the top portions TP of adjacent pixels, and therefore, the wall pixel electrodes SE of the adjacent pixels are the closest to each other. Accordingly, in the liquid crystal display panel PNL according to the first embodiment, the distance between the top portions TP of the adjacent pixels is smaller than the amount of the top portions TP that protrudes towards the adjacent pixel (protruding width). Here, the structure of the wall pixel electrodes SE is not limited to this, and in another example of the structure, wall pixel electrodes SE are formed of only a vertical portion VP and a flat portion HP without having a top portion TP.

In addition, in the first embodiment, drain lines DL are formed in a layer beneath the wall bases WL (on the side closer to the second substrate SU2), that is to say, the flat portions HP are formed from the end portion of a vertical portion VP on the side where the drain line DL is formed in the structure of the wall pixel electrodes SE, which has such effects that the drain lines DL can be prevented from affecting the wall pixel electrodes SE. In addition, at the end of a flat portion HP, that is to say, on the side that is further from the vertical portion VP, there is an effect of intensifying the electrical field applied to the liquid crystal layer LC because the distance from the pseudo-wall common electrode is shorter. Thus, in the liquid crystal display panel PNL according to the first embodiment, the wall bases WL are formed on the second substrate SU2 so as to protrude into the liquid crystal layer LC towards the first substrate SU1 side with the sidewalls (inclined surfaces) being vertical or almost vertical, and therefore, the wall pixel electrodes SE formed on the wall bases WL can apply an electrical field to the liquid crystal layer LC parallel to the layer surfaces thereof. When an electrical field is applied parallel to the layer surfaces, the alignment changes uniformly in the liquid crystal layer, and therefore, high transmittance can be gained and high efficiency in the display mode can be achieved.

<Distribution of Electrical Field Around Wall Pixel Electrode and Pseudo-Wall Common Electrode>

Figure 5:
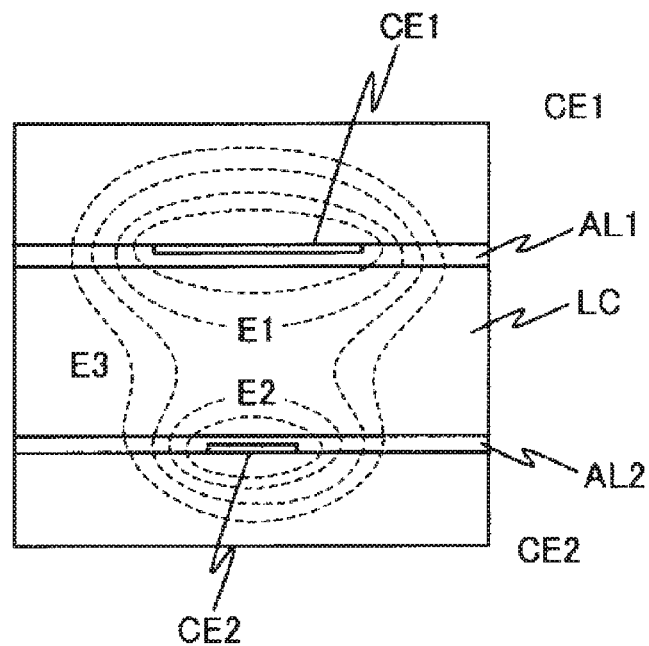
FIG. 5 is a diagram for illustrating the distribution of an electrical field around a pseudo-wall common electrode in the liquid crystal display device according to the first embodiment of the present invention.
Figure 6:
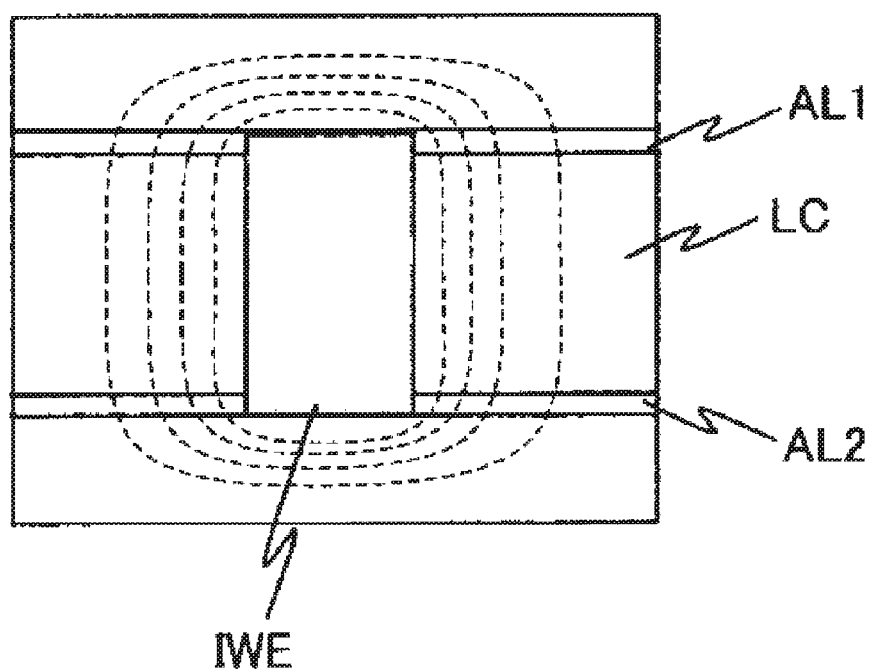
FIG. 6 is a diagram for illustrating the distribution of an electrical field around a conventional wall electrode.
Figure 7:
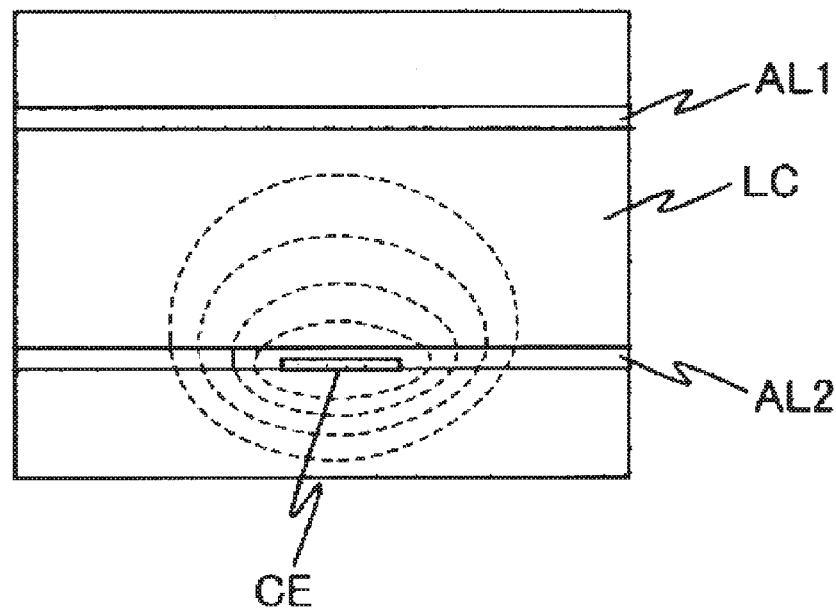
FIG. 7 is a diagram for illustrating the distribution of an electrical field around a conventional common electrode.
Figure 8:
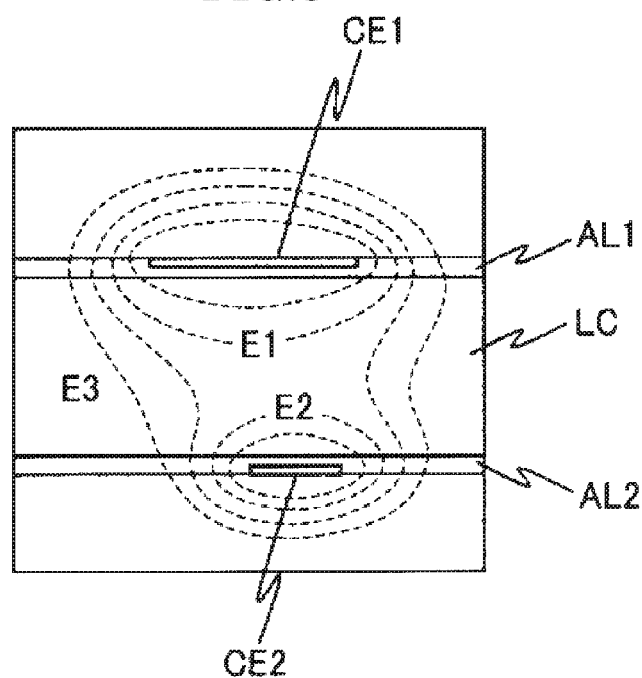
FIG. 8 is a diagram for illustrating the precision in positioning the pseudo-wall common electrode according to the first embodiment of the present invention.

FIG. 5 is a diagram for illustrating the distribution of an electrical field around a pseudo-wall common electrode in the liquid crystal display device according to the first embodiment of the present invention, FIG. 6 is a diagram for illustrating the distribution of an electrical field around a conventional wall electrode, FIG. 7 is a diagram for illustrating the distribution of an electrical field around a conventional common electrode, and FIG. 8 is a diagram for illustrating the precision in positioning a pseudo-wall common electrode according to the first embodiment of the present invention.

As shown in FIG. 5, in the liquid crystal display panel PNL according to the first embodiment, the first common electrode CE1 formed on the first substrate SU1 and the second common electrode CE2 formed on the second substrate SU2 are placed so as to overlap as viewed from the display side. As a result, in the pseudo-wall common electrode in the first embodiment, equipotential surfaces E1 and E2 respectively surround only the first common electrode CE1 and the second common electrode CE2 in the vicinity of the first common electrode CE1 and the second common electrode CE2. Here, the structure in the first embodiment allows the same common signal to be supplied to the first common electrode CE1 and the second common electrode CE2, and therefore, equipotential surfaces E3 surround both the first common electrode CE1 and the second common electrode CE2, that is to say, the equipotential surfaces E3 connect the first substrate SU1 and the second substrate SU2. At this time, the equipotential surfaces E3 are the same as the equipotential surfaces in the case where an electrode IWE in wall form is formed as in FIG. 6. There is a liquid crystal layer LC between the first common electrode CE1 and the second common electrode CE2, and therefore, the same effects can be gained for the equipotential surfaces E3 around the pseudo-wall common electrode as in the case where an electrode IWE in wall form is provided, and thus, the pseudo-wall common electrode itself does not greatly lower the transmittance. Accordingly, the structure where wall pixel electrodes SE are provided on the wall bases WL at the ends of the pixels and pseudo-wall common electrodes are provided at the center of the pixels allows for high transmittance, even in the case where the width of the pixels is relatively large, as in the liquid crystal display panel PNL for WVGA.

As is clear from the shape of the equipotential surfaces E3 in FIG. 5, the equipotential surfaces E3 created by a pseudo-wall common electrode are small in the width in the direction of the width of the electrode in a region between the first common electrode CE1 and the second common electrode CE2, that is to say, in a region between the first substrate SU1 and the second substrate SU2, and therefore, it is possible for the width of the electrode that does not contribute to the driving of the liquid crystal molecules to be small. As a result, the efficiency in display can be improved.

In the first embodiment, the liquid crystal display panel PNL has such a structure that the width of the first common electrode CE1 is greater (wider) than that of the second common electrode CE2. This is because the fact that the precision in processing the first substrate SU1, which is the substrate having color filters CF, is lower relative to that for the second substrate SU2 is taken into consideration. As shown in FIG. 8, in the case where the first common electrode CE1 and the second common electrode CE2 face each other at an angle, for example, the first common electrode CE1 can have a large width so that the equipotential surfaces E3 can be provided, and thus, a pseudo-wall common electrode can be formed. Here, the first common electrode CE1 and the second common electrode CE2 are not limited to having different electrode widths, and they may be formed to have the same width. More desirably, the width of the first common electrode CE1 is the same as that of the second common electrode CE2. That is to say, the smaller the width of the first common electrode CE1 and the width of the second common electrode CE2 are, the narrower the distribution of the equipotential surface E3 that surrounds the first common electrode CE1 and the second common electrode CE2 in FIG. 5 is, and therefore, the transmittance in the vicinity of the pseudo-wall common electrode is higher.

In the case where only either the first common electrode CE1 or the second common electrode CE2 is provided to the pseudo-wall common electrode having the above-described structure, the same effects cannot be gained for the pseudo-wall common electrode. FIG. 7 is a diagram showing the equipotential surfaces in the case where a common electrode is provided only to the second substrate SU2, that is to say, only the second common electrode CE2 is provided. As shown in FIG. 7, the equipotential surfaces are in concentric form surrounding the second common electrode CE2. In this case, the intensity of the electrical field surrounding the second common electrode CE2 is low and the alignment of liquid crystal does not sufficiently change, and therefore, the transmittance significantly lowers in the vicinity thereof.

Meanwhile, in the first embodiment, wall pixel electrodes SE for one pixel and its adjacent pixel are placed on the sidewalls of a wall base WL that face each other, and therefore, there is an electrical field in and around the wall base WL due to the difference in the potential between the wall pixel electrodes SE for the pixel and its adjacent pixel. As a result, in the case of driving for inverting the display column by column, the difference in the potential between the wall pixel electrodes SE formed on the same wall base WL is maximum when the pixel displays white and its adjacent pixel displays black. At this time, the transmittance for white display lowers in the case where the intensity of the electrical field within the pixels for white display becomes uneven. In addition, the transmittance for black display increases in the case where there is a leak in the potential in a pixel for black display. In the structure according to the first embodiment, as shown in FIG. 3, the height of the wall bases WL is almost equal to the thickness of the liquid crystal layer LC, and the wall pixel electrodes SE have a flat portion HP. This structure can reduce the unevenness in the distribution of lateral electrical fields caused by the fact that lines of electric force from the surface of the vertical portion VP that forms a wall pixel electrode SE pass through the second substrate SU2 and reach the surface of the vertical portion VP formed on the opposite surface of the wall base WL, and can also reduce the leakage of an electrical field to an adjacent pixel, and thus, the transmittance for white display can be improved and the transmittance for black display can be lowered. That is to say, the efficiency in the display mode can be improved and a high contrast ratio can be gained.

Figure 9:
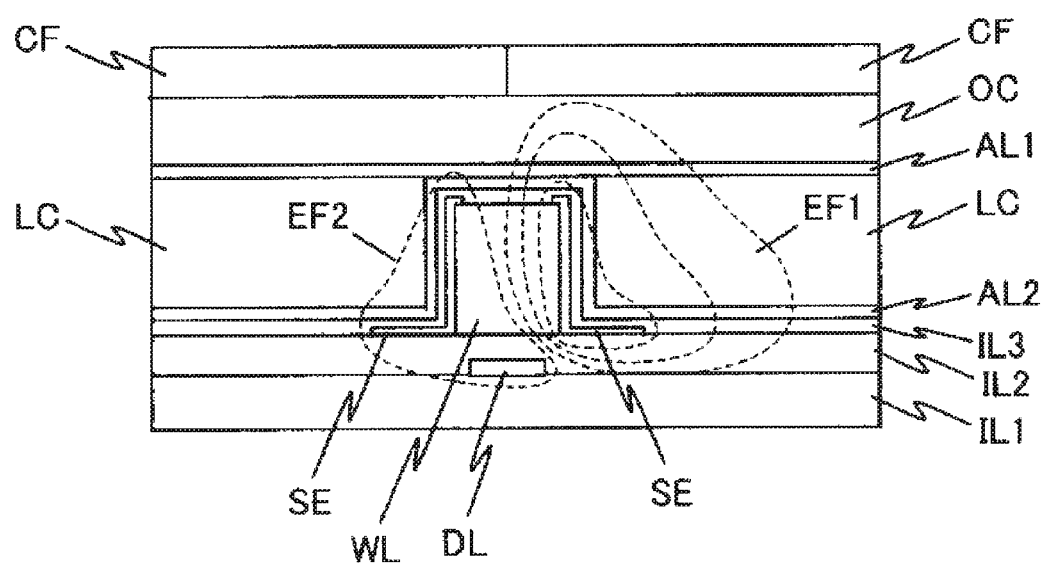
FIG. 9 is a diagram showing the distribution of equipotential surfaces in the vicinity of a wall base in the liquid crystal display device according to the first embodiment of the present invention.

FIG. 9 is a diagram showing the distribution of equipotential surfaces in the vicinity of a wall base in the liquid crystal display device according to the first embodiment of the present invention. In particular, the center of the wall base WL in FIG. 9 is a pixel border, and FIG. 9 shows the distribution of equipotential surfaces in such a state that the pixel on the right (a pixel) displays white and the pixel on the left (its adjacent pixel) displays black. In addition, the distribution of equipotential surfaces shown in FIG. 9 corresponds to a case where the difference in the potential between adjacent pixels is maximum during the driving for inverting the display column by column.

In the case where adjacent pixels display black and white for the driving for inverting the display column by column, the equipotential surfaces EF1 on the white display side have a wide distribution. Meanwhile, an equipotential surface EF2 is created around the pixel for black display, but this is localized in the vicinity of the wall pixel electrode SE. The fact that these distributions of equipotential surfaces EF1 and EF2 are gained shows that the effects of the electrical field from the wall pixel electrode SE of the pixel for white display on the right in the figure on the electrical field of the pixel for black display can be reduced, and at the same time, the effects of the electrical field from the wall pixel electrode SE of the pixel for black display on the left in the figure on the electrical field of the pixel for white display can be reduced.

As the liquid crystal display panel PNL according to the first embodiment having this structure, a liquid crystal display panel is formed using a liquid crystal material having a high resistance which shows a nematic phase in a wide temperature range including room temperature for the liquid crystal layer LC. In the case where an electrical field is applied to the liquid crystal display panel PNL according to the first embodiment parallel to the layer plane of the liquid crystal layer LC, that is to say, parallel to the surface of the liquid crystal display panel using the wall pixel electrodes SE formed on the wall bases WL, the liquid crystal layer LC is in an alignment state that is close to the uniaxial alignment model. In this case, the retardation And of the liquid crystal layer may be approximately 300 nm in order to achieve both a high transmittance and achromatic color. In the first embodiment, the index of birefringence Δn of the liquid crystal material is 0.09, the thickness of the liquid crystal layer is 3.3 μm, and Δnd of the liquid crystal layer is 300 nm.

Here, the region where the wall bases WL are formed does not have the liquid crystal layer LC, and therefore, the wall bases WL themselves cause the transmittance to lower. Thus, the structure in the first embodiment allows the wall bases WL to be located beneath the black matrix BM in the end portions of the pixels. In the case of the pixels for WVGA (wide video graphics array), for example, the width of pixels (width of pixels in the X direction) is approximately 30 μm. Accordingly, in the conventional wall electrode structure where electrodes in wall form are formed in end portions of a pixel so that a video signal is supplied to one electrode and a common signal is supplied to the other electrode, the distribution of the intensity of the electrical field becomes uneven, which lowers the transmittance, when the wall bases WL are aligned at intervals of 30 μm. In contrast, the liquid crystal display panel PNL according to the first embodiment has such a structure that a pseudo-wall common electrode is provided at the center of pixels, which makes it possible to compensate the intensity of the electrical field at the center of pixels, and thus, the transmittance can be increased. As described above, the pseudo-wall common electrodes are formed of a pair of common electrodes, a first common electrode CE1 and a second common electrode CE2.

Figure 10:
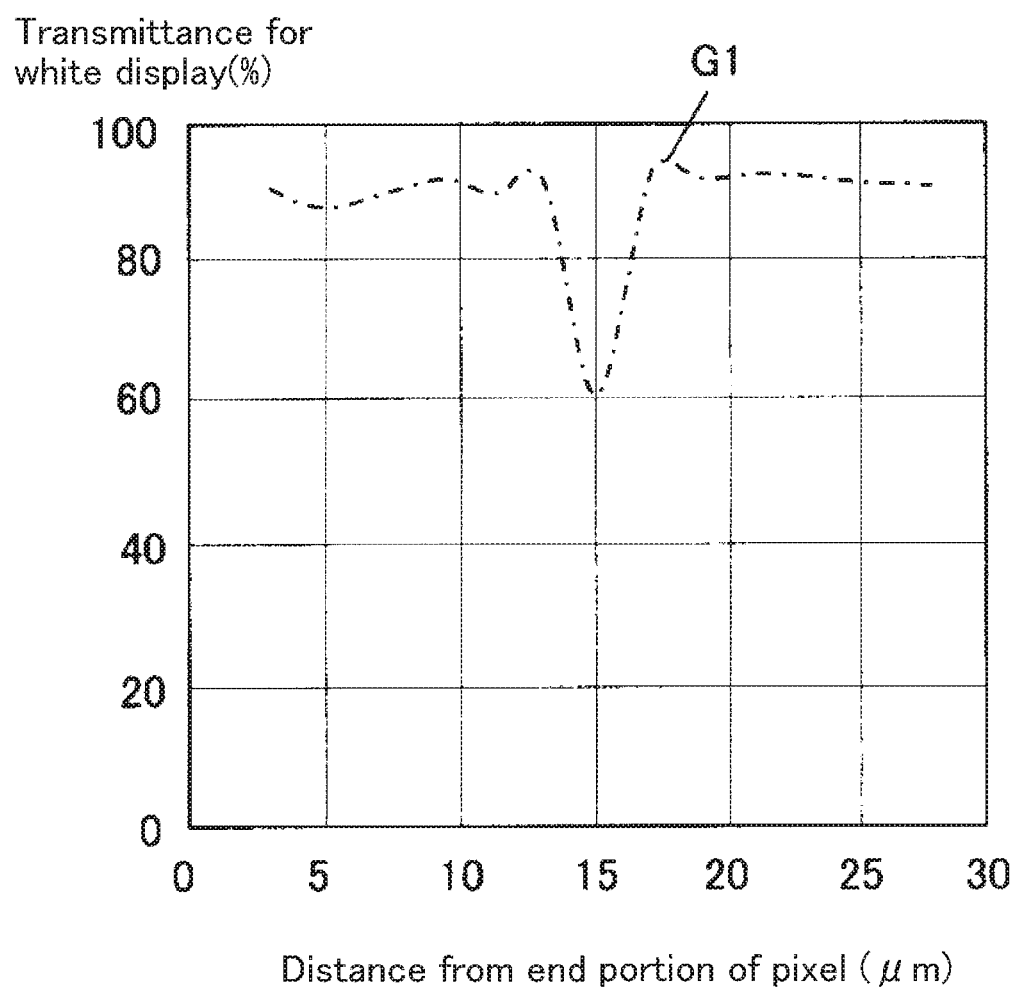
FIG. 10 is a graph showing the measured values in the distribution of transmittance in one pixel in the liquid crystal display device according to the first embodiment of the present invention.

Next, FIG. 10 is a graph showing the distribution of the measured values of transmittance within one pixel in the liquid crystal display device according to the first embodiment of the present invention, and the effects of the structure of the pixels in the first embodiment are described below in reference to FIG. 10. Here, the curve G1 in FIG. 10 is for the measured values of the transmittance of pixels between one end and the other at the time of white display (white display transmittance) in the case where the width of pixels is 30 μm and a pseudo-wall common electrode is formed at a location 15 μm away from an end of each pixel when the pixels adjacent to the pixel displaying white are displaying black. Thus, the case where a pixel is displaying white and its adjacent pixels are displaying black corresponds to a case where the difference in potential between adjacent pixels (a pixel and its adjacent pixels) is maximum in the driving for inverting the display column by column.

As is clear from the curve G1, the transmittance is low in the region where the pseudo-wall common electrode is formed, which is a portion 15 μm away from an end of each pixel, while approximately a constant transmittance is gained in other portions. This shows that an electrical field (lateral electrical field) having approximately a constant intensity is applied to the liquid crystal layer LC within pixels, excluding the portion in the vicinity of the pseudo-wall common electrode. Furthermore, as is clear from the curve G1, a transmittance of 90% is gained for the liquid crystal display device according to the first embodiment at the time of the driving for inverting the display column by column. In addition, the transmittance of the adjacent pixels displaying black is 0.08%. Here, the transmittance in the present specification is a value excluding the absorption by color filters, polarizing plates and other members and the effects of the aperture ratio, and thus is a value corresponding to the polarization switching performance of the liquid crystal layer.

In contrast, in the IPS type liquid crystal display device where the width of pixels is 30 µm and pixel electrodes in linear form are formed in a layer above the common electrode in a plane with an insulating film in between, for example, the transmittance for the driving for inverting the display column by column is approximately 76%, and therefore, the transmittance can be greatly improved in the liquid crystal display device according to the first embodiment. That is to say, the efficiency in the display mode can be greatly improved.

As described above, in the liquid crystal display device according to the first embodiment, one pixel is formed of two or more inclined pixel regions in a so-called multi-domain structure where each pixel region is symmetrical relative to a line in the direction in which the gate lines GL are aligned, and at the same time, the wall pixel electrodes SE are formed of a vertical portion VP, a flat portion HP and a top portion TP, drain lines DL are formed in regions where a pixel is not exposed from the wall pixel electrodes SE of its adjacent pixels as viewed from the top, and furthermore, a pseudo-wall common electrode is formed in a region between each pair of wall pixel electrodes SE that are formed in the periphery portions of pixels, and this structure makes it possible to increase the transmittance even for the pixels having such a structure that pixels are relatively away from each other in the direction of the width.

Though the liquid crystal display device according to the first embodiment of the present invention provides a so-called multi-domain structure where one pixel is formed of two regions that are inclined in different directions (upper region and lower region), the multi-domain structure is not limited to this. In another example of the multi-domain structure, one pixel is formed of three or more regions. In a particular case where one pixel is formed of three or more regions, it is possible for all the angles at which the regions are inclined to be different, but the structure may allow at least two of the angles at which the regions are inclined to be different in the arrangement.

Second Embodiment

Figure 11:
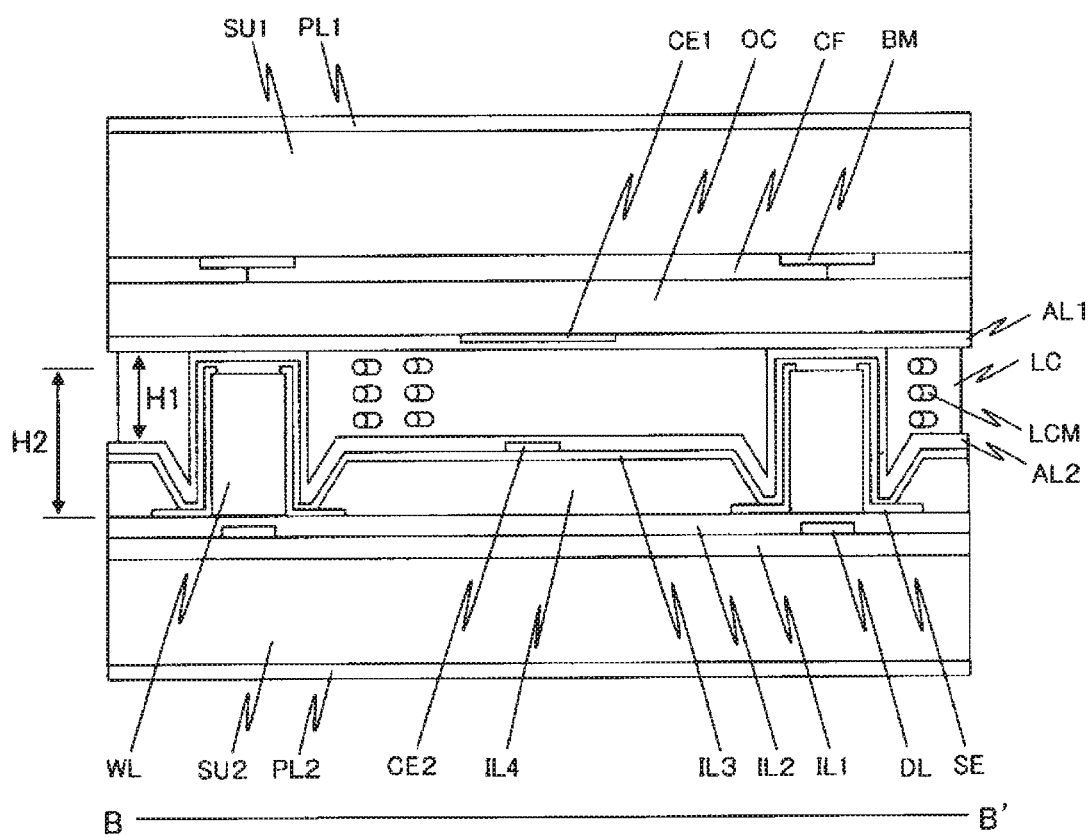
FIG. 11 is a cross-sectional diagram for schematically illustrating the structure of the liquid crystal display panel in the liquid crystal display device according to the second embodiment of the present invention.

FIG. 11 is a cross-sectional diagram for schematically illustrating the structure of the liquid crystal display panel in the liquid crystal display device according to the second embodiment of the present invention. In the following, the liquid crystal display device according to the second embodiment is described in reference to FIG. 11. Here, the liquid crystal display panel according to the second embodiment has the same structure as in the first embodiment, except the structure of the regions between a pair of wall pixel electrodes SE, that is to say, the portions of the liquid crystal layer LC to which an electrical field is applied. Accordingly, in the following, the structure of the regions between the wall pixel electrodes SE is described in detail. Though the description of the structure of the pixels according to the second embodiment refers to a case of a so-called multi-domain structure where the angles at which the wall pixel electrodes SE are inclined are different within pixels at the center portion, this can also be applied to a so-called single domain structure where the pixels are formed of linear wall pixel electrodes SE and a pseudo-wall common electrode.

As shown in FIG. 11, as in the first embodiment, the liquid crystal display panel according to the second embodiment is formed of a first insulating film IL1 drain lines DL, a second insulating film IL2, wall bases WL and wall pixel electrodes SE, which are layered in this order in layers above the second substrate SU2. In the liquid crystal display panel according to the second embodiment, a fourth insulating film (first insulating thick film) IL4 is formed in each region between a pair of wall pixel electrodes SE where liquid crystal molecules LCM are driven (hereinafter referred to as transmission region). That is to say, the structure allows the fourth insulating film IL4 to be formed in the region within each pixel where the wall bases WL are not formed.

In the second embodiment, the fourth insulating film IL4 is formed so as to have a thickness that does not exceed the height H2 of the wall pixel electrodes SE. In the structure in the second embodiment, through holes are created in the fourth insulating film IL4 so as to run along the regions where the wall pixel electrodes, including a wall base WL, are formed, and the wall bases WL and the wall pixel electrodes SE are formed on the surface of the second insulating film IL2 exposed from the bottom of these through holes (exposed surface). As a result, in the liquid crystal display panel PNL according to the second embodiment, recesses (first trenches) are created in the second substrate SU2 on the liquid crystal side, and the structure allows wall bases WL and wall pixel electrodes SE to be provided and stand at the bottom of these recesses in such a manner that the height of the wall pixel electrodes SE is greater than the thickness of the liquid crystal layer by the depth of the recesses, that is to say, by the thickness of the fourth insulating film IL4. Though recesses are created in the second substrate SU2 (on the liquid crystal side) by providing through holes only in the fourth insulating film IL4 in the second embodiment, the structure may allow recesses to be created by providing two or more thin film layers and creating through holes in these thin film layers.

A third insulating film IL3 is formed in a layer above the fourth insulating film IL4 so as to cover the top surface of the wall pixel electrodes SE and the wall bases WL. Second common electrodes CE2, which are one transparent electrode for forming a pseudo-wall common electrode, are formed in a layer above the third insulating film IL3, and an alignment film AL2 is formed in a layer above this.

The second substrate SU2 having this structure is provided with wall bases WL formed on top of the second insulating film IL2 in such a manner that the height H2 of the wall bases WL is preset to be greater than the thickness H1 of the liquid crystal layer LC. After that, the vertical portion VP, the flat portion HP and the top portion TP for forming a wall pixel electrode SE on a wall base WL are formed through patterning, and then, a fourth insulating film IL4 is formed on the entire surface of the second substrate SU2, including the wall pixel electrodes SE and the second insulating film IL2. Next, the parts of the fourth insulating film IL4 formed in a layer above the wall bases WL and the wall pixel electrodes SE and running along the regions where a wall pixel electrode SE, including a wall base WL, is formed are removed so that part of the top portions TP, the vertical portions VP and the flat portions for forming the wall pixel electrodes SE as well as the wall bases WL are exposed. After that, the third insulating film IL3, the second common electrode CE2 and the second alignment film AL2 are formed so that wall pixel electrodes SE can be formed so as to have a height that is greater than the thickness H1 of the liquid crystal layer LC by the thickness of the fourth insulating film IL4. Here, a material for an organic insulating film, such as an organic resist, can be used for the fourth insulating film IL4 so that the thickness thereof can be easily increased. In addition, the height of the wall bases WL is sufficiently greater than the thickness H1 of the liquid crystal layer LC.

Meanwhile, the structure of the first substrate SU1 is the same as that of the first substrate SU1 of the above-described liquid crystal display panel PNL according to the first embodiment. As a result, the thickness H1 of the liquid crystal layer LC in transmittance regions is smaller than the height H2 of the wall pixel electrodes SE in the liquid crystal display panel PNL in the first embodiment, even in the case where the height H1 of the liquid crystal layer LC is the same as that of the conventional liquid crystal display panel PNL. That is to say, the structure allows the height H2 of the wall pixel electrodes SE to be greater than the thickness H1 of the liquid crystal layer LC.

Figure 12:
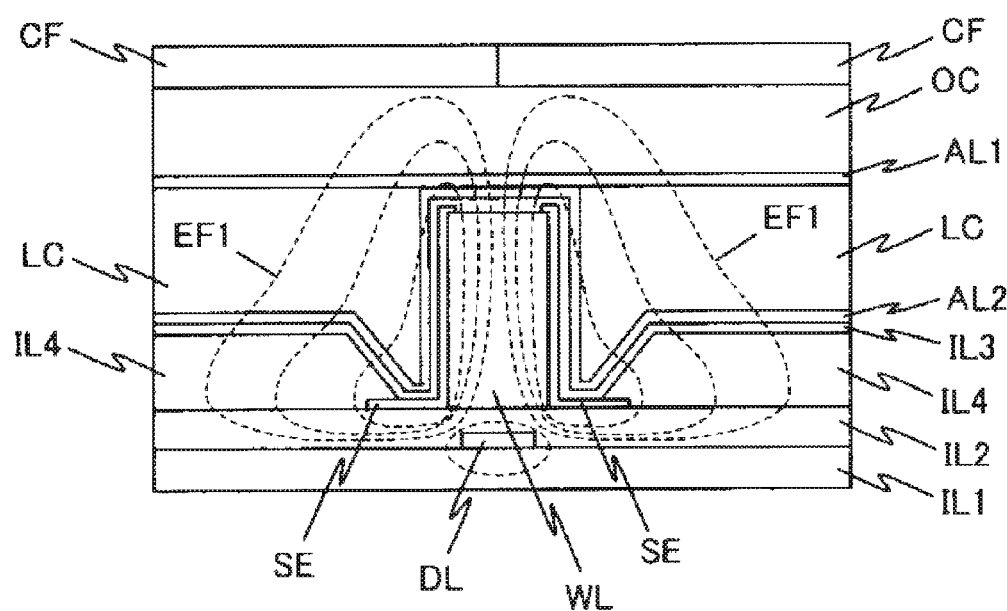
FIG. 12 is a diagram for illustrating the distribution of equipotential surfaces in the vicinity of a wall base in the liquid crystal display device according to the second embodiment of the present invention.
Figure 13:
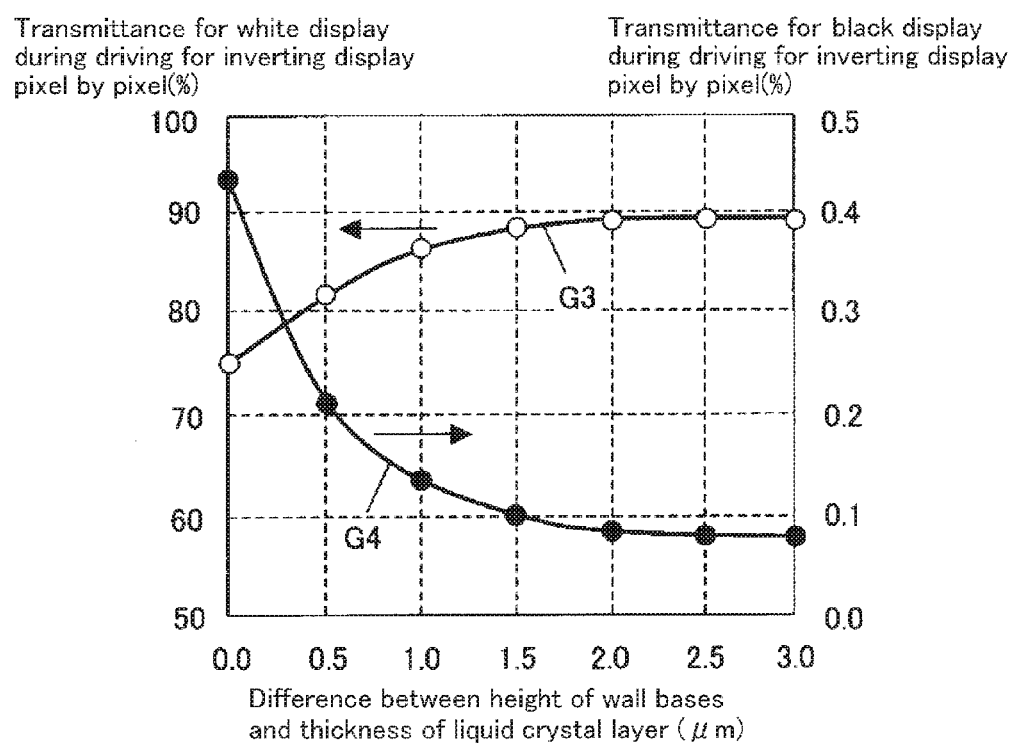
FIG. 13 is a graph for illustrating the distribution of equipotential surfaces in the vicinity of a wall base in the case where the liquid crystal display device according to the first embodiment is operated so that each pixel is inverted.

Next, FIG. 12 is a diagram for illustrating the distribution of equipotential surfaces in the vicinity of a wall base in the liquid crystal display device according to the second embodiment of the present invention, and FIG. 13 is a graph for illustrating the distribution of equipotential surfaces in the vicinity of a wall base in the case where the liquid crystal display device according to the first embodiment is driven so that the display is inverted pixel by pixel. In the following, the structure of the pixels in the liquid crystal display panel PNL according to the second embodiment is described in detail in reference to FIGS. 12 and 13. Here, the distribution of the equipotential surfaces shown in FIGS. 12 and 13 corresponds to a case where the difference of the potential between adjacent pixels is maximum during the time of driving for inverting the display pixel by pixel.

In the driving for inverting the display pixel by pixel, the potentials are opposite between adjacent pixels, and therefore, the difference in the potential is maximum between adjacent pixels in the case where they both display white. At this time, in the liquid crystal display panel PNL according to the second embodiment as well, the wall pixel electrodes SE of adjacent pixels are formed in such locations as to face each other with a wall base WL in between. Therefore, in the case where maximum voltages having opposite polarities are applied to adjacent pixels, that is to say, in the case where the adjacent pixels both display white, there is a difference in the potential that is almost two times greater than the maximum value in the driving for inverting the display column by column, and thus, the effects on the potentials in adjacent pixels are greater.

FIG. 13 is a graph showing the results of measurement for the transmittance when white is displayed and the transmittance when black is displayed at the time of driving for inverting the display pixel by pixel relative to the difference Hd (=H2−H1) between the thickness H1 of the liquid crystal layer in the liquid crystal display device according to the second embodiment and the height H2 of the wall pixel electrodes SE in the liquid crystal display device according to the second embodiment. In the following, the structure of the liquid crystal display panel according to the second embodiment is described in detail in reference to FIGS. 12 and 13. Here, the curve G3 shows the measured value of the transmittance of a pixel when white is displayed in the case where the difference Hd between the height H2 of the wall pixel electrodes SE and the thickness H1 of the liquid crystal layer varies, and the curve G4 shows the measured value of the transmittance of a pixel when black is displayed in the case where the difference Hd between the height H2 of the wall pixel electrodes SE and the thickness H1 of the liquid crystal layer varies.

As is clear from the curve G3, in the liquid crystal display panel PNL according to the second embodiment, the height of the wall bases WL varies, that is to say, the height H2 of the wall pixel electrodes SE varies, and thus, it is possible to change the display properties during the driving for inverting the display pixel by pixel.

That is to say, the case where the difference Hd between the height H2 of the wall pixel electrodes SE and the thickness H1 of the liquid crystal layer is 0 μm corresponds to a case where the liquid crystal display device according to the first embodiment is driven by inverting the display pixel by pixel, and the transmittance when white is displayed in this case is approximately 74%. In contrast, in the case where a fourth insulating film IL4 is formed and the height H2 of the wall pixel electrodes SE is increased without changing the thickness H1 of the liquid crystal layer in the transmittance region, it has become clear that the transmittance when white is displayed increases as the difference Hd between the height H2 of the wall pixel electrodes SE and the thickness H1 of the liquid crystal layer increases. When Hd=0.5 μm, for example, the transmittance increases to approximately 82%, while when Hd=1.0 μm, it increases to 87%. In the case where Hd is increased more, the transmittance is approximately 89% when Hd is 2.0 μm or greater, and the transmittance stays approximately 89% even if Hd is further increased, and thus, an increase in the transmittance is saturated when Hd=2.0 μm.

Likewise, as is clear from the curve G4, in the case where the difference Hd between the height H2 of the wall pixel electrodes SE and the thickness H1 of the liquid crystal layer is 0 μm, the transmittance when black is displayed is approximately 0.43%. Meanwhile, when Hd=0.5 μm, the transmittance decreases to approximately 0.21%, while when Hd=1.0 μm, it decreases to 0.14%. In the case where Hd is further greater, the transmittance is approximately 0.08% when Hd is 2.0 μm or greater, and the transmittance stays at approximately 0.08% even if Hd is further increased, and thus, a decrease in the transmittance is saturated when Hd=2.0 μm.

Figure 14:
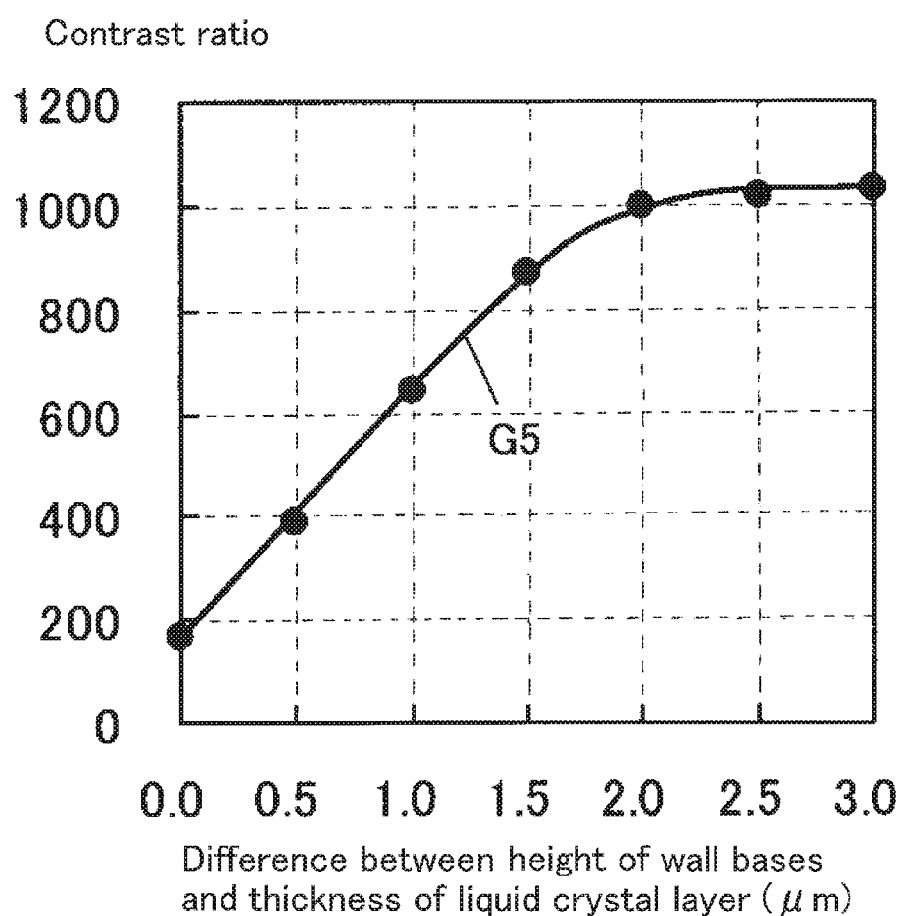
FIG. 14 is a graph showing the contrast ratio relative to the difference between the thickness of the liquid crystal layer and the height of the wall pixel electrodes when the liquid crystal display device according to the second embodiment of the present invention is operated so that each pixel is inverted.

FIG. 14 is a graph showing the contrast ratio at the time of driving for inverting the display pixel by pixel relative to the difference Hd (=H2−H1) between the thickness H1 of the liquid crystal layer and the height H2 of the wall pixel electrodes SE in the liquid crystal display device according to the second embodiment of the present invention, and in particular shows the contrast ratio found from the efficiency in the display mode when black is displayed (at the time of dark display) and when white is displayed (at the time of bright display) shown in FIG. 13. As is clear from the curve G5 in FIG. 14, in the case where the difference Hd between the height H2 of the wall pixel electrodes SE and the thickness H1 of the liquid crystal layer is 0 μm, the contrast ratio is approximately 170. The contrast ratio increases as the difference Hd increases such that the contrast ratio is 390 when Hd=0.5 μm, 650 when Hd=1.0 μm, 870 when Hd=1.5 μm, 1000 when Hd=2.0 μm, 1020 when Hd=2.5 μm, and 1030 when Hd=3.0 μm, respectively. Thus, in the liquid crystal display device according to the second embodiment, the contrast ratio increases as the difference Hd between the height H2 of the wall pixel electrodes SE and the thickness H1 of the liquid crystal layer increases, and then, the increase in the contrast ratio hits the ceiling when the difference Hd between the height H2 of the wall pixel electrodes SE and the thickness H1 of the liquid crystal layer is close to 2 μm, where the contrast ratio reaches to 1000:1.

The contrast ratio is calculated through the division of the transmittance for bright display (transmittance when white is displayed) by the transmittance for dark display (transmittance when black is displayed). In the liquid crystal display device according to the second embodiment, when the difference Hd between the height H2 of the wall pixel electrodes SE and the thickness H1 of the liquid crystal layer is close to 2 μm, the transmittance for dark display is sufficiently low and the transmittance for bright display is sufficiently high. Accordingly, in the structure according to the second embodiment, the fourth insulating film IL4 and the wall pixel electrodes SE are formed so that the difference Hd between the height H2 of the wall pixel electrodes SE and the thickness H1 of the liquid crystal layer is 2 μm or greater, and thus, sufficient effects of the present invention can be gained in order to gain a high contrast ratio. Therefore, in the liquid crystal display device according to the second embodiment, it is appropriate to form the fourth insulating film IL4 and the wall pixel electrodes SE so that the difference Hd between the height H2 of the wall pixel electrodes SE and the thickness H1 of the liquid crystal layer is 2 μm or greater.

Figure 17:
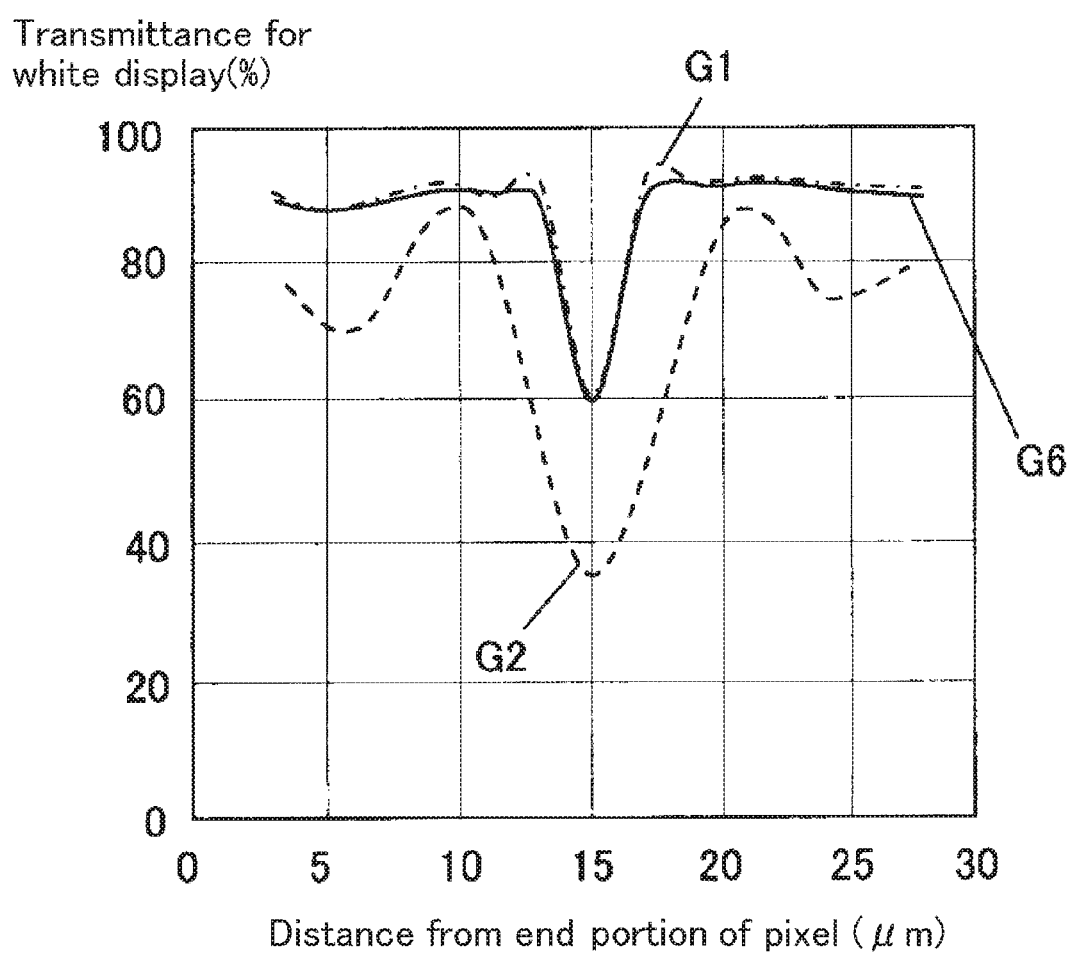
FIG. 17 is a graph showing the distribution of transmittance when the liquid crystal display device according to the second embodiment, where a wall base WL is formed so as to have a height 2 μm greater than the thickness of the liquid crystal layer LC, is operated so that each pixel is inverted, and white is displayed.

FIG. 17 is a graph showing the distribution of the transmittance when the wall bases WL are formed so as to be taller than the liquid crystal layer LC by 2 μm and white is displayed during the driving for inverting the display pixel by pixel in the liquid crystal display device according to the second embodiment. In particular, the curve G6 shown by a solid line shows the distribution of the transmittance when white is displayed during the driving for inverting the display pixel by pixel in the liquid crystal display device according to the second embodiment. The other curves G1 and G2 are shown for comparison, where the curve G1 shows the distribution of the transmittance when white is displayed during the driving for inverting the display column by column in the liquid crystal display device according to the first embodiment, and the curve G2 shows the distribution of the transmittance when white is displayed during the driving for inverting the display pixel by pixel in the liquid crystal display device according to the first embodiment.

As is clear from the curve G3, as in the liquid crystal display device according to the first embodiment, a uniform transmittance is gained in the portions other than the pseudo-wall common electrode structure. At this time, the transmittance can be as high as that in the distribution of the transmittance when white is displayed during the driving for inverting the display column by column in the liquid crystal display device according to the first embodiment as shown by the curve G1. That is to say, the fourth insulating film IL4 is formed so that the wall bases WL are taller than the liquid crystal layer LC by 2 μm in the liquid crystal display device according to the second embodiment, and thus, the potential can be completely blocked between adjacent pixels during the driving for inverting the display pixel by pixel.

Meanwhile, in the case where white is displayed in pixels adjacent to each other during the driving for inverting the display pixel by pixel in the liquid crystal display device according to the first embodiment, as is clear from the curve G2, the transmittance is low in the vicinity of the pseudo-wall common electrode, and in addition, the transmittance is not constant even in the portions other than the pseudo-wall common electrode, and in particular, the transmittance is low in the vicinity of the wall pixel electrodes SE.

Figure 15:
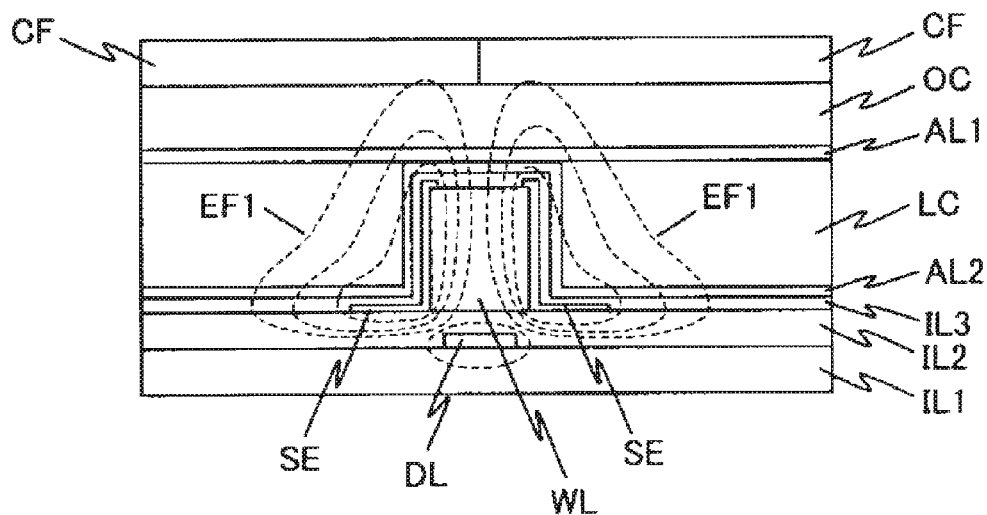
FIG. 15 is a diagram showing the distribution of equipotential surfaces in the vicinity of a wall pixel electrode in the case where a pixel and its adjacent pixel both display white when the liquid crystal display device according to the first embodiment is operated so that each pixel is inverted.

FIG. 15 shows the distribution of equipotential surfaces in the vicinity of a wall pixel electrode SE at this time, where the number of equipotential surfaces during the driving for inverting the display pixel by pixel is greater than the number of equipotential surfaces in a pixel when white is displayed during the driving for inverting the display column by column shown in FIG. 9. That is to say, though the number of equipotential surfaces in a pixel when white is displayed is still 3 in the distribution of equipotential surfaces shown in FIG. 15, the number of equipotential surfaces in its adjacent pixel when black is displayed has increased from 1 to 3. In addition, as is clear from FIG. 15, the distribution of equipotential surfaces EF1 in a pixel when white is displayed is biased towards the wall structure WL side as compared to that during the driving for inverting the display column by column shown in FIG. 9, that is to say, the equipotential surfaces EF1 are localized in the vicinity of the wall pixel electrode SE. This is caused by the fact that the distance between the equipotential surfaces becomes smaller due to the difference in the potential that is approximately two times greater than that during the driving for inverting the display column by column within the wall base WL, and the distribution is biased towards the wall pixel electrode SE (wall base WL) side with the distance between the equipotential surfaces EF1 in the distribution shrinking in the liquid crystal layer LC. Judging from the above, it is possible for the reduction in the transmittance in the vicinity of the pseudo-wall common electrode as shown by the curve G6 during the driving for inverting the display pixel by pixel in the liquid crystal display device according to the first embodiment to be caused by the facts that the distribution in the intensity of the electrical field within pixels becomes uneven due to the effects of the potential in adjacent pixels, the liquid crystal molecules LCM in the liquid crystal layer LC cannot be sufficiently driven, and the transmittance in different portions within a pixel does not take the maximum value for the same voltage. As a result, a sufficiently high transmittance cannot be gained when white is displayed during the driving for inverting the display pixel by pixel in the liquid crystal display device according to the first embodiment, and thus, the transmittance when white is displayed has decreased to 75% and the transmittance when black is displayed with the adjacent pixels displaying white ends up increasing to 0.43%.

Figure 16:
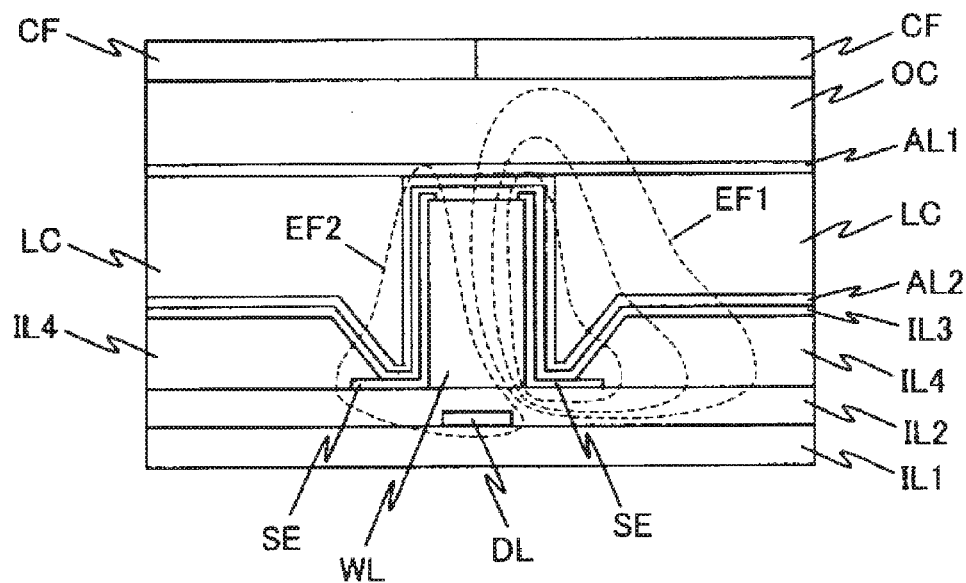
FIG. 16 is a diagram showing the distribution of equipotential surfaces in the vicinity of a wall pixel electrode in the case where a pixel displays white and its adjacent pixel displays black when the liquid crystal display device according to the second embodiment is operated so that each pixel is inverted.

In contrast, as shown in FIG. 12, the equipotential surfaces EF1 when white is displayed are spread within the liquid crystal layer LC to the same extent as those in a pixel when white is displayed shown in FIG. 9 (on the right side in the figure) in the liquid crystal display device according to the second embodiment, and thus, it can be seen that a uniform distribution of an electrical field is gained. In the case where black is displayed in the pixel on the left side in the figure, and at the same time, white is displayed in the pixel on the right side in the figure, as shown in FIG. 16, the equipotential surfaces EF2 in the black displaying pixel, which are equipotential surfaces within the pixel, having the distribution of equipotential surfaces in the vicinity of a wall base WL are spread to the vicinity of the wall pixel electrode SE to the same extent as the above-described distribution of the equipotential surfaces shown in FIG. 9 in the first embodiment. In addition, the equipotential surfaces EF1 of the white displaying pixel are also distributed, spreading into the liquid crystal layer LC to the same extent as the equipotential surfaces EF1 shown in FIG. 9. As a result, even in the case where a black displaying pixel and a white displaying pixel are adjacent to each other during the driving for inverting the display pixel by pixel in the liquid crystal display panel PNL according to the second embodiment, the transmittance when white is displayed can be increased.

As described above, in the liquid crystal display device according to the second embodiment, one pixel is formed of two or more inclining pixel regions, wall pixel electrodes SE are placed in peripheral portions of the pixel, a pseudo-wall common electrode is provided within the transmittance region between the wall pixel electrodes SE, and a fourth insulating film IL4 is formed within the transmittance region so that the height H2 of the wall pixel electrodes SE is greater than the thickness H1 of the liquid crystal layer. As a result, it is possible to widen the distribution of the equipotential surfaces in the liquid crystal layer even in the case where wall pixel electrodes SE for adjacent pixels are formed on one wall base WL so that a video signal can be supplied to adjacent wall pixel electrodes SE in the driving mode for inverting the display pixel by pixel, and thus, special effects where the transmittance can be increased when white is displayed and when black is displayed can be gained in addition to the above-described effects of the liquid crystal display device according to the first embodiment.

Thus, in the liquid crystal display device according to the second embodiment, at least the fourth insulating film IL4 is formed so as to have a great thickness so that the height of the wall pixel electrodes SE is greater than the thickness of the liquid crystal layer LC for the purpose of increasing the transmittance during the driving for inverting the display pixel by pixel. Furthermore, the thickness of the liquid crystal display panel according to the second embodiment is greater than the thickness of the liquid crystal display panel according to the first embodiment, and thus, the thickness of the liquid crystal layer according to the second embodiment is the same as the thickness of the liquid crystal layer according to the first embodiment.

Third Embodiment

Figure 18:
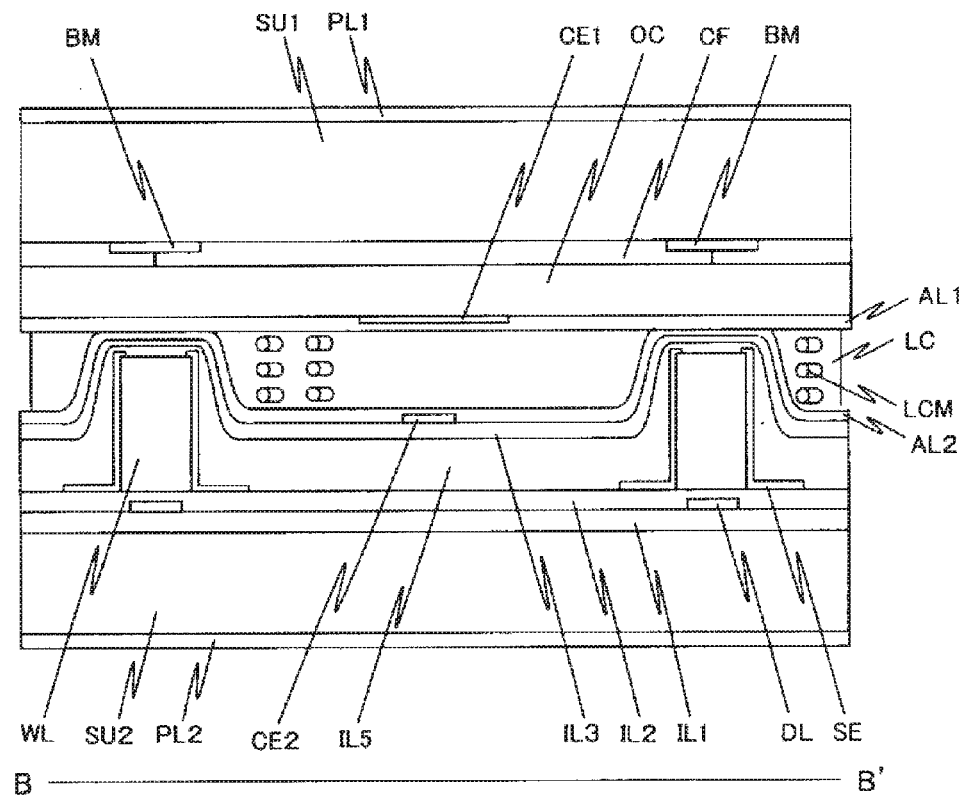
FIG. 18 is a cross-sectional diagram for illustrating the structure of a pixel in the liquid crystal display device according to the third embodiment of the present invention.

FIG. 18 is a cross-sectional diagram for illustrating the structure of a pixel in the liquid crystal display device according to the third embodiment of the present invention. The liquid crystal display device according to the third embodiment has the same structure as the liquid crystal display device according to the second embodiment, except the structure of the fifth insulating film IL5 formed between wall pixel electrodes SE that are placed in periphery portions of the pixel so as to face each other. Accordingly, in the following, the fifth insulating film IL5 is described in detail.

As shown in FIG. 18, in the liquid crystal display device according to the third embodiment, the first substrate SU1 has the same structure as that in the first embodiment. The second substrate SU2 has a first insulating film IL1, drain lines DL, a second insulating film IL2, wall bases WL and wall pixel electrodes SE formed in this order on the surface on the liquid crystal side. Here, in the liquid crystal display panel PNL according to the third embodiment, a fifth insulating film (second insulating thick film) IL5 is formed on the entire surface of the second substrate SU2 so as to cover the wall bases WL and the wall pixel electrodes SE, and a third insulating film IL3 is formed on the entire surface of the second substrate SU2 in a layer above the fifth insulating film IL5. Second common electrodes CE2 that form a pseudo-wall common electrode are formed in a layer above the third insulating film IL3, and a second alignment film AL2 is formed on the entire surface of the second substrate SU2 so as to cover the second common electrodes CE2.

In the liquid crystal display panel PNL according to the third embodiment, the film thickness of the fifth insulating film IL5 formed on the entire surface of the second substrate SU2 is different between the transmission region and the regions excluding this transmission region. In addition, as in the above-described liquid crystal display panel PNL according to the second embodiment, the film thickness of the fifth insulating film IL5 is 2.0 µM in the transmission region according to the third embodiment. Here, the film thickness of the fifth insulating film IL5 may be 2.0 µm or greater for the same reasons as in the liquid crystal display device according to the second embodiment.

The fifth insulating film IL5 having the above-described structure can be formed by forming wall pixel electrodes SE after the formation of wall bases WL, and then applying an organic insulating film material, such as of an organic resist having a low viscosity, to the entire surface of the second substrate SU2, which is then hardened. That is to say, when an organic resist having a low viscosity is used, the organic resist applied to the second substrate SU2 using a spin coater or a slit coater flows after the application, and thus has such a distribution in the thickness where the thickness is small in high portions and the thickness is great in low portions. Accordingly, in the structure where wall pixel electrodes SE are formed on the sides of wall bases WL that are provided and stand on the second substrate SU2 on the liquid crystal side as that of the liquid crystal display panel PNL according to the present invention, the film thickness of the fifth insulating film IL5 is very great so as to be approximately equal to the height of the wall bases WL due to the surface tense of the organic resist when being applied in the vicinity of the places where a wall pixel electrode SE is formed and is flat and uniform (2 µm, for example) in the transmission region, which is a region away from the wall pixel electrodes SE. Furthermore, the film is formed so as to be as thin as other insulating films on the top surface of the wall bases WL. Thus, in the liquid crystal display panel PNL according to the third embodiment, the fifth insulating film IL5 can be formed in a desired location only through the processes for applying and curing an organic insulating film material having a low viscosity, and therefore, it is possible to do without the steps required for patterning. As a result, special effects can be gained such that the process for manufacturing the second substrate SU2 or the liquid crystal display device can be simplified and the cost for manufacture can be reduced.

Here, the fifth insulating film IL5 formed on the outside of the display region AR or the alignment film AL2 may be omitted in the structure in order to increase the performance of the sealing material for pasting the first substrate SU1 and the second substrate SU2 together.

As described above, in the liquid crystal display device according to the third embodiment, wall pixel electrodes for adjacent pixels are respectively formed along and close to the periphery portions within a pixel that run in the longitudinal direction, and at the same time, a pseudo-wall common electrode is formed within the transmission region between the pair of wall pixel electrodes, and in addition, an organic insulating film material having a low viscosity is applied to the entire surface of the second substrate, including the transmission region, and is cured so that the fifth insulating film IL5 is formed, and thus, the height of the wall pixel electrodes SE is greater than the thickness of the liquid crystal layer in the structure. As a result, special effects can be gained such that the process required for the formation of the fifth insulating film IL5, which is an insulating film formed within the transmission region between a pair of wall pixel electrodes, can be simplified in addition to the above-described effects of the liquid crystal display device according to the second embodiment.

Fourth Embodiment

Figure 19:
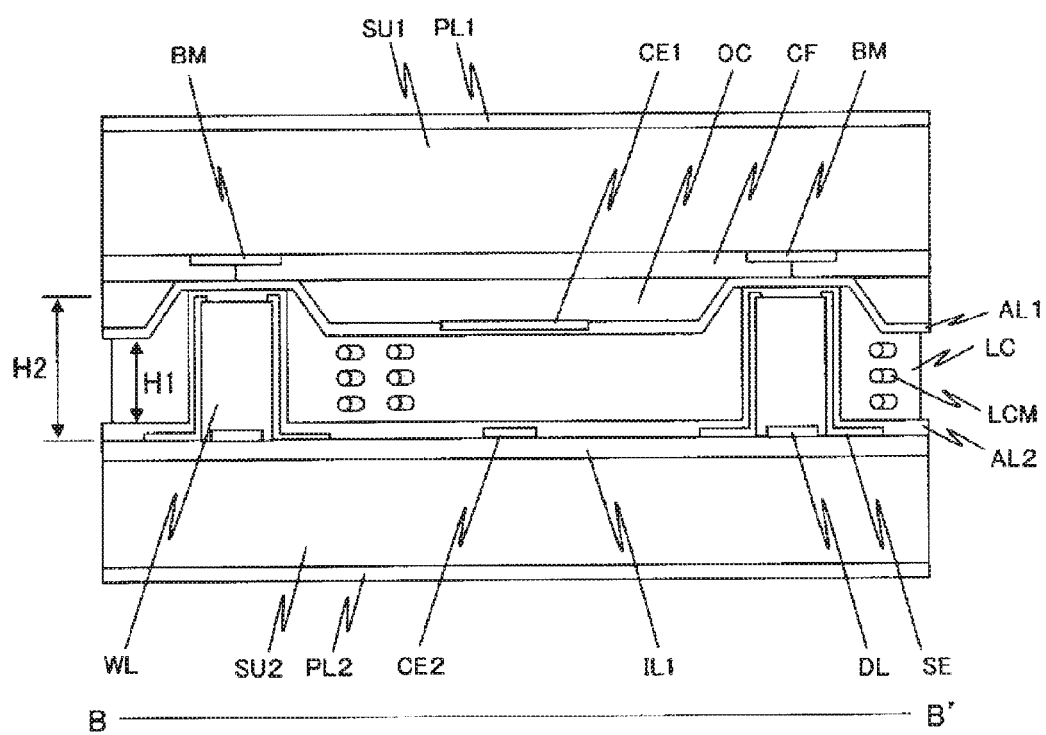
FIG. 19 is a cross-sectional diagram for illustrating the structure of a pixel in the liquid crystal display device according to the fourth embodiment of the present invention.

FIG. 19 is a cross-sectional diagram for illustrating the structure of a pixel in the liquid crystal display device according to the fourth embodiment of the present invention. Here, the liquid crystal display device according to the fourth embodiment has the same structure as the liquid crystal display device according to the first embodiment, except the structure where an overcoat layer OC formed on the first substrate SU1 is used as an insulating film layer for adjusting the thickness of the liquid crystal layer in the transmission region of each pixel as well as the height of the wall pixel electrodes SE. Accordingly, in the following, the structure of the first substrate SU1 is described in detail.

As shown in FIG. 19, a black matrix BM is formed on the first substrate SU1 on the liquid crystal side according to the fourth embodiment in such locations as to face the border portions between adjacent pixels, and color filters CF are formed so as to cover the black matrix BM. This structure allows the color filters CF to correspond to either of the colors RGB, and color filters CF of either of RGB are adjacent to each other across the regions that overlap the black matrix BM.

In addition, an overcoat layer OC is formed in a layer above the color filters CF. This structure according to the fourth embodiment allows the overcoat layer OC to have recesses (second trenches) created along regions facing the wall bases WL. That is to say, the overcoat film OC is patterned so that the portions facing the wall bases WL are removed from the overcoat film OC, and thus, recesses are created in the first substrate SU1 on the liquid crystal side as through holes in the overcoat layer OC. A first alignment film AL1 is formed on the entire surface of the first substrate SU1 so as to cover the overcoat layer OC and the portions removed from the overcoat layer OC (recesses) in a layer above the overcoat layer OC.

Meanwhile, a first insulating film IL1 is formed on the second substrate SU2 on the liquid crystal side so as to function as a gate insulating film formed between gate electrodes (gate lines), not shown, formed on the surface of the second substrate SU2 and a semiconductor layer for thin film transistors, not shown. Second common electrodes CE2 and drain lines DL are formed in a layer above the first insulating film ILL and in particular, the second common electrodes CE2 and the drain lines DL are formed in the same layer in the liquid crystal display panel PNL according to the fourth embodiment.

In addition, wall bases WL are formed so as to cross the drain lines DL in a layer above the drain lines DL as in the above-described structures in the first to third embodiments. Vertical portions VP for forming a wall pixel electrode SE are formed on the sidewalls of each wall base WL, flat portions FP are formed on the upper surface of the first insulating film IL1 on the lower end side of the vertical portions VP, and top portions TP are formed on the top surface of the wall bases WL on the upper end side of the vertical portions VP. In the liquid crystal display panel PNL according to the fourth embodiment, the wall bases WL are formed so as to have a height H2 that is greater than the thickness H1 of the liquid crystal layer LC as in the above-described liquid crystal display panel PNL according to the second and third embodiments. That is to say, in the liquid crystal display panel PNL according to the fourth embodiment, the wall bases WL are formed on top of the insulating film in a layer beneath the drain lines DL (first insulating film IL1 according to the fourth embodiment) as in the first embodiment, and the height H2 of the wall bases WL is preset to be greater than the thickness H1 of the liquid crystal layer.

A second alignment film AL2 is formed on the entire surface of the second substrate SU2 so as to cover the wall pixel electrodes SE and the second common electrodes CE2 in a layer above these wall pixel electrodes SE. This second alignment film AL2 controls the initial alignment of the liquid crystal molecules LCM in the liquid crystal layer LC.

In the liquid crystal display panel PNL according to the fourth embodiment having this structure, when the first substrate SU1 and the second substrate SU2 are pasted together, the top portions TP of the wall pixel electrodes SE make contact with or are in the proximity to the bottom portions of the recesses created in the overcoat layer OC. As a result of the combination that makes the top portions of the wall bases WL to be in proximity to the portions where there is no overcoat layer OC, the wall bases WL are taller than the thickness H1 of the liquid crystal layer by the thickness of the overcoat layer OC. As a result, in the liquid crystal display panel PNL according to the fourth embodiment, the thickness of the liquid crystal layer LC within the transmission regions of the pixels is also H1, and the liquid crystal molecules LCM can be driven by an electrical field applied from the wall pixel electrodes SE having a height H2 that is greater than the thickness H1 of the liquid crystal layer.

Here, the manufacturing process for the second substrate SU2 where various wires, such as drain lines DL and gate lines GL, and wall pixel electrodes SE are formed is more complex than that for the first substrate SU1. In contrast, in the liquid crystal display device according to the fourth embodiment, recesses into which wall pixel electrodes SE are put are created in the first substrate SU1 so that the height H2 of the wall electrodes is greater than the thickness H1 of the liquid crystal layer. Accordingly, in the liquid crystal display device according to the fourth embodiment, the number of steps required for the manufacture of the second substrate SU2 can be reduced, and thus, special effects can be gained such that the manufacturing process can be simplified.

Figure 20:
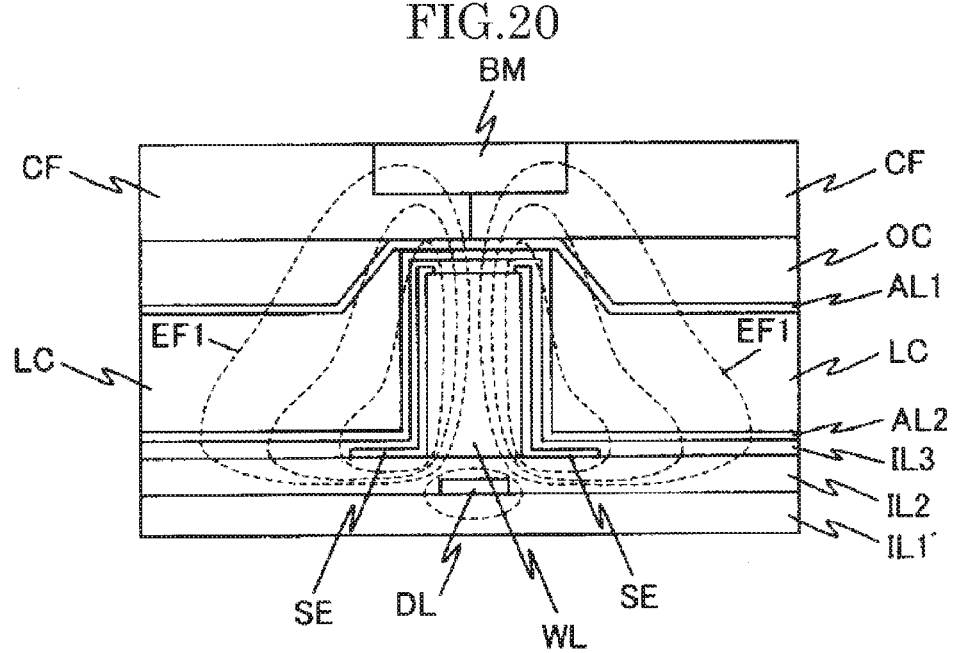
FIG. 20 is a diagram for illustrating the distribution of equipotential surfaces in the vicinity of a wall base in the case where the difference in the potential between adjacent pixels becomes maximum when the liquid crystal display device according to the fourth embodiment of the present invention is operated so that each pixel is inverted.
Figure 21:
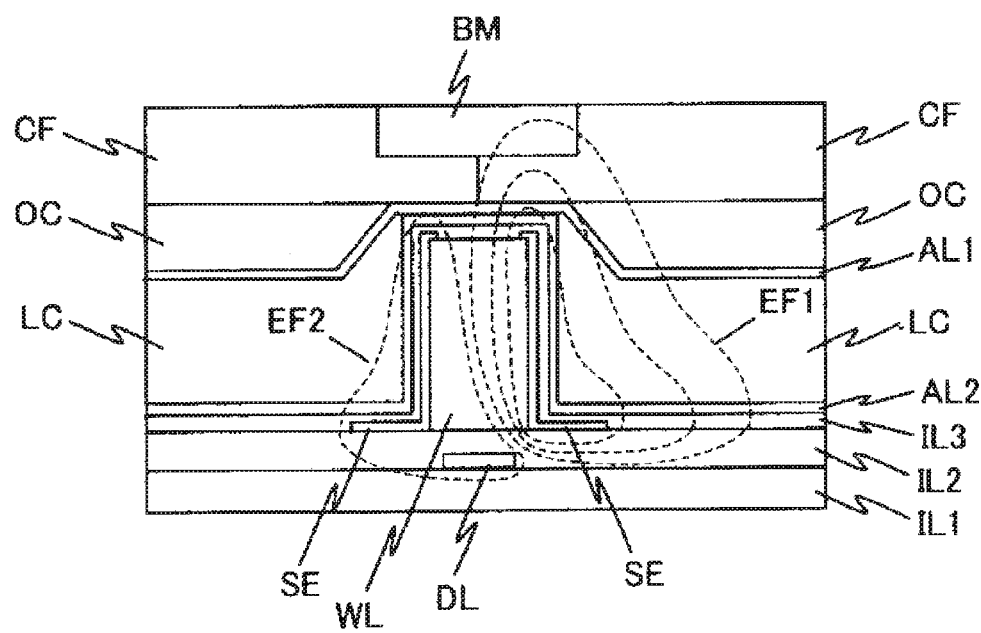
FIG. 21 is a diagram for illustrating the distribution of equipotential surfaces in the vicinity of a wall base in the case where a pixel displaying white and a pixel displaying black are adjacent to each other when the liquid crystal display device according to the fourth embodiment of the present invention is operated so that each pixel is inverted.

Next, FIG. 20 is a diagram for illustrating the distribution of equipotential surfaces in the vicinity of a wall base in the case where the difference in the potential between adjacent pixels becomes maximum during the driving for inverting the display pixel by pixel in the liquid crystal display device according to the fourth embodiment of the present invention, and FIG. 21 is a diagram for illustrating the distribution of equipotential surfaces in the vicinity of a wall base in the case where a pixel displaying white and a pixel displaying black are adjacent to each other during the driving for inverting the display pixel by pixel in the liquid crystal display device according to the fourth embodiment of the present invention. In the following, the display operation using the structure of the wall pixel electrodes SE according to the fourth embodiment is described in reference to FIGS. 20 and 21. Here, the distribution of the equipotential surfaces shown in FIGS. 20 and 21 is the distribution of equipotential surfaces when Hd=H2−H1=2.0 μm as in the second and third embodiments.

As is clear from FIG. 20, even in the case where the difference in the potential between adjacent pixels is maximum, that is to say, in the case where the pixel on the right side in FIG. 20 and its adjacent pixel on the left side both display white, the equipotential surfaces EF1, which distribute around a pixel or its adjacent pixel, respectively, spread widely towards the pseudo-wall common electrodes formed at the center of the pixels from the wall pixel electrodes SE that face each other with one wall base WL in between. That is to say, the equipotential surfaces EF1 spread to the vicinity of the wall pixel electrodes SE to the same extent as the equipotential surface EF1 for the pixel displaying white shown in FIG. 9 in the first embodiment, and therefore, a uniform electrical field (lateral electrical field) can be applied to the liquid crystal layer LC, and the transmittance can be increased in the same manner as in the second and third embodiments.

As shown in FIG. 21, in the distribution of equipotential surfaces in the case where a pixel displays white and its adjacent pixel displays black during the driving for inverting the display pixel by pixel, an equipotential surface EF2 is generated so as to surround the drain line DL and the wall pixel electrode SE in the adjacent pixel displaying black. Here, the equipotential surface EF2 is localized in the vicinity of the wall pixel electrode SE and the transmittance for black lowers (improvement). Meanwhile, in the pixel displaying white, the equipotential surface EF1 is distributed widely towards the pseudo-wall common electrode formed in the center portion of the pixel from the wall pixel electrode SE, and therefore, the transmittance for white increases (improvement).

Figure 22:
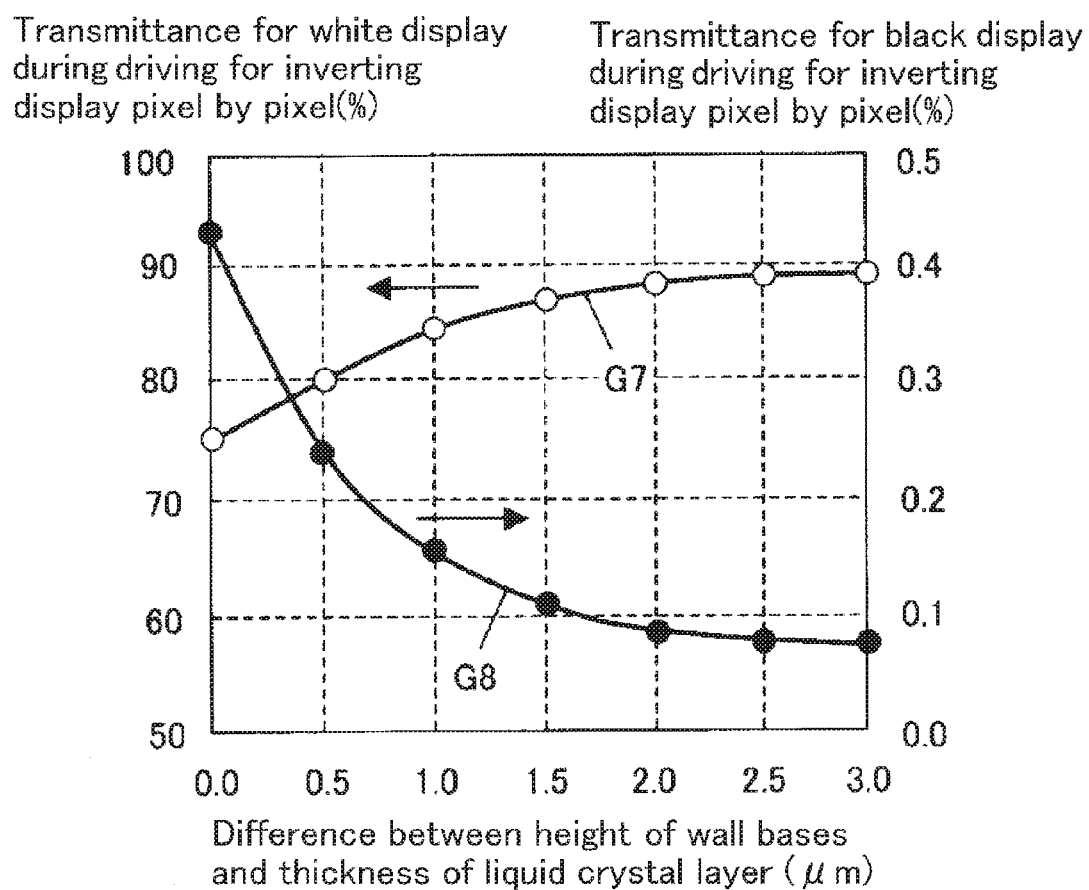
FIG. 22 is a graph showing the difference between the thickness of the liquid crystal layer and the height of the wall pixel electrodes and the results of measurement of the transmittance when white is displayed and the transmittance when black is displayed when the liquid crystal display device according to the fourth embodiment of the present invention is operated so that each pixel is inverted.

Next, FIG. 22 is a graph showing the results of measurement of the transmittance when white is displayed and the transmittance when black is displayed during the driving for inverting the display pixel by pixel relative to the difference Hd (=H2−H1) between the thickness H1 of the liquid crystal layer and the height H2 of the wall pixel electrodes SE in the liquid crystal display device according to the fourth embodiment of the present invention. In the following, the relationship between the transmittance and the difference Hd between the thickness H1 of the liquid crystal layer and the height H2 of the wall pixel electrodes SE in the liquid crystal display panel according to the fourth embodiment is described in reference to FIG. 22. Here, the curve G7 shows the measured value of the transmittance of a pixel displaying white in the case where the difference Hd between the height H2 of the wall pixel electrodes SE and the thickness H1 of the liquid crystal layer varies, and the curve G8 shows the measured value of the transmittance of a pixel displaying black in the case where the difference Hd between the height H2 of the wall pixel electrodes SE and the thickness H1 of the liquid crystal layer varies.

As is clear from the curve G7, in the liquid crystal display panel PNL according to the fourth embodiment as well, it is possible to improve the display properties for the driving for inverting the display pixel by pixel by changing the height of the wall bases WL, that is to say, by changing the height H2 of the wall pixel electrodes SE.

A case where the difference Hd between the height H2 of the wall pixel electrodes SE and the thickness H1 of the liquid crystal layer is 0 μm corresponds to a case where the driving for inverting the display pixel by pixel is carried out in the liquid crystal display device according to the first embodiment, and the transmittance when white is displayed is approximately 74%. In contrast, in the case where recesses are provided in the portions of the overcoat layer OC that face the wall pixel electrodes SE or the wall bases WL, and at the same time, the height H2 of the wall pixel electrodes SE is made greater than the thickness H1 of the liquid crystal layer so that the height H2 of the wall pixel electrodes SE is increased without changing the thickness H1 of the liquid crystal layer in the transmission regions, it has become clear that the transmittance when white is displayed increases (improvement) as the difference Hd between the height H2 of the wall pixel electrodes and the thickness H1 of the liquid crystal layer increases. When Hd=0.5 for example, the transmittance increases to approximately 80%, and when Hd=1.0 μm, Hd=1.5 μm, Hd=2.0 μm, Hd=2.5 μm and Hd=3.0 μm, the transmittance increases to 84%, 87%, 88%, 89% and 89%, respectively.

Likewise, as is clear from the curve G8, in the case where the difference Hd between the height H2 of the wall pixel electrodes SE and the thickness H1 of the liquid crystal layer is 0 μm, the transmittance when black is displayed is approximately 0.43%. When Hd=0.5 μm, the transmittance is decreased (improvement) to approximately 0.23%, and when Hd=1.0 μm, Hd=1.5 Hd=2.0 μm, Hd=2.5 μm and Hd=3.0 μm, the transmittance is decreased to 0.16%, 0.11%, 0.09%, 0.08% and 0.08%, respectively.

Figure 23:
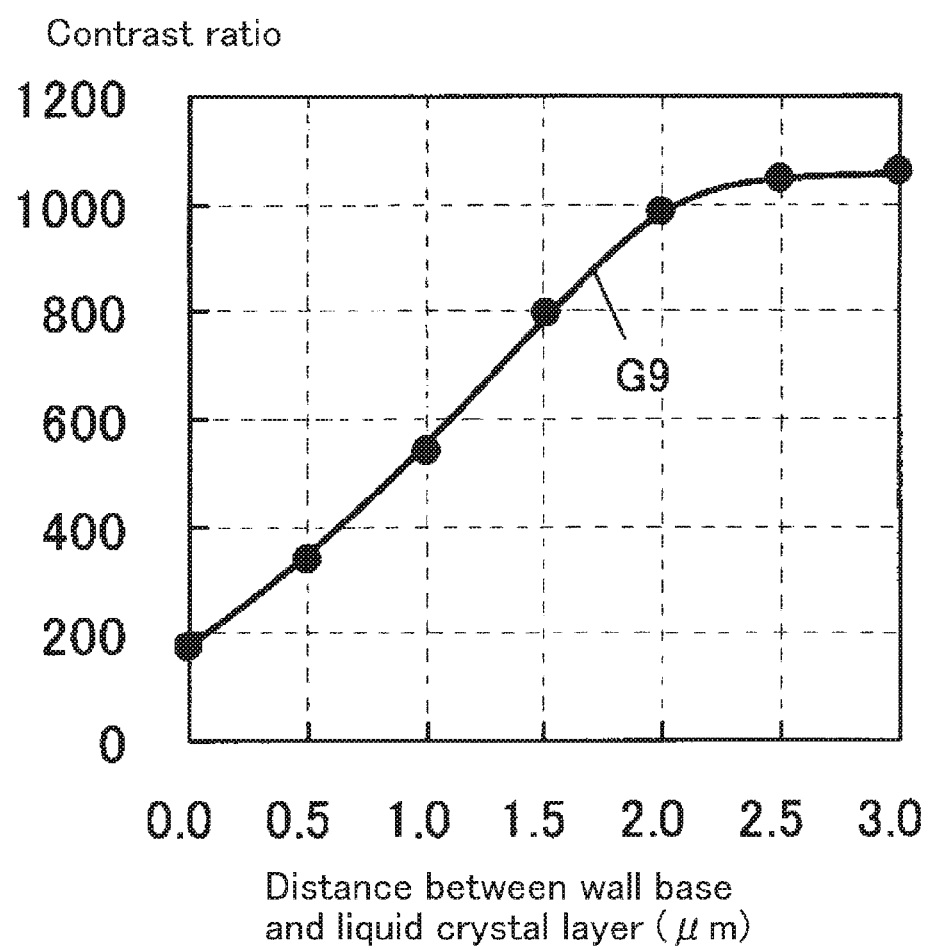
FIG. 23 is a graph showing the contrast ratio relative to the difference between the thickness of the liquid crystal layer and the height of the wall pixel electrodes when the liquid crystal display device according to the fourth embodiment of the present invention is operated so that each pixel is inverted.

FIG. 23 is a graph showing the contrast ratio during the driving for inverting the display pixel by pixel relative to the difference Hd (=H2−H1) between the thickness H1 of the liquid crystal layer and the height H2 of the wall pixel electrodes SE in the liquid crystal display device according to the fourth embodiment of the present invention. Here, FIG. 23 shows the contrast ratio found from the efficiency in the display mode when black is displayed (at the time of dark display) and when white is displayed (at the time of bright display) shown in FIG. 22.

As is clear from the curve G9 in FIG. 23, in the case where the difference Hd between the height H2 of the wall pixel electrodes SE and the thickness H1 of the liquid crystal layer is 0 μm, the contrast ratio is approximately 180. In contrast, when Hd=0.5 μm, the contrast ratio increases to 340, and when Hd=1.0 μm, Hd=1.5 μm, Hd=2.0 μm, Hd=2.5 μm and Hd=3.0 μm, the contrast ratio increases to 540, 800, 990, 1040 and 1050, respectively. Thus, in the liquid crystal display device according to the fourth embodiment as well, the contrast ratio increases as the difference Hd between the height H2 of the wall pixel electrodes SE and the thickness H1 of the liquid crystal layer increases, but the increase in the contrast ratio hits the ceiling when the difference Hd between the height H2 of the wall pixel electrodes SE and the thickness H1 of the liquid crystal layer is 2 μm or greater, where the contrast ratio reaches to approximately 1000:1.

Accordingly, in the liquid crystal display device according to the fourth embodiment as well, the overcoat layer OC and the wall pixel electrodes SE can be formed so that the difference Hd between the height H2 of the wall pixel electrodes SE and the thickness H1 of the liquid crystal layer is 2 μm or greater, and as a result, the effects of the present invention can be sufficiently gained and a high contrast ratio can be achieved. Therefore, in the liquid crystal display device according to the fourth embodiment, it is appropriate to form the overcoat layer OC and the wall pixel electrodes SE so that the difference Hd between the height H2 of the wall pixel electrodes SE and the thickness H1 of the liquid crystal layer is 2 μm or greater.

Thus, in the liquid crystal display panel PNL according to the fourth embodiment, the overcoat layer OC and the wall pixel electrodes SE can be formed so that the height H2 of the wall pixel electrodes SE is greater than the thickness H1 of the liquid crystal layer by 2.0 μm or greater, as in the liquid crystal display panel PNL according to the first embodiment, and thus, the transmittance for white and the transmittance for black can both be increased. That is to say, it is possible for the potential in a pixel made by the wall pixel electrode SE corresponding to its adjacent pixel provided on the same wall base WL to be effectively blocked in the structure according to the fourth embodiment as well.

Though the liquid crystal display device according to the fourth embodiment has such a structure that the recesses provided in the first substrate SU1 make the height H2 of the wall pixel electrodes SE greater than the thickness H1 of the liquid crystal layer, the invention is not limited to this. Other examples of the structure may be combinations of the first substrate SU1 according to the fourth embodiment and the second substrate SU2 according to the second or third embodiment. In these cases, special effects can be gained such that the fourth insulating film IL4 or the fifth insulating film IL5 can be formed so as to be thin, and at the same time, recesses can be created in the overcoat layer OC so as to be shallow.

Fifth Embodiment

Figure 24:
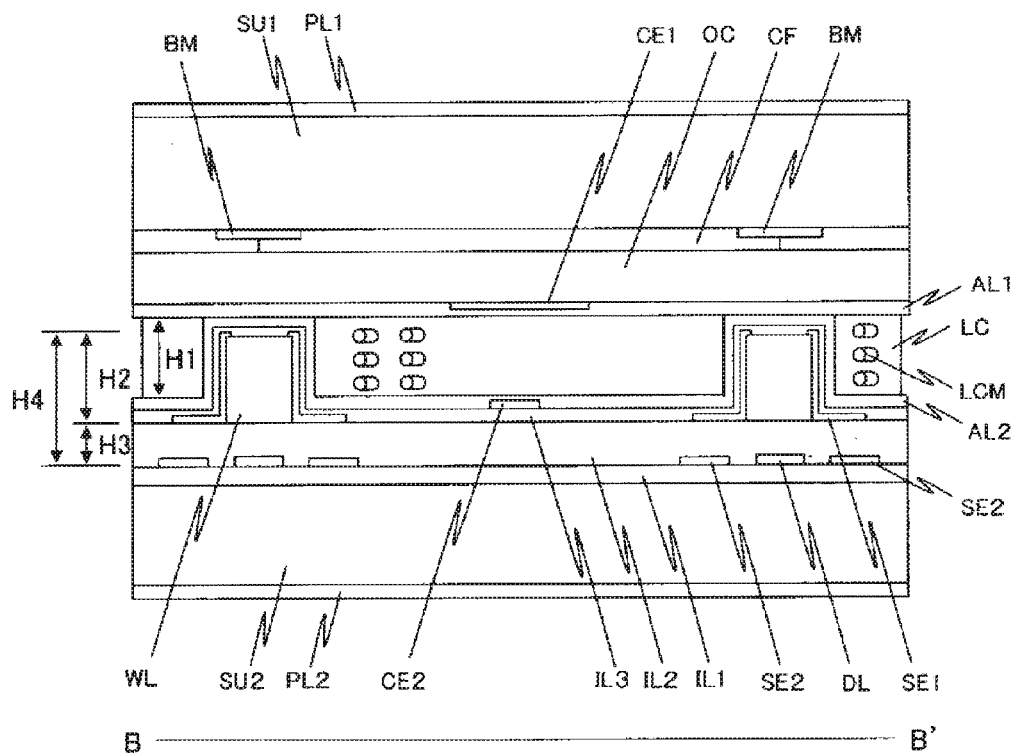
FIG. 24 is a cross-sectional diagram for illustrating the structure of a pixel in the liquid crystal display device according to the fifth embodiment of the present invention.

FIG. 24 is a cross-sectional diagram for illustrating the structure of a pixel in the liquid crystal display device according to the fifth embodiment of the present invention. Here, the liquid crystal display device according to the fifth embodiment has the same structure as the liquid crystal display device according to the first embodiment, except that the pixel electrodes formed on the second substrate SU2 are made of a wall pixel electrode SE1, which is a pixel electrode in wall form, and a linear pixel electrode SE2, which is a pixel electrode in linear form. Accordingly, in the following, the wall pixel electrodes SE1 and the linear pixel electrodes SE2 are described in detail.

As shown in FIG. 24, a first insulating film IL1 is formed on the entire surface of the first substrate SU1 on the liquid crystal side in the fifth embodiment, and drain lines DL and linear pixel electrodes (third electrodes) SE2 are formed in proximity in a layer above the first insulating film IL1. In particular, in the fifth embodiment, the linear pixel electrodes (second pixel electrodes) SE2 are provided in a layer beneath the wall pixel electrodes (first pixel electrodes) SE1, and this structure allows the respective linear pixel electrodes SE2 of adjacent pixels to sandwich one drain line DL. That is to say, one drain line DL is provided between two linear pixel electrodes SE2 in the structure. Here, the wall pixel electrode SE1 and the linear pixel electrode SE2 in a pixel are both electrically connected to the source electrode of the thin film transistor in the pixel so that the linear pixel electrode SE2 is at the same potential as the wall pixel electrode SE1, and the structure allows them to be supplied with the same video signal.

As in the first embodiment, a second insulating film IL2 is formed on the entire surface of the second substrate SU2 so as to cover the drain lines DL and the linear pixel electrodes SE2 in a layer above the drain lines DL and the linear pixel electrodes SE2. Here, in the liquid crystal display panel PNL according to the fifth embodiment, it is preferable for the thickness of the second insulating film IL2 in the fifth embodiment to be greater than the thickness of the second insulating film IL2 in the first embodiment.

Wall bases WL and wall pixel electrodes SE are formed in a layer above the second insulating film IL2 and are covered by a third insulating film IL3 formed on the entire surface of the second substrate SU2. Second common electrodes CE2 are formed in a layer above the third insulating film IL3, and a second alignment film AL2 is formed on the upper surface of the second common electrodes CE2. In addition, a second polarizing plate PL2 is provided on the rear surface of the second substrate SU2, that is to say, on the surface illuminated with backlight.

Meanwhile, the structure of the first substrate SU1 is the same as in the first embodiment, and a black matrix BM, color filters CF, an overcoat layer OC, first common electrodes CE1 and a first alignment film AL1 are formed in this order on the first substrate SU1 on the liquid crystal side.

Figure 25:
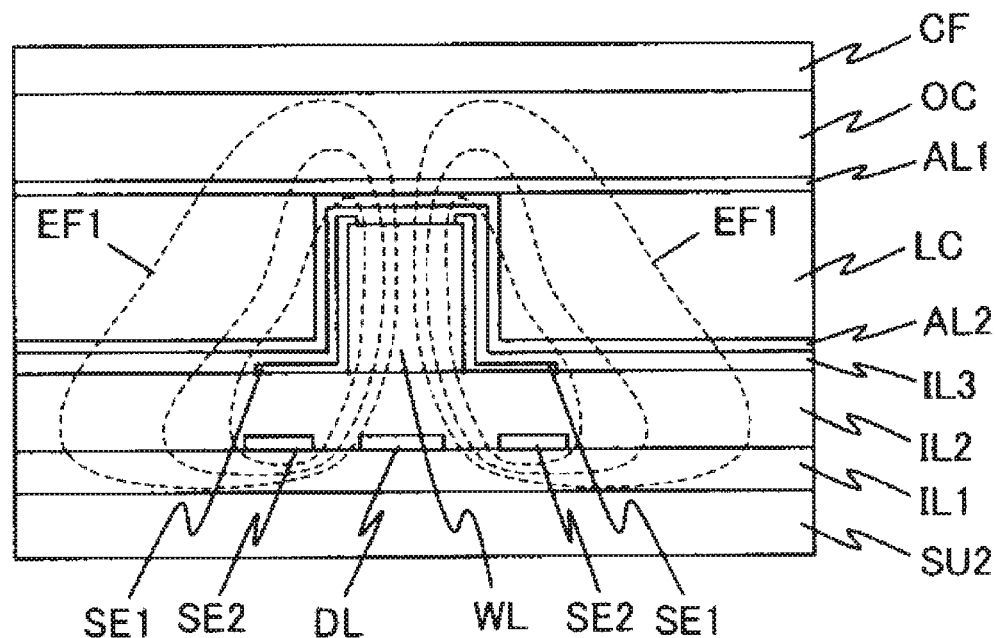
FIG. 25 is a diagram showing the distribution of equipotential surfaces in the vicinity of a wall pixel electrode when the liquid crystal display device according to the fifth embodiment of the present invention is operated so that each pixel is inverted.
Figure 26:
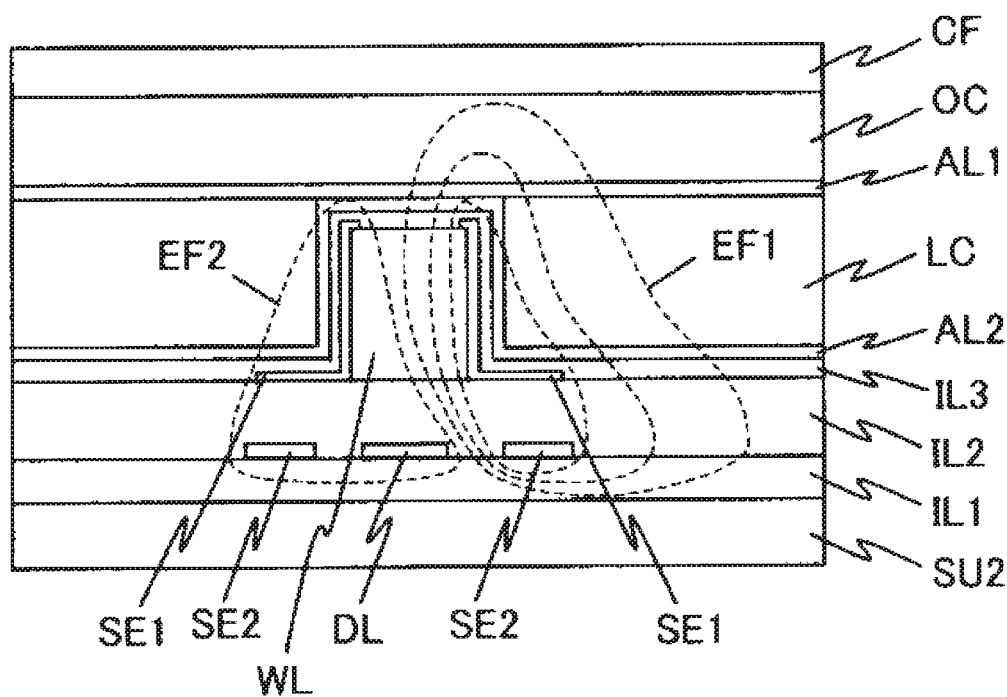
FIG. 26 is a diagram showing the distribution of equipotential surfaces in the vicinity of a wall pixel electrode when the liquid crystal display device according to the fifth embodiment of the present invention is operated so that each pixel is inverted.

Next, FIGS. 25 and 26 are diagrams showing the distribution of equipotential surfaces in the vicinity of a wall pixel electrode in the liquid crystal display device according to the fifth embodiment of the present invention during the driving for inverting the display pixel by pixel, and in reference to these, the operation of the liquid crystal display device according to the fifth embodiment is described. Here, FIG. 25 is a diagram showing the distribution of equipotential surfaces in the case where a pixel on the right side in the figure and its adjacent pixel on the left side in the figure both display white, and FIG. 26 is a diagram showing the distribution of equipotential surfaces in the case where a pixel displays white and its adjacent pixel displays black.

As is clear from FIG. 25, in the liquid crystal display panel according to the fifth embodiment, equipotential surfaces EF1 are created so as to surround the wall pixel electrodes SE1 and the linear pixel electrodes SE2 when a video signal is applied to the wall pixel electrodes SE1 and the linear pixel electrodes SE2. Here, the linear pixel electrodes SE2 are formed in a layer closer to the substrate than the flat portions HP of the wall pixel electrodes SE1 formed on the substrate (second substrate SU2) side. Accordingly, pixel electrodes in wall form can be provided as pixel electrodes (pseudo-wall pixel electrodes) that appear to be formed of a wall pixel electrode SE1 and a linear pixel electrode SE2 and expanded in the direction of the thickness of the liquid crystal display panel PNL (direction Z). That is to say, as in the second to fourth embodiments, it is possible to form pixel electrodes in wall form that are taller than the thickness of the liquid crystal layer so as to gain high blocking effects. As a result, the liquid crystal molecules LCM in the liquid crystal layer LC can be driven by an electrical field applied to a pixel corresponding to each video signal without being affected by the video signal applied to adjacent pixels. Even in the case where the difference in the voltage is maximum between a pixel formed of a wall pixel electrode SE1 and a linear pixel electrode SE2 and its adjacent pixel formed of a wall pixel electrode SE1 and a linear pixel electrode SE2, the equipotential surface EF1 distributes widely in the liquid crystal layer LC both in the pixel and its adjacent pixel as in the liquid crystal display panels PNL according to the second to fourth embodiments.

As is clear from FIG. 26, in the case where a pixel displays white and its adjacent pixel displays black, an equipotential surface EF1 is created around the pixel displaying white so as to surround the wall pixel electrode SE1 and the linear pixel electrode SE2. In addition, a voltage of 0V is applied to the drain line DL in FIG. 26 in the adjacent pixel displaying black, and therefore, an equipotential surface EF2 is created so as to surround the wall pixel electrode SE1, the linear pixel electrode SE2 and the drain line DL. Accordingly, high blocking effects can be gained even in the case where pixels displaying black and white are adjacent to each other, and the liquid crystal molecules LCM in the liquid crystal layer LC can be driven in each pixel without being affected by a video signal applied to an adjacent pixel.

Figure 27:
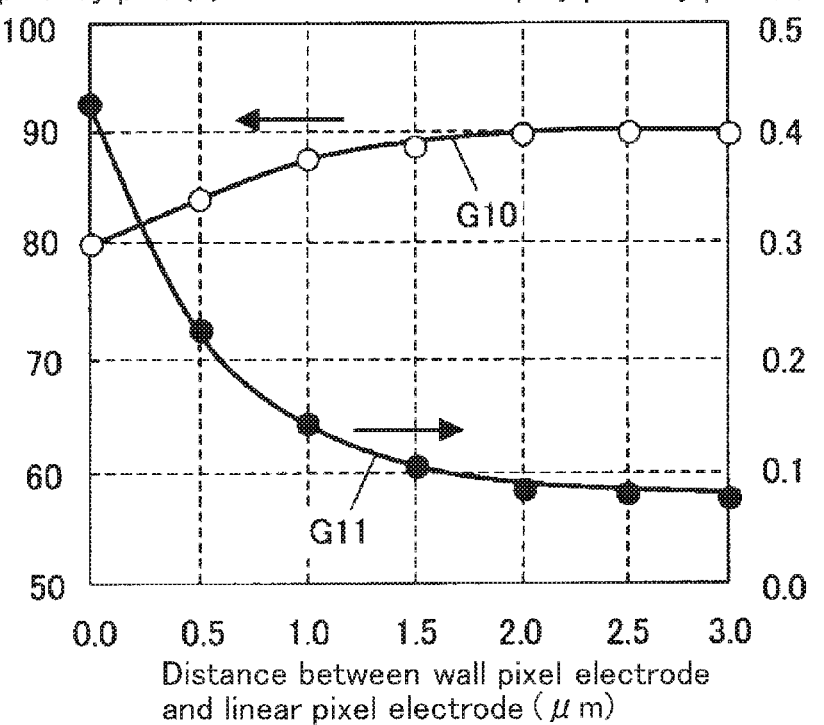
FIG. 27 is a graph showing the distance between a wall pixel electrode and a linear pixel electrode, and the results of measurement of the transmittance when white is displayed and the transmittance when black is displayed when the liquid crystal liquid crystal display device according to the fifth embodiment of the present invention is operated so that each pixel is inverted.

Next, FIG. 27 is a graph showing the results of measurement of the transmittance when white is displayed and the transmittance when black is displayed during the driving for inverting the display pixel by pixel relative to the distance between the wall pixel electrode and the linear pixel electrode in the liquid crystal display device according to the fifth embodiment of the present invention. In the following, the relationship between the transmittance and the distance between the wall pixel electrode and the linear pixel electrode in the liquid crystal display panel according to the fifth embodiment is described in reference to FIG. 27. In FIG. 27, the curve G10 shows the measured value of the transmittance of a pixel when white is displayed in the case where the distance H3 between the wall pixel electrode SE1 and the linear pixel electrode SE2 varies, and the curve G11 shows the measured value of the transmittance of a pixel when black is displayed in the case where the distance H3 between the wall pixel electrode SE1 and the linear pixel electrode SE2 varies. In the case where the film thickness of the second insulating film IL2 is much greater than the film thickness of the wall pixel electrode SE1 and the linear pixel electrode SE2, the distance H3 between the wall pixel electrode SE1 and the linear pixel electrode SE2 is approximately the same as the film thickness of the second insulating film IL2.

As is clear from the curve G10 in FIG. 27, in the liquid crystal display panel PNL according to the fifth embodiment as well, it is possible to increase the display properties during the driving for inverting the display pixel by pixel by changing the distance H3 between the wall pixel electrode and the linear pixel electrode SE2, that is to say, by changing the height H4 of the pseudo-wall pixel electrode made of the wall pixel electrode SE1 and the linear pixel electrode SE2. At this time, the thickness H1 of the liquid crystal layer is approximately the same as the height of the wall pixel electrode SE1 in the case where the height H4 (=H2+H3) of the pseudo-wall pixel electrode is changed, and thus, the thickness H1 of the liquid crystal layer does not change as in the second to fourth embodiments, and therefore, the display properties during the driving for inverting the display pixel by pixel can be improved.

That is to say, in the case where the distance H3 between the wall pixel electrode SE1 and the linear pixel electrode SE2, which is the difference between the height H4 of the pseudo-pixel electrode and the thickness H1 of the liquid crystal layer, is 0 µm, the transmittance when white is displayed is approximately 80%, as in the case where the driving for inverting the display pixel by pixel is carried out in the liquid crystal display device according to the first embodiment. In contrast, when H3=0.5 µm, the transmittance increases to approximately 83%, and when H3=1.0 µm, H3=1.5 µm, H3=2.0 µm, H3=2.5 µm and H3=3.0 µm, the transmittance increases to 88%, 89%, 90%, 90% and 90%, respectively.

Likewise, as is clear from the curve G11, in the case where the distance H3 between the wall pixel electrode SE1 and the linear pixel electrode SE2 is 0 µm, the transmittance when black is displayed is approximately 0.42%. Meanwhile, when H3=0.5 µm, the transmittance decreases (improvement) to approximately 0.22%, and when H3=1.0 µm, H3=1.5 µm, H3=2.0 µm, H3=2.5 µm and H3=3.0 µm, the transmittance decreases to 0.14%, 0.10%, 0.09%, 0.08% and 0.08%, respectively.

Figure 28:
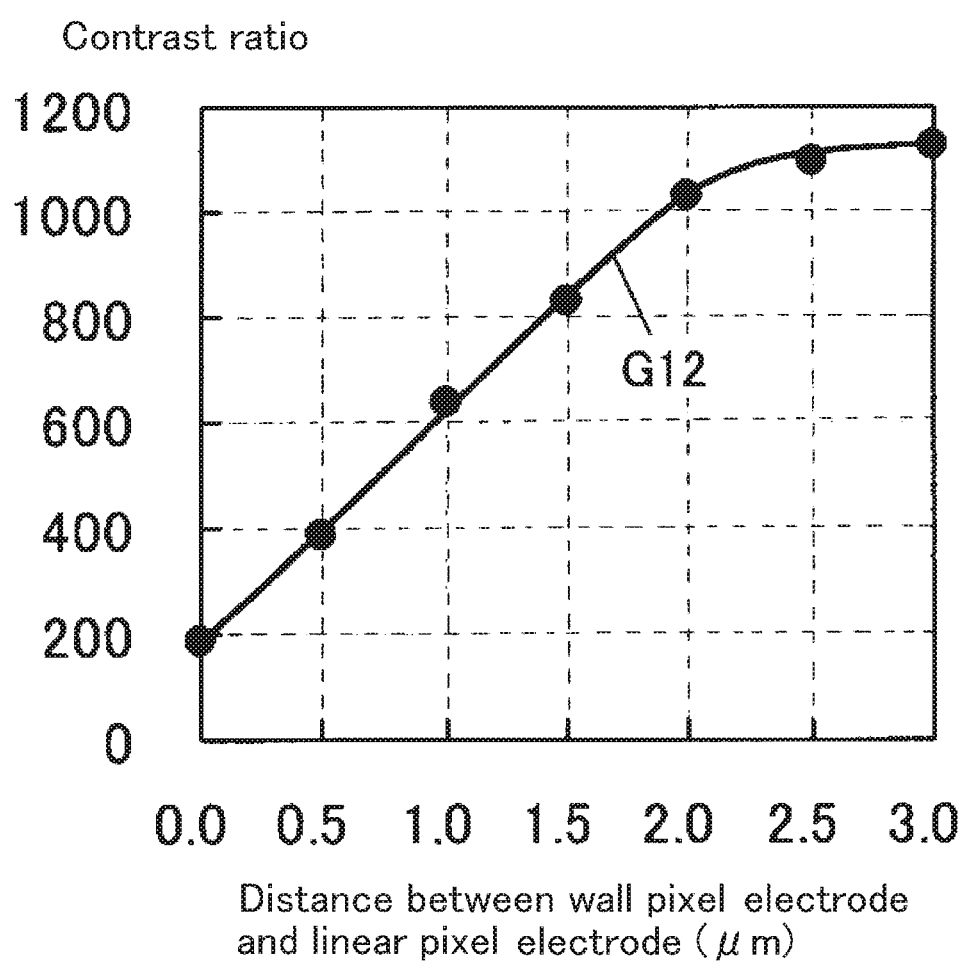
FIG. 28 is a graph showing the contrast ratio relative to the distance between a wall pixel electrode and a linear pixel electrode when the liquid crystal liquid crystal display device according to the fifth embodiment of the present invention is operated so that each pixel is inverted.

FIG. 28 is a graph showing the contrast ratio during the driving for inverting the display pixel by pixel relative to the distance H3 between the wall pixel electrode SE1 and the linear pixel electrode SE2 in the liquid crystal display device according to the fifth embodiment of the present invention. Here, FIG. 28 shows the contrast ratio found from the efficiency in the display mode when black is displayed (at the time of dark display) and when white is displayed (at the time of bright display) shown in FIG. 27.

As is clear from the curve G12 in FIG. 28, in the case where the distance H3 between the wall pixel electrode SE1 and the linear pixel electrode SE2 is 0 µm, the contrast ratio is approximately 190. In contrast, when H3=0.5 µm, the contrast ratio increases to 390, and when H3=1.0 µm, H3=1.5 µm, H3=2.0 µm, H3=2.5 µm and H3=3.0 µm, the contrast ratio increases to 640, 830, 1030, 1100 and 1120, respectively. Thus, in the liquid crystal display device according to the fifth embodiment as well, the contrast ratio increases as the distance H3 between the wall pixel electrode SE1 and the linear pixel electrode SE2 increases, but the increase in the contrast ratio hits the ceiling when the distance H3 between the wall pixel electrode SE1 and the linear pixel electrode SE2 is 2 µm or greater, where the contrast ratio reaches to 1000:1.

Accordingly, in the liquid crystal display device according to the fifth embodiment, the effects of the present invention can be sufficiently gained when the second insulating film IL2 is formed so that the distance H3 between the wall pixel electrode SE1 and the linear pixel electrode SE2 is 2 µm or greater, and a high contrast ratio can be gained in the liquid crystal display device according to the fifth embodiment. Therefore, it is appropriate for the second insulating film IL2 to be formed so that the distance H3 between the wall pixel electrode SE1 and the linear pixel electrode SE2 is 2 µm or greater in the liquid crystal display device according to the fifth embodiment.

Thus, in the liquid crystal display panel PNL according to the fifth embodiment, the second insulating film IL2 can be formed so that the height H4 of the pseudo-wall pixel electrodes formed of a wall pixel electrode SE1 and a linear pixel electrode SE2 is greater than the thickness H1 of the liquid crystal layer by 2.0 µm or greater as in the liquid crystal display panels PNL according to the second to fourth embodiments, and the same effects can be gained as in the liquid crystal display device according to the second to fourth embodiments.

Furthermore, in the liquid crystal display device according to the fifth embodiment, it is possible to form pseudo-wall pixel electrodes simply by forming linear pixel electrodes SE2 on the same layer as the drain lines DL and forming the second insulating film IL2 to have a thickness of 2.0 µm, and thus, special effects can be gained such that the height H4 of the pseudo-wall pixel electrodes can be made greater than the thickness H1 of the liquid crystal layer without increasing the number of steps required for the formation of the second substrate SU2.

Sixth Embodiment

Figure 29:
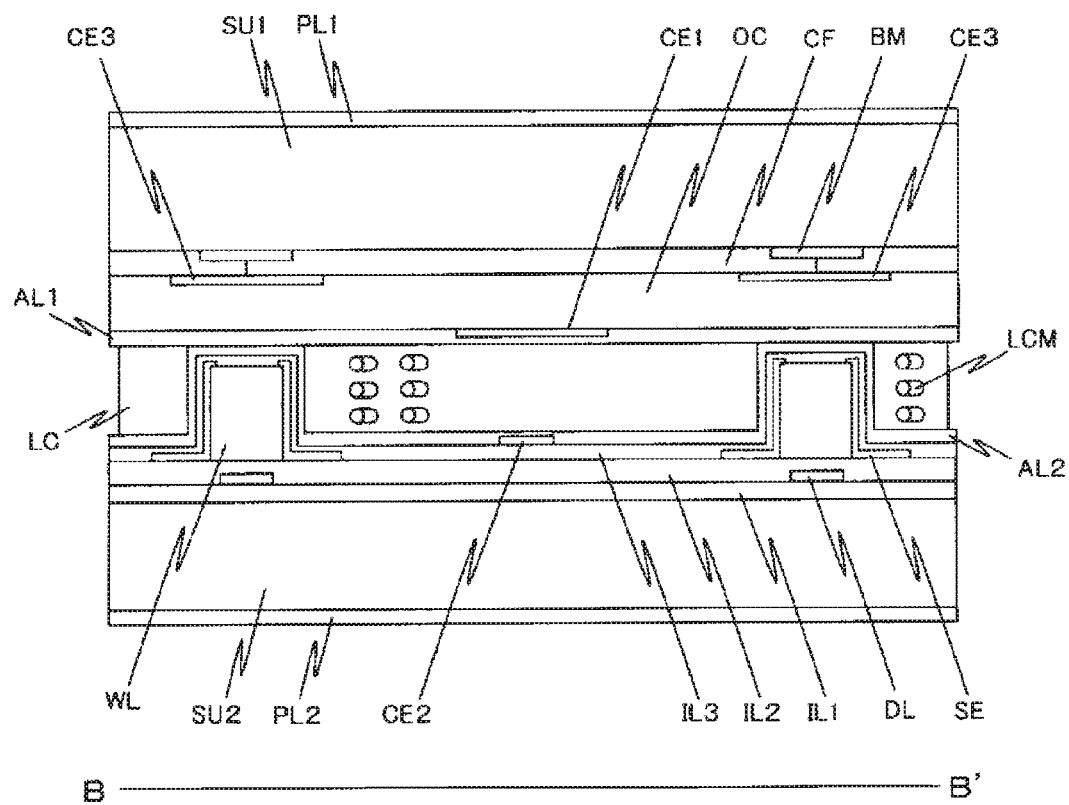
FIG. 29 is a cross-sectional diagram for schematically illustrating the structure of the liquid crystal display device according to the sixth embodiment of the present invention.

FIG. 29 is a cross-sectional diagram for schematically illustrating the structure of the liquid crystal display device according to the sixth embodiment of the present invention. Here, the liquid crystal display device according to the sixth embodiment has the same structure as the liquid crystal display device according to the first embodiment, except the structure of the third common electrodes CE3 formed on the first substrate SU1. Accordingly, in the following, the structure of the first substrate SU1 is described in detail.

As is clear from FIG. 29, in the liquid crystal display device according to the sixth embodiment, a black matrix BM is formed on the first substrate SU1 on the liquid crystal side, and color filters CF are formed in a layer above the black matrix BM. Here, in the liquid crystal display device according to the sixth embodiment, third common electrodes (fourth electrodes) CE3 are formed of a conductive thin film in a layer above the color filters CF so as to overlap the black matrix BM in the bordering portions between the color filters CF. Here, the third common electrodes CE3 according to the sixth embodiment are formed in such locations as to overlap the wall pixel electrodes SE formed on the first substrate SU1 as viewed from the top or from the bottom, that is to say, in such locations as to face the wall pixel electrodes SE, and the third common electrodes CE3 in adjacent pixels are connected to each other through a common line. Here, the formation of the third common electrodes CE3 is not limited to the regions facing the wall pixel electrodes SE, but may run in the Y direction along the bordering portions between adjacent pixels, like drain lines DL. In addition, the structure allows a common signal that becomes a reference for video signals to be supplied to the third common electrodes CE3, which are like the below-described first common electrodes CE1. Furthermore, the third common electrodes CE3 are formed so as to overlap the black matrix BM, and therefore are not limited to being made of a transparent conductive film and may be formed of other conductive thin films that are not transparent, such as metal thin films.

An overcoat layer OC is formed on the entire surface of the first substrate SU1 so as to cover the third common electrodes CE3 in a layer above the third common electrodes CE3. First common electrodes CE1 for forming pseudo-wall common electrodes are formed in a layer above the overcoat layer OC, and a first alignment film AL1 is formed on the entire surface of the first substrate SU1 so as to cover the first common electrodes CE1. That is to say, the structure allows the third common electrodes CE3 to be provided between the overcoat layer OC and the color filters CF in such a location as to face the wall bases WL on the first substrate SU1.

In addition, a first insulating film IL1 is formed on the entire surface of the second insulating film IL2 on the liquid crystal side as in the second substrate SU2 according to the first embodiment, and drain lines DL are formed in a layer above the first insulating film IL1 so as to be electrically connected to the drain electrodes of the thin film transistors, not shown. The second insulating film IL2 is formed on the entire surface of the second substrate SU2 so as to cover the drain lines DL in a layer above these drain lines DL. Wall bases WL and wall pixel electrodes SE are formed in a layer above the second insulating film IL2, and a third insulating film IL3 is formed on the entire surface of the second substrate SU2 so as to cover the wall bases WL and the wall pixel electrodes SE. Second common electrodes CE2 are formed in a layer above the third insulating film IL3, and a second alignment film AL2 is formed so as to cover the upper surface of the second common electrodes CE2 and the third insulating film IL3. In addition, a second polarizing plate PL2 is provided on the rear surface of the second substrate SU2, that is to say, on the side illuminated with backlight.

Thus, in the liquid crystal display device according to the sixth embodiment, third common electrodes CE3 having such a structure as to control the potential are provided in the pixel borders on the first substrate SU1 in such a manner that the structure allows the potential of a pixel to be prevented from being affected by the potential of an adjacent pixel through the first substrate SU1, the color filters CF formed on the surface of the first substrate SU1, and the overcoat layer OC.

Figure 30:
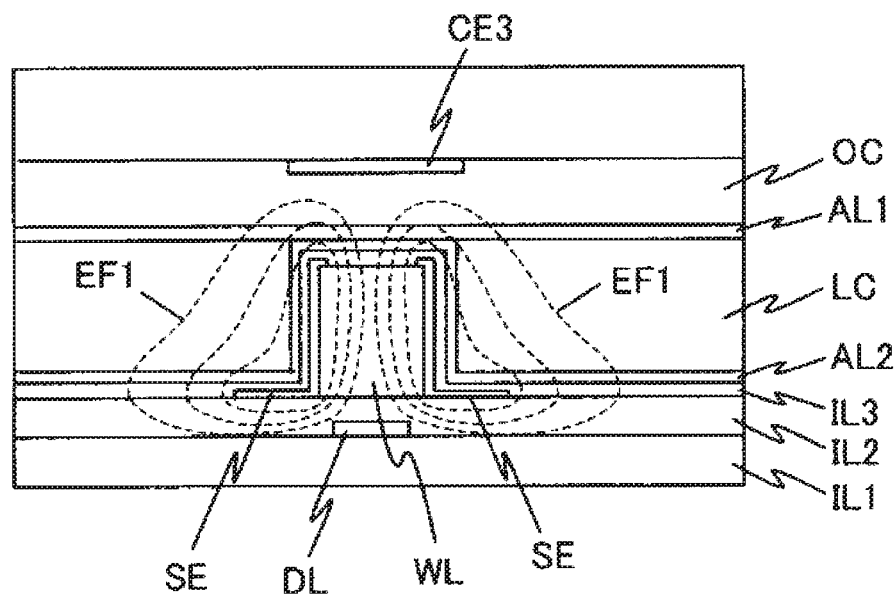
FIG. 30 is a diagram showing the distribution of equipotential surfaces in the liquid crystal display device according to the sixth embodiment when a pixel and its adjacent pixel both display white.
Figure 31:
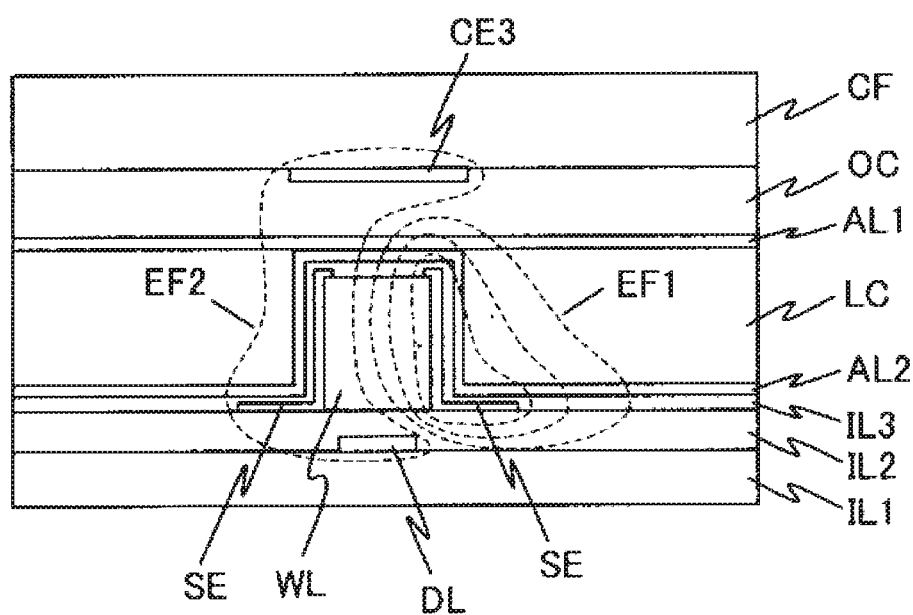
FIG. 31 is a diagram showing the distribution of equipotential surfaces in the liquid crystal display device according to the sixth embodiment when a pixel displays white and its adjacent pixel displays black.

FIG. 30 is a diagram showing the distribution of equipotential surfaces when a pixel and its adjacent pixel both display white in the liquid crystal display device according to the sixth embodiment of the present invention, and FIG. 31 is a diagram showing the distribution of equipotential surfaces when a pixel displays white and its adjacent pixel displays black in the liquid crystal display device according to the sixth embodiment of the present invention. Here, the potential of the drain wire DL is 0V.

As shown in FIG. 30, in the case where adjacent pixels both display white, equipotential surfaces EF1 have a distribution that is symmetrical between the left and right in the figure relative to the wall base WL as in the liquid crystal display device according to the first embodiment shown in FIG. 15.

Meanwhile, when the potential is close to 0V in the vicinity of a third common electrode CE3 as in the case where displays white and its adjacent pixel displays black, as shown in FIG. 31, an equipotential surface EF2 is created so as to include the wall pixel electrode SE and the third common electrode CE3. Here, the equipotential surface EF2 is created through the first alignment film AL1 and the overcoat layer OC on the first substrate SU1 side in a region including the wall pixel electrode SE and the third common electrode CE3. Accordingly, the equipotential surface EF2 prevents the potential of the wall pixel electrode SE of the pixel displaying white on the right side in FIG. 31 from spreading into the color filter CF and the overcoat layer OC. As a result, it is possible to gain special effects such that the transmittance for black can be prevented from increasing in the case where a pixel displays white and its adjacent pixel displays black during the driving for inverting the display pixel by pixel, and the transmittance when a pixel displays white and its adjacent pixel displays black can be lowered to 0.09% (improvement) in addition to the same effects as in the liquid crystal display device according to the first embodiment.

As described above, in the liquid crystal display device according to the sixth embodiment, third common electrodes CE3 are formed along the wall bases WL on the first substrate SU1 on the liquid crystal side so as to face the wall bases WL, and at the same time, the structure allows the same common signal to be supplied to the third common electrodes CE3 as to the first common electrodes CE1. As a result, when the voltage of one of the wall pixel electrodes SE that face each other with a wall base WL in between is close to that of the third common electrode CE3 when black is displayed, the equipotential surface EF2 including the wall pixel electrodes SE and the third common electrode CE is canceled. That is to say, in the case where the video signal applied to at least one of the wall pixel electrodes SE that face each other with a wall base WL in between has approximately the same voltage as the common signal, a pseudo-wall pixel electrode is formed of this wall pixel electrode SE and the third common electrode CE3. Accordingly, special effects can be gained such that the transmittance for black can be prevented from increasing when a pixel displays white and its adjacent pixel displays black in addition to the above-described effects of the first embodiment.

Though the sixth embodiment is a case where third common electrodes CE3 according to the present invention are formed in the liquid crystal display device according to the first embodiment, the invention is not limited to this and can be applied to the other liquid crystal display devices according to the second to fifth embodiments where the above-described effects can be gained by forming third common electrodes CE3.

Seventh Embodiment

Figure 32:
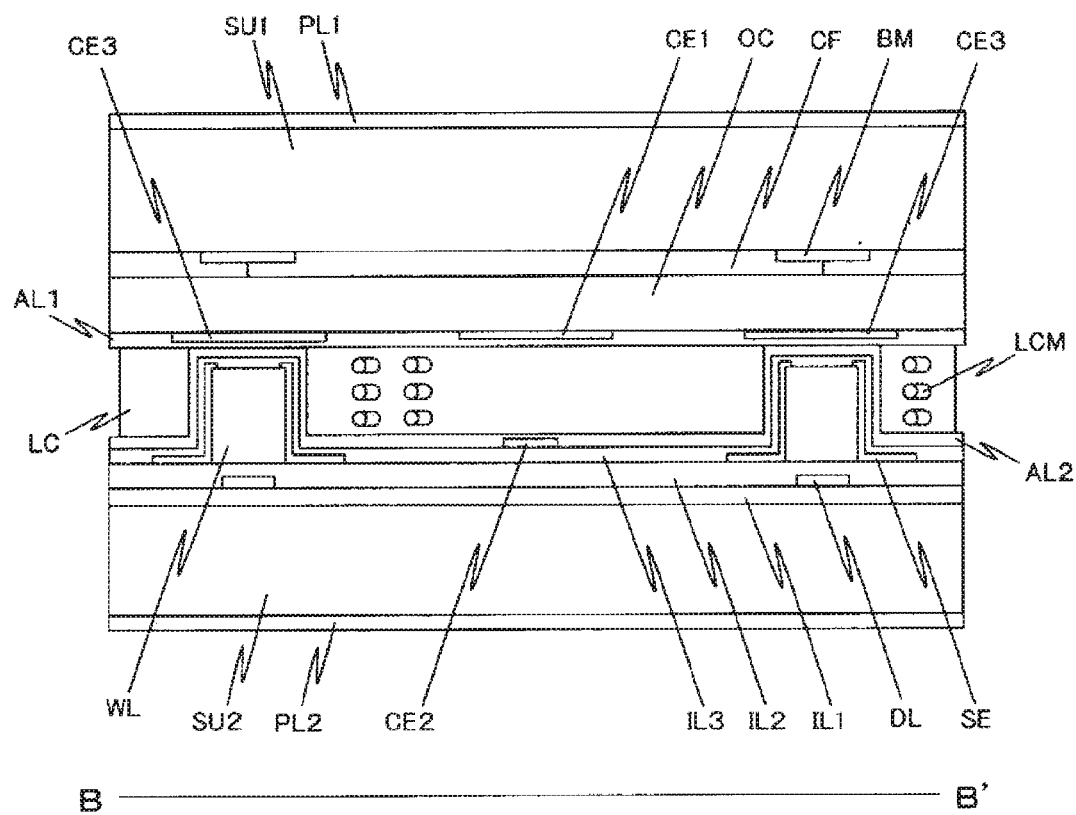
FIG. 32 is a cross-sectional diagram for schematically illustrating the structure of a liquid crystal display device according to the seventh embodiment of the present invention.

FIG. 32 is a cross-sectional diagram for schematically illustrating the structure of the liquid crystal display device according to the seventh embodiment of the present invention. In the following, the liquid crystal display device according to the seventh embodiment is described in reference to FIG. 32. Here, the liquid crystal display device according to the seventh embodiment has the same structure as the liquid crystal display device according to the sixth embodiment, except the locations in which the third common electrodes CE3 are formed. Accordingly, in the following, the third common electrodes CE3 are described in detail.

As shown in FIG. 32, a black matrix BM, color filters CF and an overcoat layer OC are formed in this order on the first substrate SU1 on the liquid crystal side as in the liquid crystal display panel PNL according to the first embodiment. In the liquid crystal display panel PNL according to the seventh embodiment, third common electrodes CE3 are formed in the same layer as in the first common electrodes CE1, that is to say, on the upper surface of the overcoat layer. In addition, a first alignment film AL1 is formed on the entire surface of the first substrate SU1 so as to cover the first common electrodes CE1 and the third common electrodes CE3 in a layer above the first common electrodes CE1 and the third common electrodes CE3. In the seventh embodiment, the third common electrodes CE3 are not limited to being made of a transparent conductive film, like the third common electrodes CE3 in the sixth embodiment, and may be made of a conductive thin film that is not transparent, such as metal thin films including that of aluminum. In the liquid crystal display panel PNL according to the seventh embodiment, only the first alignment film AL1 is formed in a layer above the third common electrodes CE3, and therefore, it is preferable for the third common electrodes CE3 to be made of a conductive thin film having excellent corrosion resistance, such as ITO.

Thus, in the liquid crystal display panel PNL according to the seventh embodiment, the second common electrodes CE2 and the third common electrodes CE3 are both formed between the overcoat layer OC and the first alignment film AL1. Therefore, the wall pixel electrodes SE and the third common electrodes CE3 are at least located in proximity to each other with the third insulating film IL3 and the second alignment film AL2 formed in a layer above the wall pixel electrodes SE and the first alignment film AL1 formed on the first substrate SU1 in between, but the structure does not allow the wall pixel electrodes SE and the third common electrodes CE3 to be electrically connected to each other.

Accordingly, in the liquid crystal display panel PNL according to the seventh embodiment as well, the potential of a pixel can be prevented from being affected by the potential of its adjacent pixel due to the intervention of the first substrate SU1, the color filters CF formed on the surface of the first substrate SU1, and the overcoat layer OC. Therefore, as in the liquid crystal display panel PNL according to the sixth embodiment, special effects can be gained such that the transmittance for black can be prevented from increasing in the case where a pixel displays white and its adjacent pixel displays black during the driving for inverting the display pixel by pixel in addition to the effects in the liquid crystal display device according to the first embodiment.

In the case where the third common electrodes CE3 are formed of a transparent conductive film like the first common electrodes CE1, the third common electrodes CE3 can be simultaneously formed in the process for forming the first common electrodes CE1, and therefore, special effects can be gained such that the third common electrodes CE3 can be formed without adding new steps for forming the third common electrodes CE3.

Figure 33:
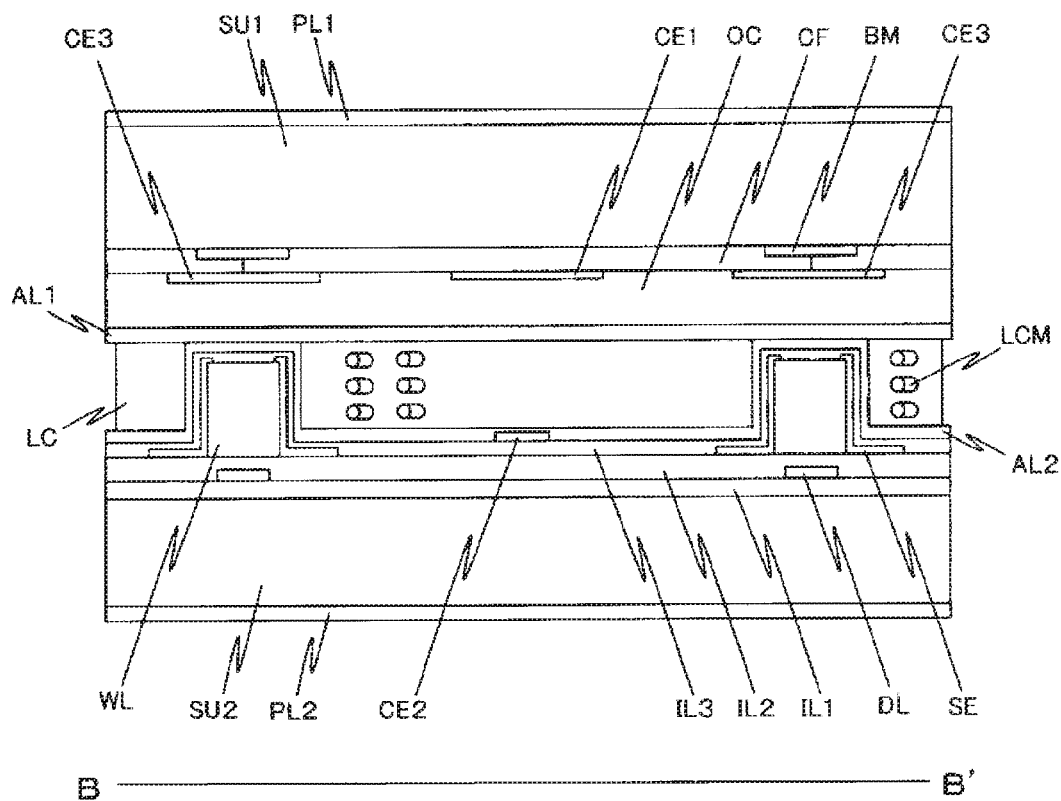
FIG. 33 is a cross-sectional diagram for schematically illustrating the structure of another liquid crystal display device according to the seventh embodiment of the present invention.

In addition, the liquid crystal display device according to the seventh embodiment is not limited to having the structure shown in FIG. 32 and may have the structure shown in FIG. 33, for example. In another example of the liquid crystal display device according to the seventh embodiment shown in FIG. 33, a black matrix BM is formed on the first substrate SU1 on the liquid crystal side, and color filters CF are formed in a layer above the black matrix BM. In the other example of the liquid crystal display device according to the seventh embodiment, the first common electrodes CE1 and the third common electrodes CE3 are formed in the same layer above the color filters CF, and an overcoat layer OC and a first alignment film AL1 are formed in this order on the entire surface of the first substrate SU1 so as to cover both the first common electrodes CE1 and the third common electrodes CE3 in a layer above the first common electrodes CE1 and the third common electrodes CE3. That is to say, the other example of the liquid crystal display device according to the seventh embodiment has such a structure that the second common electrodes CE2 and the third common electrodes CE3 are both formed between the overcoat layer OC and the first alignment film AL1, and therefore, in addition to the above-described effects in the liquid crystal display device according to the seventh embodiment, special effects can be gained such that the transmittance can be prevented from being lowered, even in the case where there is a positional misalignment, that is to say, there is an alignment error when the first substrate SU1 and the second substrate SU2 are pasted together. Here, the effects of having a large allowance for alignment in the other example of the liquid crystal display device according to the seventh embodiment can be gained for the same reasons why the above-described first common electrodes CE1 and second common electrodes CE2 can be misaligned.

Eighth Embodiment

Figure 34:
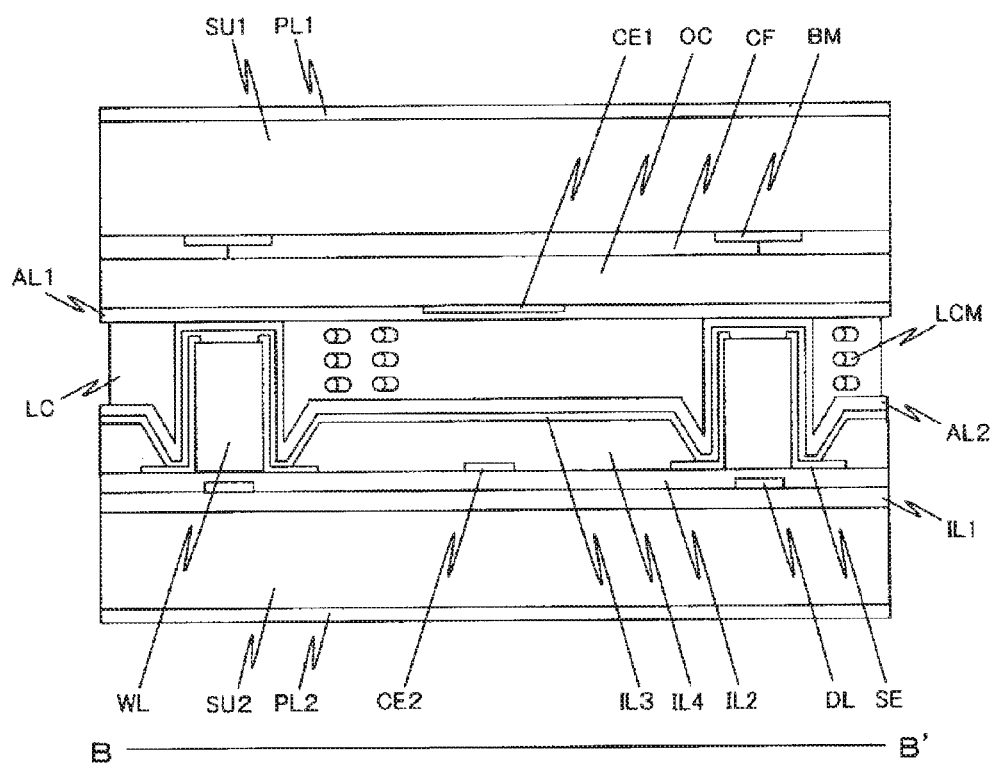
FIG. 34 is a cross-sectional diagram for schematically illustrating the structure of the liquid crystal display device according to the eighth embodiment of the present invention.

FIG. 34 is a cross-sectional diagram for schematically illustrating the structure of the liquid crystal display device according to the eighth embodiment of the present invention. Here, the liquid crystal display device according to the eighth embodiment has the same structure as the liquid crystal display device according to the second embodiment, except the locations where the second common electrodes CE2 are formed. Accordingly, in the following, the second common electrodes CE2 are described in detail.

As shown in FIG. 34, in the liquid crystal display device according to the eighth embodiment, a first insulating film IL1, drain lines DL, a second insulating film IL2 and wall bases WL are formed in this order on the second substrate SU2 on the liquid crystal side as in the liquid crystal display device according to the second embodiment. Wall pixel electrodes SE are formed on the top surface and the sidewall of a wall base WL and on the upper surface of the second insulating film IL2 in the vicinity of the wall base WL, and at the same time, the second common electrodes CE2 are formed so as to run in the longitudinal direction of the pixels in a center portion along B-B' of a pixel. A fourth insulating film IL4 is formed in the transmittance regions of the pixels sandwiched between a pair of wall pixel electrodes SE so as to cover the end portions of the flat portions HP of the wall pixel electrodes SE, the second common electrodes CE2 and the second insulating film IL2 exposed from the surface. In addition, a third insulating film IL3 and a second alignment film AL2 are formed in this order on the entire surface of the second substrate SU2 so as to cover the top surface of the wall base WL exposed from the surface and the wall pixel electrodes SE exposed from the surface. In the liquid crystal display device according to the eighth embodiment as well, the fourth insulating film IL4 has a film thickness that is greater than the other insulating films by 2.0 μm or greater, and the height of the wall pixel electrodes SE is greater than the thickness of the liquid crystal layer LC by 2.0 μm or greater.

Meanwhile, a black matrix BM, color filters CF, an overcoat layer OC, first common electrodes CE1 and a first alignment film AL1 are layered on top of each other in this order on the first substrate SU1 on the liquid crystal side, and the first substrate SU1 and the second substrate SU2 are located so as to face each other with a liquid crystal layer LC in between, and thus, the liquid crystal display panel PNL according to the eighth embodiment is formed. In the liquid crystal display device according to the eighth embodiment as well, the fourth insulating film IL4 has a film thickness of 2.0 μm or greater, and therefore, the height of the wall pixel electrodes SE can be made greater than the thickness of the liquid crystal layer LC by the film thickness of the fourth insulating film IL4, which is 2.0 μm, and thus, the same effects as that of the liquid crystal display device according to the second embodiment can be gained.

Furthermore, the liquid crystal display device according to the eighth embodiment has such a structure that the second common electrodes CE2 are formed in a layer beneath the fourth insulating film IL4. That is to say, the second common electrodes CE2 are formed between the second insulating film IL2 and the fourth insulating film IL4. Accordingly, in the liquid crystal display device according to the eighth embodiment, special effects can be gained such that the transmittance can be prevented from lowering due to a positional misalignment when the first substrate SU1 and the second substrate SU2 are pasted together, even if there is such a positional misalignment as described below in the section of the effects. As a result, it is possible to lower the ratio of the occurrence of defects due to the positional misalignment when the first substrate SU1 and the second substrate SU2 are pasted together, and special effects can be gained such that the productivity of the liquid crystal display device can be increased.

Though the liquid crystal display device according to the eighth embodiment is a case where the present invention is applied to the liquid crystal display device according to the second embodiment, the invention is not limited to this. For example, the second common electrodes CE2, which are the same as in the liquid crystal display device according to the third embodiment, can be formed in a layer beneath the fifth insulating film IL5 so as to provide the same positional relationship between the first common electrodes CE1 and the second common electrodes CE2 as in the liquid crystal display device according to the eighth embodiment. Thus, the same effects as in the eighth embodiment can be gained.

<Concerning Effects of Preventing Transmittance from Lowering when there is Positional Misalignment Between First and Second Common Electrodes>

In the case where there is a misalignment (positional misalignment) when the first substrate SU1 and the second substrate SU2 are combined (pasted together), there is also a misalignment in the positional relationship between the first common electrodes CE1 and the second common electrodes CE2. In the liquid crystal display device according to the first embodiment shown in FIG. 3, for example, in the case where there is a positional misalignment in such a manner where the first substrate SU1 is shifted in the direction B relative to the second substrate SU2, the distribution of the equipotential surfaces in the vicinity of the first common electrodes CE1 and the second common electrodes CE2 is inclined in the left or right direction in FIG. 8, that is to say, in the direction in which the pseudo-wall common electrodes are aligned as shown in FIG. 8, so as to provide an equipotential surface E3 that surrounds both a first common electrode CE1 and a second common electrode CE2. In this positional misalignment shown in FIG. 8, the first common electrode CE1 is shifted in the left direction in FIG. 8 relative to the second substrate SU2, and therefore, the area that overlaps the second common electrode CE2 in the left portion of the first common electrode CE1 in FIG. 8 decreases. As a result, the transmittance lowers on the left side of the pseudo-wall electrode in FIG. 8.

Figure 35:
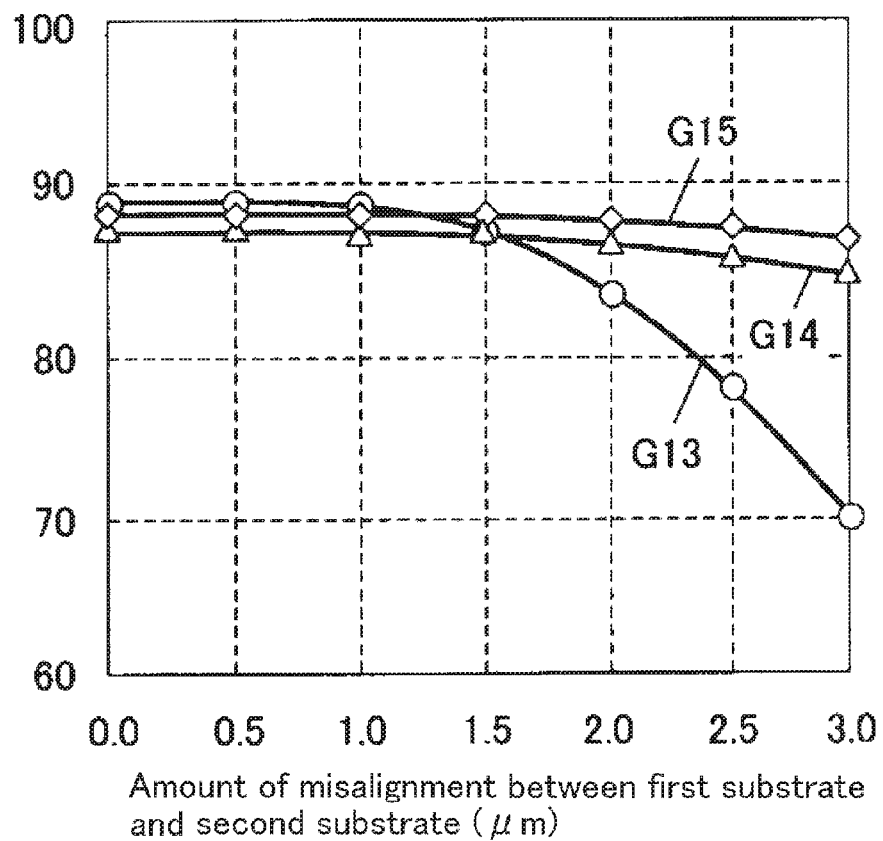
FIG. 35 is a graph showing the transmittance of a pixel displaying white relative to the positional misalignment between the first common electrode and the second common electrode in a pseudo-wall common electrode during the operation where each pixel is inverted according to the present invention.

FIG. 35 is a graph showing the transmittance of a pixel when white is displayed during the driving for inverting the display pixel by pixel relative to the amount of misalignment between the first common electrode CE1 and the second common electrode CE2 in a pseudo-wall common electrode in the present invention, where the curve 13 shows the transmittance of a pixel when white is displayed relative to the amount of misalignment between the first substrate SU1 and the second substrate SU2 in the liquid crystal display device according to the first embodiment.

As is clear from the curve G13, the structure of a pseudo-wall electrode in the first embodiment has a transmittance of 89% in the case where there is no misalignment, that is to say, the amount of misalignment SH is 0 μm. Meanwhile, when SH=0.5 μm, SH=1.0 μm, SH=1.5 μm, SH=2.0 μm, SH=2.5 μm and SH=3.0 μm, the transmittance is 89%, 89%, 87%, 83%, 78% and 70%, respectively.

Thus, the structure according to the first embodiment has a transmittance for white display of 89% in the case where there is no misalignment between the first substrate SU1 and the second substrate SU2, but the transmittance for white display lowers as the misalignment increases and lowers to 70% when the misalignment is 3 μm. Accordingly, it is preferable for the structure according to the first embodiment to have a positional misalignment of 1.5 μm or less when the first substrate SU1 and the second substrate SU2 are pasted together.

Figure 36:
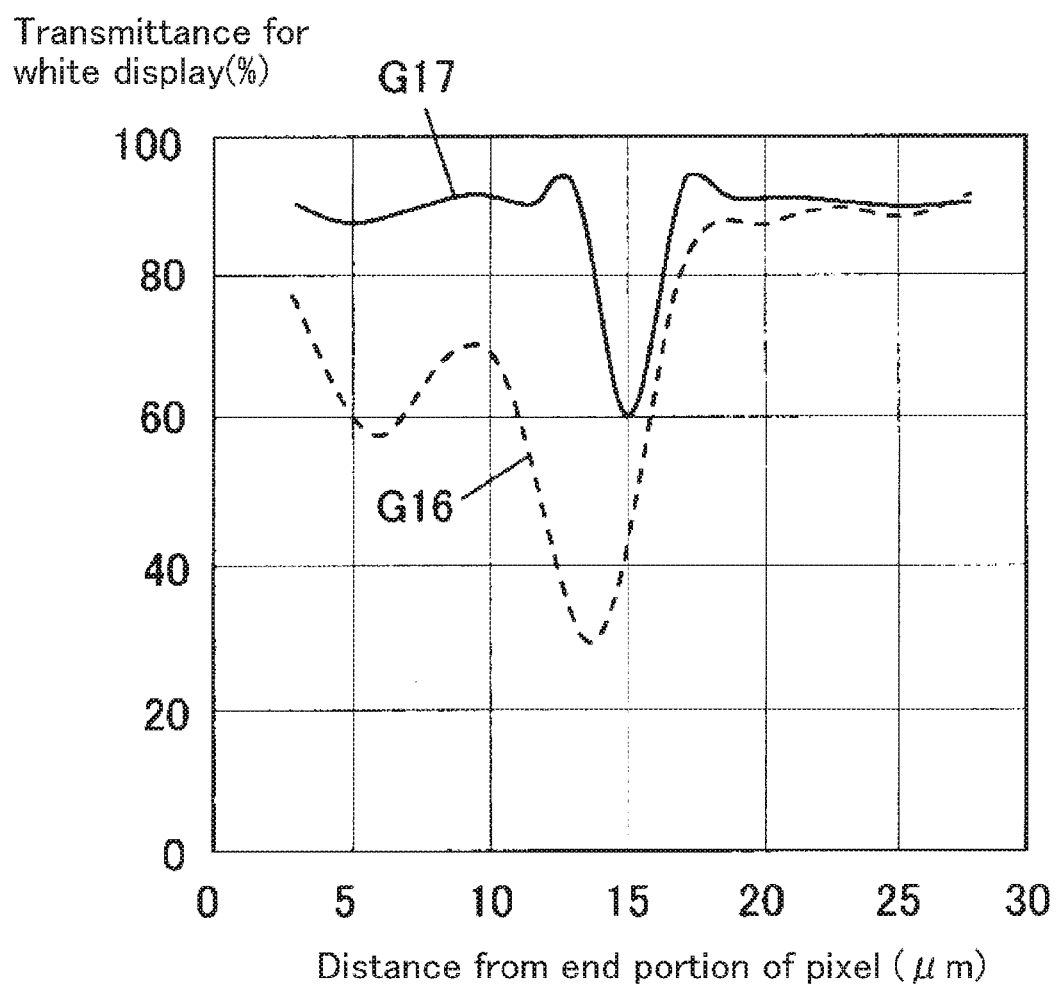
FIG. 36 is a graph showing the distribution of the transmittance within a pixel in the cases where there is no positional misalignment between the first common electrode and the second common electrode and where there is a positional misalignment of 3 μm in the liquid crystal display device according to the first embodiment.

FIG. 36 is a graph showing the distribution of transmittance within a pixel in the case where there is no misalignment between the first substrate SU1 and the second substrate SU2 and in the case where the misalignment is 3 μm in the liquid crystal display device according to the first embodiment, where the dotted curve G16 shows a case where the amount of misalignment SH in FIG. 8 is 3.0 μm, and the solid curve G17 shows a case where SH=0 μm. Here, FIG. 36 shows the distribution of transmittance in a pixel in the case where the pitch of the pixels in the width direction is 30 μm and first and second common electrodes CE1 and CE2 are located in the center portion of the pixel. In addition, the curves G16 and G17 show the distribution of transmittance in the case where the pixel and its adjacent pixel both display white during the driving for inverting the display pixel by pixel.

As is clear from the curve G17, in the case where there is no positional misalignment between the first substrate SU1 and the second substrate SU2, the transmittance lowers greatly in the region close to 15 μm, which is the center location of the pseudo-wall common electrode made of a first common electrode CE1 and a second common electrode CE2. However, the transmittance is approximately 89% in the regions expect the region where the pseudo-wall common electrode is formed.

In the case where there is a positional misalignment of SH=3.0 μm in FIG. 8, the equipotential surface E3 is inclined because the first common electrode CE1 is misaligned in the left direction (direction towards the side where the distance from the end of the pixel is smaller) relative to the second substrate SU2, and therefore, there is an inclination in the equipotential surface E3. As a result, the area where the first common electrode CE1 and the second common electrode CE2 overlap decreases in the region where the distance from the end of the pixel is smaller, and therefore, as shown by the curve G16, the transmittance in this region is lowered to approximately 60%.

Figure 37:
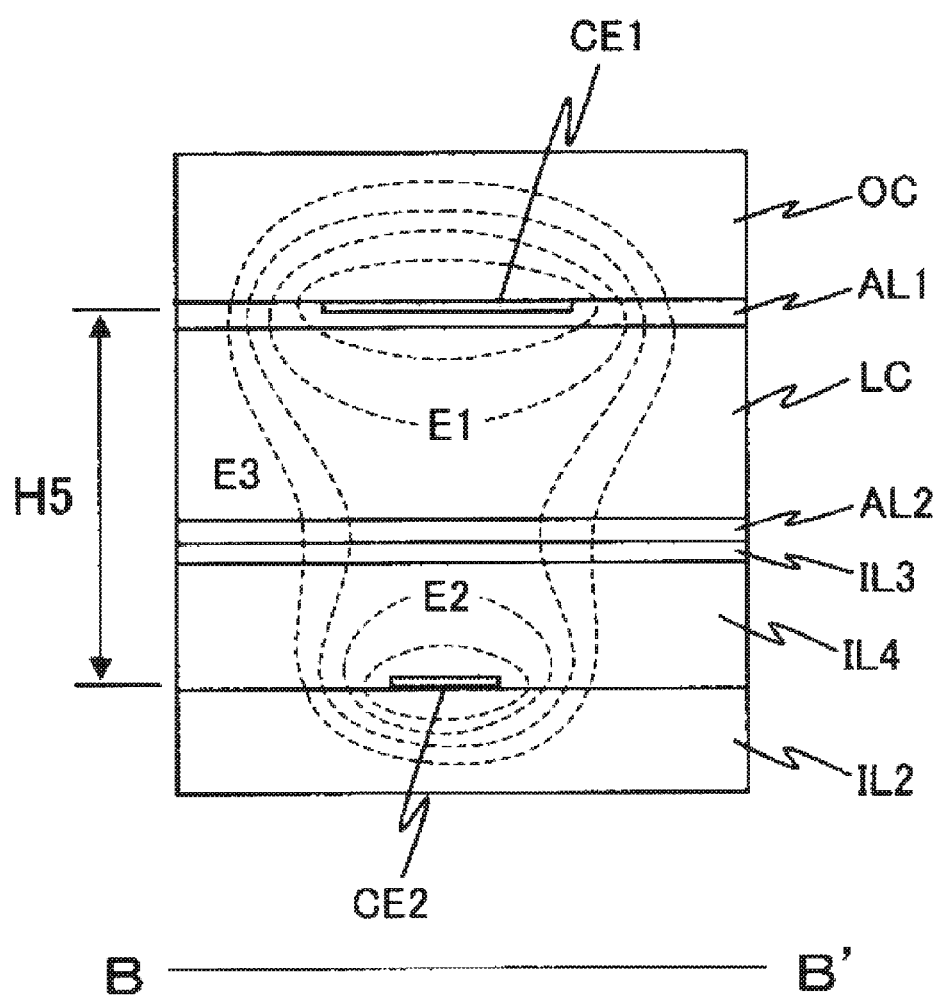
FIG. 37 is a diagram showing an enlargement of a portion of a pseudo-wall common electrode in the case where there is no positional misalignment between the first common electrode and the second common electrode in the liquid crystal display device according to the eighth embodiment of the present invention.

In contrast, as shown in FIG. 37, which is a diagram showing an enlargement of the portion of a pseudo-wall common electrode in the liquid crystal display device according to the eighth embodiment of the present invention, first and second alignment films AL1 and AL2, al liquid crystal layer LC and a third insulating film IL3 are formed between the first common electrodes CE1 and the second common electrodes CE2 in the liquid crystal display device according to the eighth embodiment. Accordingly, in the distribution of equipotential surfaces created between a first common electrode CE1 and a second common electrode CE2 in the case where there is no positional misalignment, an equipotential surface E1 surrounding the first common electrode CE1 is created around the first common electrode CE1, including part of the liquid crystal layer LC, and an equipotential surface E2 surrounding the second common electrode CE2 is created around the second common electrode CE2, including part of the third insulating film IL3. In addition, an equipotential surface E3 surrounding both the first common electrode CE1 and the second common electrode CE2 so as to form a pseudo-wall common electrode is created so as to include part of the first and second alignment films AL1 and AL2, the liquid crystal layer LC and the third insulating film IL3. In the liquid crystal display device according to the eighth embodiment, the liquid crystal layer LC has the same thickness as the liquid crystal display device according to the first embodiment, and therefore, the equipotential surface E3 is formed as if it were expanded in the direction of the thickness of the liquid crystal display panel PNL. Furthermore, the pseudo-wall common electrode is formed with the width of the equipotential surfaces distributed in the liquid crystal layer LC being narrowed because the first common electrode CE1 having a greater width is at a distance away from the liquid crystal layer LC.

Figure 38:
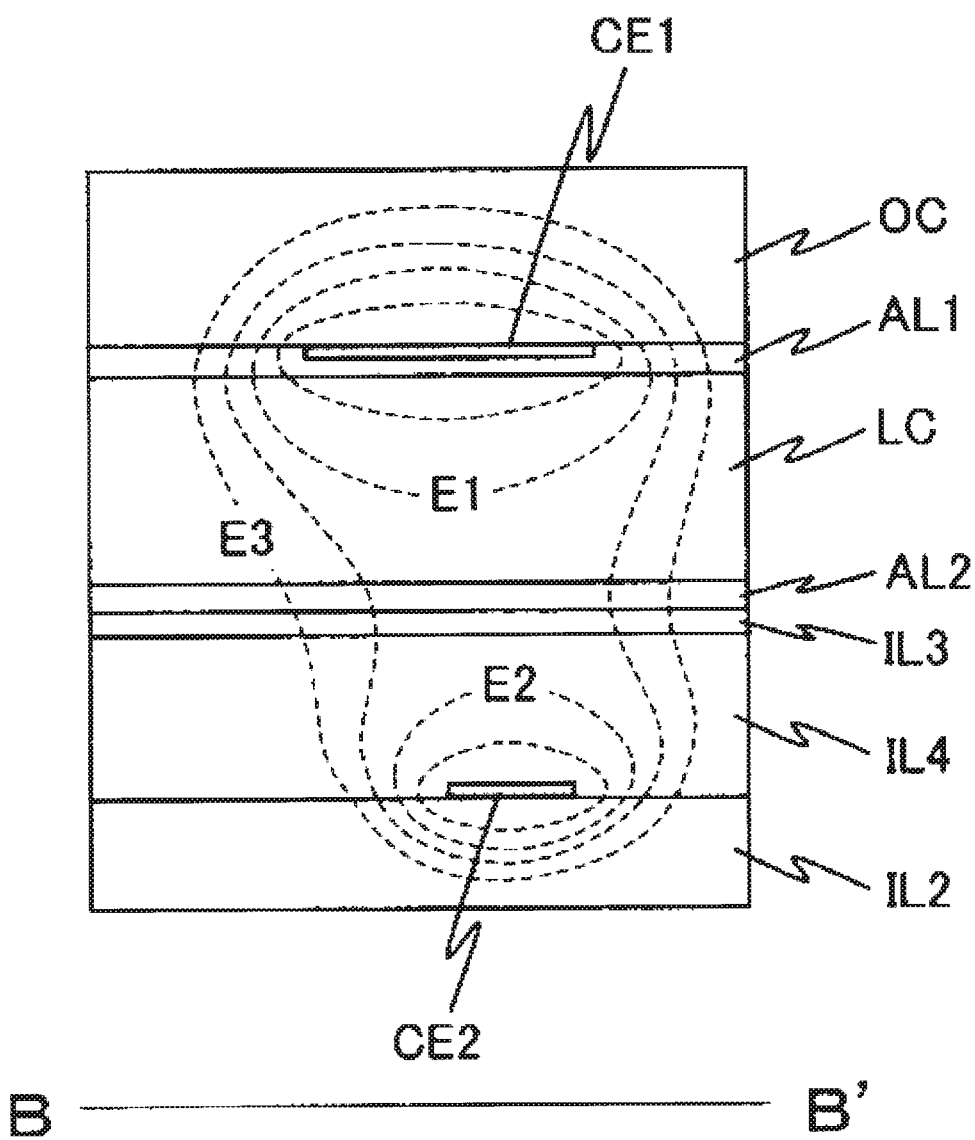
FIG. 38 is a diagram showing an enlargement of a portion of a pseudo-wall common electrode in the case where there is a positional misalignment between the first common electrode and the second common electrode in the liquid crystal display device according to the eighth embodiment of the present invention.

Meanwhile, in the case where there is a positional misalignment as in FIG. 8, as shown in FIG. 38, an equipotential surface E3 surrounding the first common electrode CE1 and the second common electrode CE2 is inclined in the direction of the misalignment in the distribution of equipotential surfaces created between a first common electrode CE1 and a second common electrode CE2. In the structure according to the eighth embodiment, as is clear from FIG. 38, the inclination of the equipotential surface E3 is smaller because the amount of change in the equipotential surface E3 is smaller for the same amount of misalignment due to the increase in the distance between the first common electrode CE1 and the second common electrode CE2.

Figure 39:
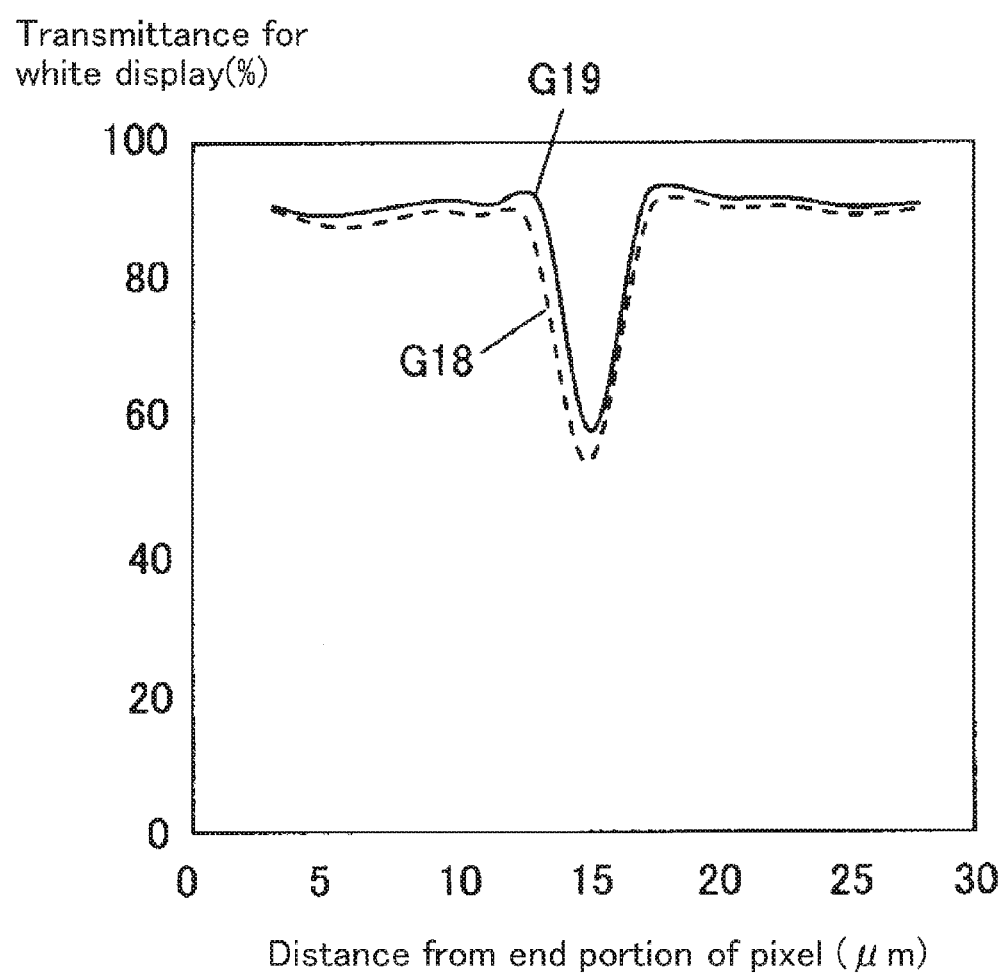
FIG. 39 is a graph showing the distribution of the transmittance within a pixel in the cases where there is no positional misalignment between the first common electrode and the second common electrode and where there is a positional misalignment of 3 μm in the liquid crystal display device according to the eighth embodiment of the present invention.

FIG. 39 is a graph showing the distribution of transmittance within a pixel in the case where there is no misalignment between the first substrate SU1 and the second substrate SU2 and in the case where there is a misalignment of 3 μm in the liquid crystal display device according to the eighth embodiment of the present invention, where the dotted curve G18 shows a case of SH=3.0 μm and the solid curve G19 shows a case of no misalignment (SH=0 μm).

As is clear from FIG. 39, in the liquid crystal display device according to the eighth embodiment, the distribution of transmittance within a pixel is almost the same in the case where there is no misalignment between the first substrate SU1 and the second substrate SU2 (curve G19) and in the case where there is a misalignment of SH=3 μm (curve G18), irrelevant of whether or not there is a misalignment. This is the effect due to the inclination of the equipotential surface E3 being smaller as a result of the formation of the second common electrode CE2 in a layer beneath the third insulating film IL3 as shown in FIG. 38.

The curve G15 in FIG. 35 shows the transmittance of a pixel when white is displayed during the driving for inverting the display pixel by pixel relative to the positional misalignment between the first common electrode CE1 and the second common electrode CE2 in the liquid crystal display device according to the eighth embodiment. As is clear from this curve G15, the transmittance is 88% in the structure of the pseudo-wall electrode in the eighth embodiment in the case where there is no misalignment (SH=0 μm). In addition, when SH=0.5 μm, SH=1.0 μm, SH=1.5 μm, SH=2.0 μm, SH=2.5 μm and SH=3.0 μm, the transmittance is 88%, 88%, 88%, 88%, 87% and 86%, respectively.

Thus, in the structure according to the eighth embodiment, the transmittance is 86% even when the amount of misalignment SH is 3.0 μm, and the decrease in the transmittance due to the positional misalignment between the first substrate SU1 and the second substrate SU2 can be limited to approximately 2%, and such special effects can be gained that approximately a constant transmittance for white display can be gained irrelevant of the positional misalignment between the first substrate SU1 and the second substrate SU2.

Figure 40:
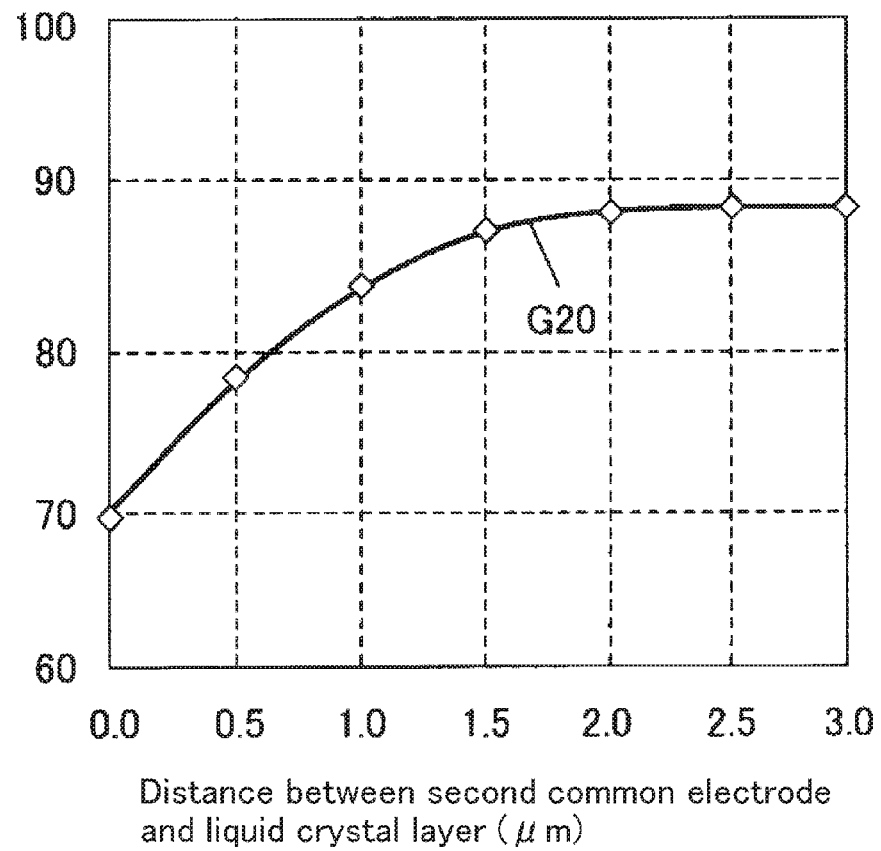
FIG. 40 is a graph for illustrating the dependency of the transmittance on the distance between the second common electrode and the liquid crystal layer when the liquid crystal display device according to the eighth embodiment of the present invention is operated so that each pixel is inverted and white is displayed in the case where there is a positional misalignment of 3 μm between the first common electrode and the second common electrode.

FIG. 40 is a graph for illustrating the dependency of the transmittance for white display on the distance between the second common electrode CE2 and the liquid crystal layer LC during the driving for inverting the display pixel by pixel in a case where there is a positional misalignment of 3 μm between the first substrate SU1 and the second substrate SU2. As is clear from the curve G20 in FIG. 40, the transmittance for white display is 70% in the case where the second common electrode CE2 and the liquid crystal layer LC are in proximity to each other, but it increases as the distance K2 between the second common electrode CE2 and the liquid crystal layer LC increases in such a manner that when K2=0.5 μm, K2=1.0 μm, K2=1.5 μm, K2=2.0 μm, K2=2.5 μm and K2=3.0 μm, the transmittance is 78%, 83%, 87%, 88%, 89% and 89%, respectively. Thus, the transmittance is 88% or greater when the distance K2 between the second common electrode CE2 and the liquid crystal layer LC is 2.0 μm or greater, and the same transmittance for white display as in the case where there is no misalignment between the first substrate SU1 and the second substrate SU2 can be gained.

Figure 41:
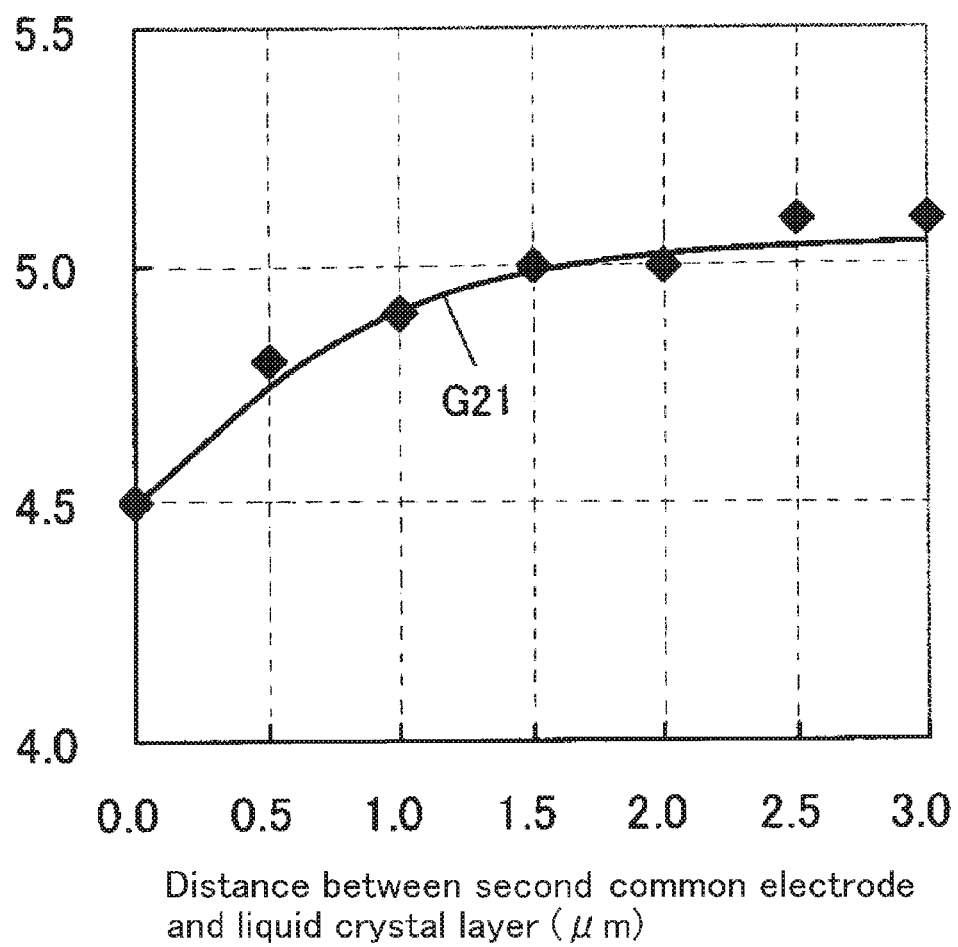
FIG. 41 is a graph for illustrating the relationship between the operating voltage and the distance between the second common electrode and the liquid crystal layer in the liquid crystal display device according to the eighth embodiment of the present invention.

FIG. 41 is a graph for illustrating the relationship between the driving voltage and the distance between the first common electrode and the liquid crystal layer in the liquid crystal display device according to the eighth embodiment of the present invention. This graphs shows a voltage (driving voltage) to be applied between the wall pixel electrode SE and the pseudo-wall common electrode for display (white display) with a predetermined transmittance when the distance H5 between the second common electrode and the liquid crystal layer (see FIG. 37) varies in the structure according to the eighth embodiment in FIG. 34.

As is clear from the curve G21 in FIG. 41, the driving voltage Vpc is 4.5V in the case where the distance H5 between the second common electrode CE2 and the liquid crystal layer LC is 0 μm. In addition, when H5=0.5 μm, H5=1.0 μm, H5=1.5 μm, H5=2.0 μm, H5=2.5 μm and H5=3.0 μm, the driving voltage Vpc is 4.8V, 4.9V, 5.0V, 5.0V, 5.1V and 5.1V, respectively.

Thus, in the structure according to the eighth embodiment, the driving voltage Vpc tends to increase as the distance H5 between the second common electrode CE2 and the liquid crystal layer LC increases. However, the increase in the driving voltage Vpc tends to saturate, and the increase is gradual when the distance H5 between the second common electrode CE2 and the liquid crystal layer LC is 1.5 µm or greater. That is to say, it is clear that a high transmittance for white display can be gained while suppressing the increase in the driving voltage Vpc by adjusting the distance H5 between the second common electrode CE2 and the liquid crystal layer LC to 1.5 µm or greater. Accordingly, it is preferable for the liquid crystal display device according to the eighth embodiment to be formed so as to have a distance H5 between the second common electrode CE2 and the liquid crystal layer LC of 1.5 µm or greater. Furthermore, it is preferable for the driving voltage Vpc to be approximately 5.0V.

As described above, the liquid crystal display device according to the eighth embodiment has such a structure that second common electrodes CE2, which are one common electrode of a pseudo-wall common electrode, are formed in a layer beneath the fourth insulating film IL4 that is provided to make the height of the wall pixel electrodes SE greater than the thickness of the liquid crystal layer LC, and therefore, it is possible to make the distance between the first common electrodes CE1 and the second common electrodes CE2 great, where the first common electrodes CE1 are the other common electrode of a pseudo-wall common electrode. As a result, it is possible to make the inclination of the distribution of electrical fields smaller in the pseudo-wall common electrodes due to the positional misalignment between the first common electrodes CE1 and the second common electrodes CE2 when the first substrate SU1 on which the first common electrodes CE1 are formed and the second substrate SU2 on which the second common electrodes CE2 are formed are pasted together, and therefore, special effects can be gained such that the transmittance can be prevented from being lowered due to the positional misalignment between the first common electrodes CE1 and the second common electrodes CE2, and thus, the display quality can be improved in addition to the effects in the liquid crystal display device according to the second embodiment.

In the liquid crystal display device according to the eighth embodiment, the wall pixel electrodes SE and the second common electrodes CE2 are formed in the same layer, and thus, they are both formed in a layer above the fourth insulating film IL4, and therefore, special effects can be gained such that the fourth insulating film IL4 and the second common electrodes CE2 can be formed in the same process in the case where the wall pixel electrodes SE are formed of a transparent conductive film, like the second common electrodes CE2.

In the liquid crystal display device according to the eighth embodiment, second common electrodes CE2 are formed in a layer beneath the fourth insulating film IL4 (on the fourth insulating film IL4 on the second substrate SU2 side), which is provided in order to make the height of the wall pixel electrodes SE greater than the thickness of the liquid crystal layer LC, that is to say, in order to increase the transparency during the driving for inverting the display pixel by pixel. This structure allows the distance between the first common electrodes CE1 and the second common electrodes CE2 to be greater than the thickness of the liquid crystal layer LC. However, as shown in the first embodiment, in the liquid crystal display devices where the height of the wall pixel electrodes SE and the thickness of the liquid crystal layer LC are approximately the same, the same effects of a misalignment as described above can be gained in the case of driving for inverting the display column by column by making the distance between the first common electrodes CE1 and the second common electrodes CE2 greater than the thickness of the liquid crystal layer LC.

Ninth Embodiment

Figure 42:
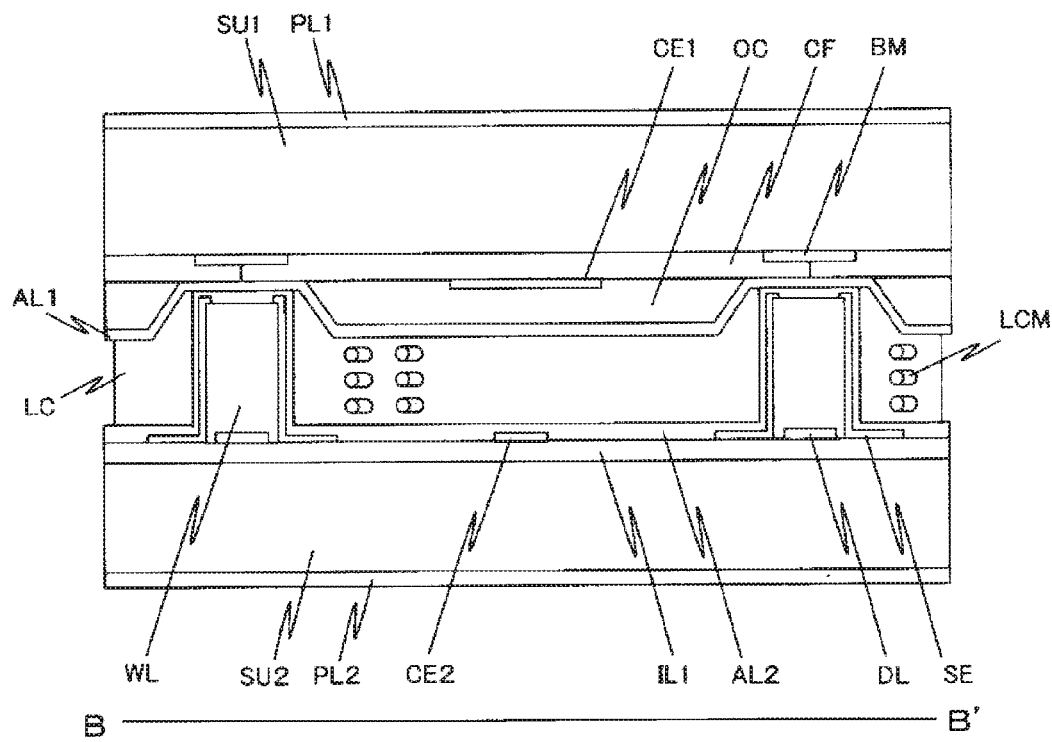
FIG. 42 is a cross-sectional diagram for illustrating the structure of a pixel in the liquid crystal display device according to the ninth embodiment of the present invention.

FIG. 42 is a cross-sectional diagram for illustrating the structure of a pixel in the liquid crystal display device according to the ninth embodiment of the present invention, which is the same as that of the liquid crystal display device according to the fourth embodiment, except the locations in which the first common electrodes CE1 are formed. Accordingly, in the following, the first common electrodes CE1 and the pseudo-wall common electrodes are described in detail.

As shown in FIG. 42, a first insulating film ILL drain lines DL, a second common electrode CE2 and wall bases WL are formed on the second substrate SU2 on the liquid crystal side as in the liquid crystal display device according to the fourth embodiment. In addition, wall pixel electrodes SE are formed on the top surface and a side of a wall base WL and on the upper surface of the second insulating film IL2 in the vicinity of the wall base WL, the second insulating film IL2 is formed so as to cover the surfaces exposed from these, and a second alignment film AL2 is formed in a layer above the second insulating film IL2, and thus, the second substrate SU2 is formed.

Meanwhile, a black matrix BM is formed on the first substrate SU1 on the liquid crystal side, and color filters CF are formed so as to cover the black matrix BM. In the liquid crystal display panel PNL according to the ninth embodiment, first common electrodes CE1 are formed in a layer above the color filters CF and an overcoat layer OC is formed so as to cover the first common electrodes CE1. In the liquid crystal display panel PNL according to the ninth embodiment, recesses for exposing the upper surface of the color filters CF through the overcoat layer OC are created in the overcoat layer OC along the regions where the wall bases WL are formed as in the overcoat layer OC according to the fourth embodiment. A first alignment film AL1 is formed on the entirety of the second substrate SU2 in a layer above the overcoat layer OC so as to cover the overcoat layer OC and the surface of the color filters CF exposed from the overcoat layer OC.

The first substrate SU1 and the second substrate SU2 having the above-described structure are placed so as to face each other with a liquid crystal layer LC in between so that one end portion of the wall pixel electrodes SE including the wall bases WL enters into a recess created in the overcoat layer OC, and thus, the liquid crystal display panel PNL according to the ninth embodiment is formed. In the liquid crystal display device according to the ninth embodiment, the overcoat layer OC is made of a relatively thick film (preferably with a film thickness of 2.0 µm or greater), and therefore, the height of the wall pixel electrodes SE is greater than the thickness of the liquid crystal layer LC by the film thickness of the overcoat layer OC, and thus, the same effects as in the liquid crystal display device according to the fourth embodiment can be gained.

In addition, the liquid crystal display device according to the ninth embodiment has such a structure that the first common electrodes CE1 are formed in a layer beneath the overcoat layer OC. That is to say, the first common electrodes CE1 are formed between the overcoat layer OC and the color filters CF. Accordingly, in the liquid crystal display device according to the ninth embodiment as well, even in the case where there is a positional misalignment between the first common electrodes CE1 and the second common electrodes CE2 resulting from a positional misalignment when the first substrate SU1 and the second substrate SU2 are pasted together, such special effects can be gained that the transmittance can be prevented from lowering due to this positional misalignment as described in the following section of the effects. Furthermore, it is possible to reduce the ratio of defects resulting from the positional misalignment between the first substrate SU1 and the second substrate SU2, and such special effects can be gained that the productivity can be increased.

<Concerning Effects of Preventing Transmittance from Lowering at the Time of Positional Misalignment of First and Second Common Electrodes>

Figure 43:
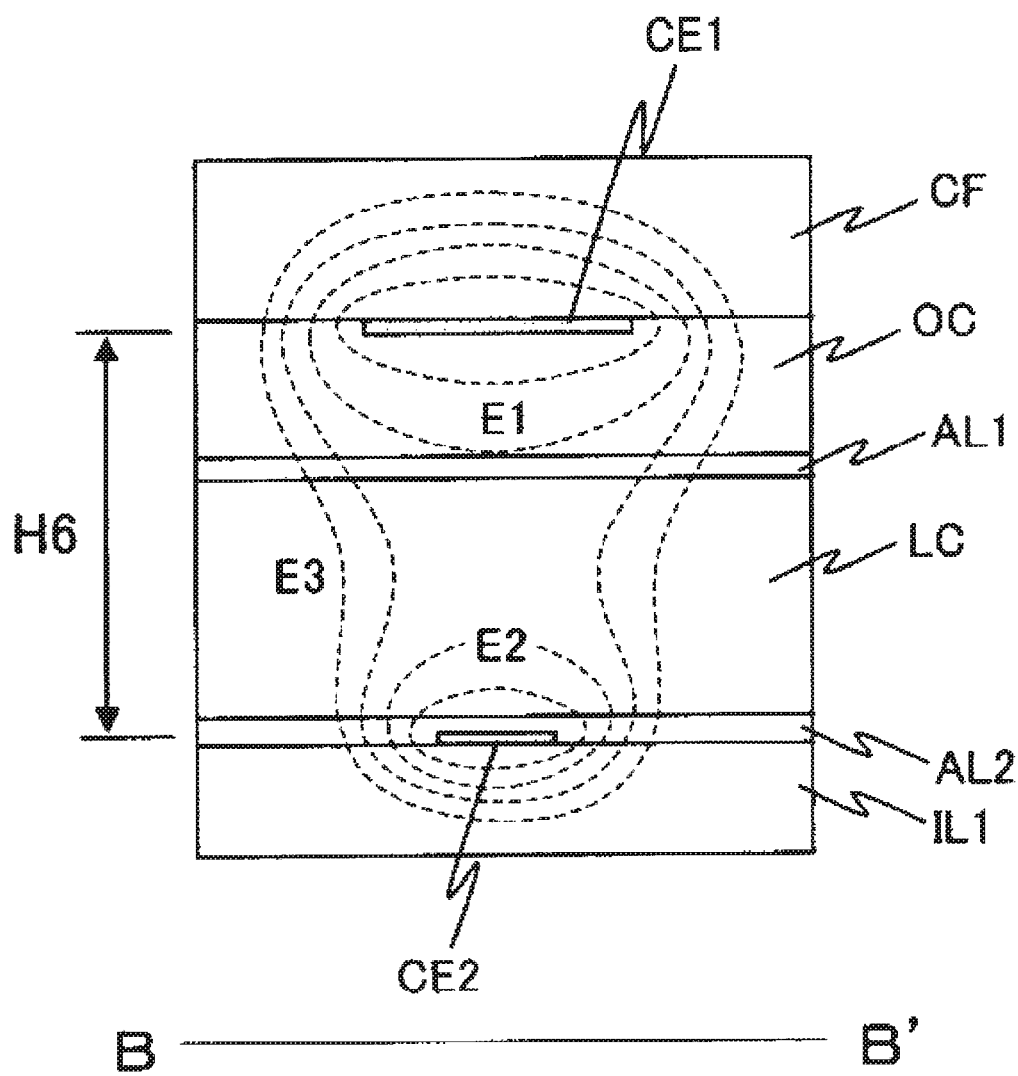
FIG. 43 is a diagram showing an enlargement of a portion of a pseudo-wall common electrode in the case where there is no positional misalignment between the first common electrode and the second common electrode in the liquid crystal display device according to the ninth embodiment of the present invention.
Figure 44:
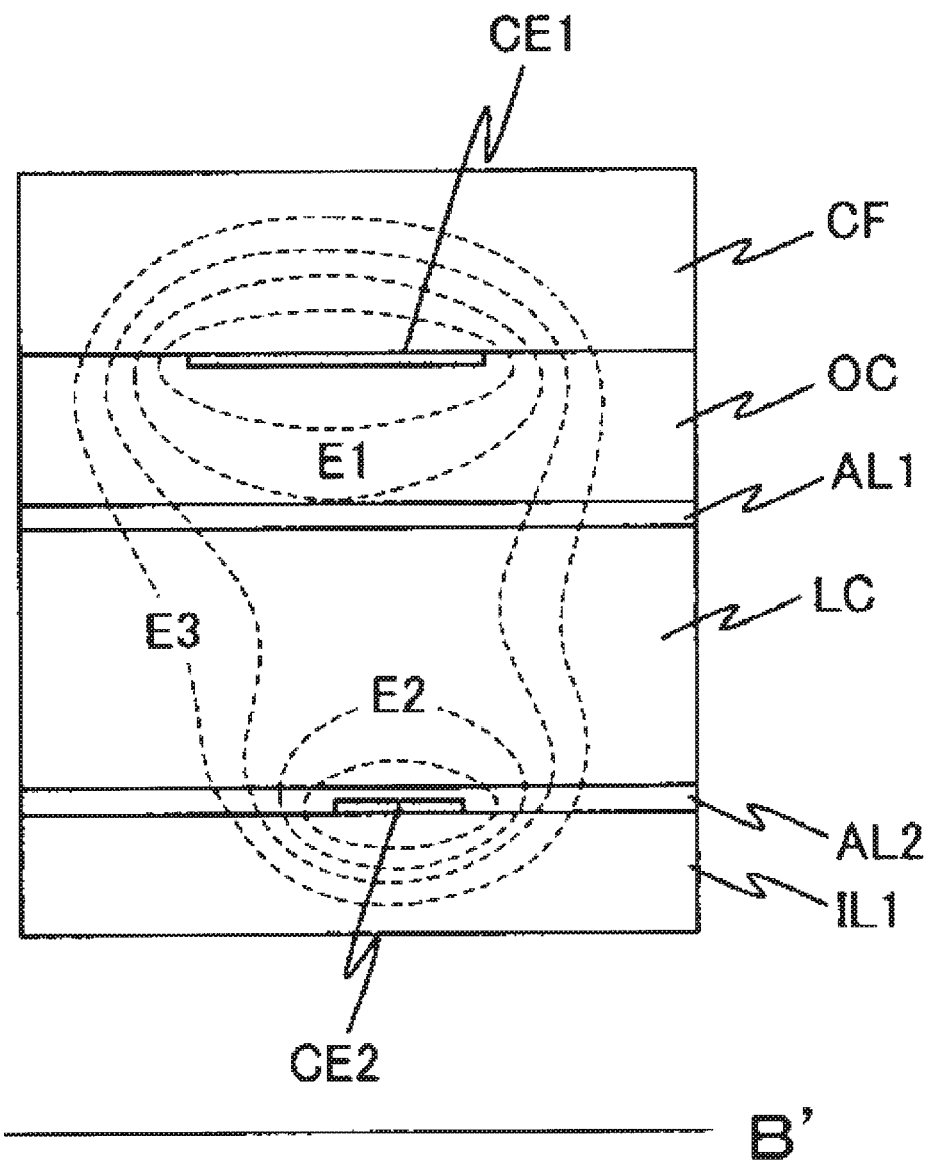
FIG. 44 is a diagram showing an enlargement of a portion of a pseudo-wall common electrode in the case where there is a positional misalignment between the first common electrode and the second common electrode in the liquid crystal display device according to the ninth embodiment of the present invention.

FIG. 43 is a diagram showing an enlargement of a pseudo-wall common electrode portion in the liquid crystal display device according to the ninth embodiment of the present invention, and FIG. 44 is a diagram showing the distribution of equipotential surfaces in the case where there is a positional misalignment in the pseudo-wall common electrode in FIG. 43.

As shown in FIG. 43, first and second alignment films AL1 and AL2, a liquid crystal layer LC and an overcoat layer OC are formed between the first common electrodes CE1 and the second common electrodes CE2. Accordingly, in the case where there is no positional misalignment, the equipotential surface E1 surrounding a first common electrode CE1 is formed around the first common electrode CE1 including part of the overcoat layer OC, and the equipotential surface E2 surrounding a second common electrode CE2 is formed around the second common electrode CE2 including part of the liquid crystal layer LC. In addition, the equipotential surface E3 surrounding both the first common electrode CE1 and the second common electrode CE2 that form a pseudo-wall common electrode includes part of the liquid crystal layer that includes the first and second alignment films AL1 and AL2 as well as part of the overcoat layer OC.

Here, the liquid crystal display device according to the ninth embodiment is formed as in the eighth embodiment so that the thickness of the liquid crystal layer LC is the same as that of the liquid crystal display device according to the first embodiment, and therefore, the equipotential surface E3 is expanded in the direction of the normal to the liquid crystal display panel PNL, that is to say, in the direction of the thickness. Furthermore, the first common electrodes CE1 are formed in a layer beneath the overcoat layer OC, and therefore, the first common electrodes CE1, which are electrodes having greater width, are formed in such locations as to be far away from the liquid crystal layer LC in comparison with the liquid crystal display device according to the first embodiment, and thus, the equipotential surface E3 that is distributed in the liquid crystal layer LC is narrower in the width.

Meanwhile, in the case where there is the same positional misalignment as in FIG. 8, as shown in FIG. 44, in the distribution of the equipotential surfaces created between a first common electrode CE1 and a second common electrode CE2, the equipotential surface E3 surrounding the first common electrode CE1 and the second common electrode CE2 is inclined in the direction in which the substrates are misaligned. In the structure according to the ninth embodiment, as is clear from FIG. 44, the inclination of the equipotential surface E3 is small because the distance between the first common electrode CE1 and the second common electrode CE2 is greater, which makes the angle of inclination of the equipotential surface E3 smaller relative to the direction of the normal to the liquid crystal display panel PNL for the same amount of misalignment.

The curve G14 in FIG. 35 shows the transmittance of a pixel when white is displayed during the driving for inverting the display pixel by pixel relative to the amount of misalignment between the first common electrodes CE1 and the second common electrodes CE2 in the liquid crystal display device according to the ninth embodiment. As is clear from this curve G14, the structure of the pseudo-wall electrode in the ninth embodiment provides a transmittance of 87% in the case where there is no positional misalignment (amount of misalignment SH is 0 μm). In addition, when SH=0.5 μm, SH=1.0 μm, SH=1.5 μm, SH=2.0 μm, SH=2.5 μm and SH=3.0 μm, the transmittance is 87%, 87%, 87%, 86%, 85% and 84%, respectively.

As described above, the structure according to the ninth embodiment provides a transmittance of 84% when the amount of misalignment SH is 3.0 μm, and therefore, the reduction in the transmittance due to the misalignment between the first substrate SU1 and the second substrate SU2 can be limited to approximately 3%, and thus, special effects can be gained such that an approximately constant transmittance for white display can be gained irrelevant of the misalignment between the first substrate SU1 and the second substrate SU2.

Figure 45:
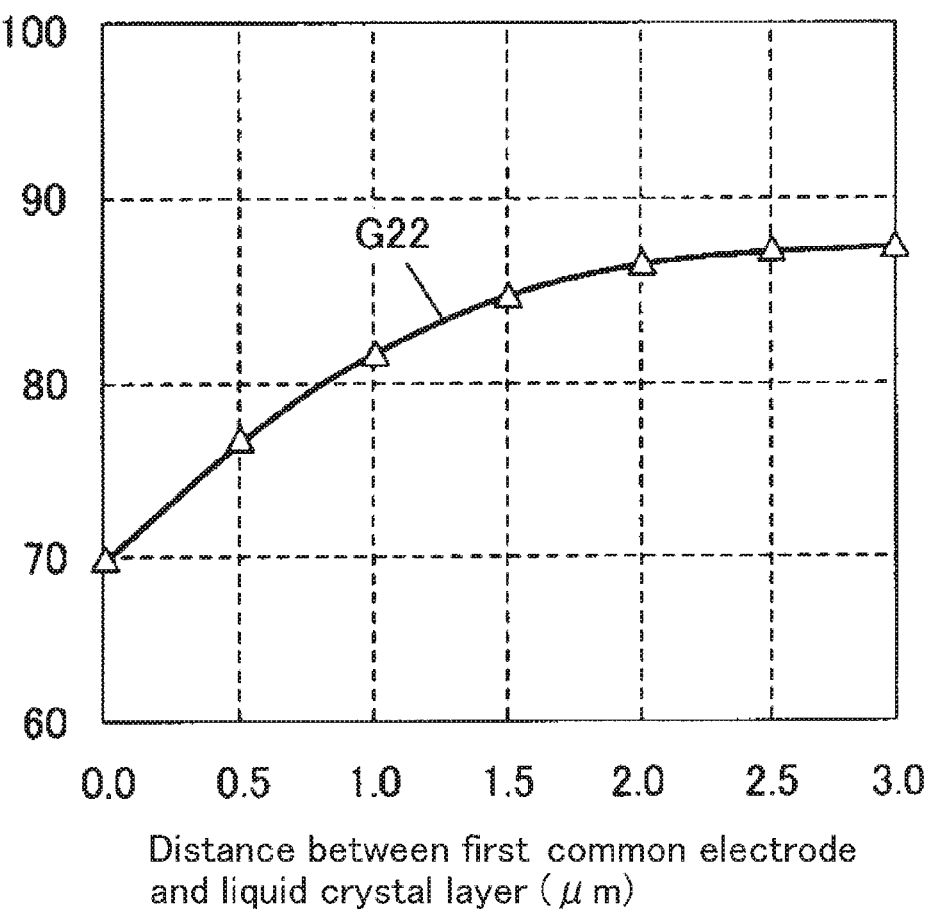
FIG. 45 is a graph for illustrating the dependency of the transmittance on the distance between the first common electrode and the liquid crystal layer when the liquid crystal display device according to the ninth embodiment of the present invention is operated so that each pixel is inverted and white is displayed in the case where there is a positional misalignment of 3 μm between the first common electrode and the second common electrode.

FIG. 45 is a graph for illustrating the dependency of the transmittance for white display during the driving for inverting the display pixel by pixel on the distance between the first common electrode CE1 and the liquid crystal layer LC in the case where the positional misalignment between the first substrate SU1 and the second substrate SU2 is 3 μm in the liquid crystal display device according to the ninth embodiment.

As is clear from the curve G22 in FIG. 45, the transmittance for white display is 70% in the case where the first common electrode CE1 and the liquid crystal layer LC are in close proximity to each other. However, the transmittance increases as the distance K1 between the first common electrode CE1 and the liquid crystal layer LC increases, and when K1=0.5 μm, K1=1.0 μm, K1=1.5 μm, K1=2.0 μm, K1=2.5 μm and K1=3.0 μm, the transmittance is 77%, 81%, 84%, 86%, 87% and 88%. Thus, in the case where the distance K1 between the first common electrode CE1 and the liquid crystal layer LC is 2.0 μm or greater, the transmittance is 86% or greater, and therefore, almost the same transmittance for white display as in the case where there is no misalignment between the first substrate SU1 and the second substrate SU2 can be gained.

Figure 46:
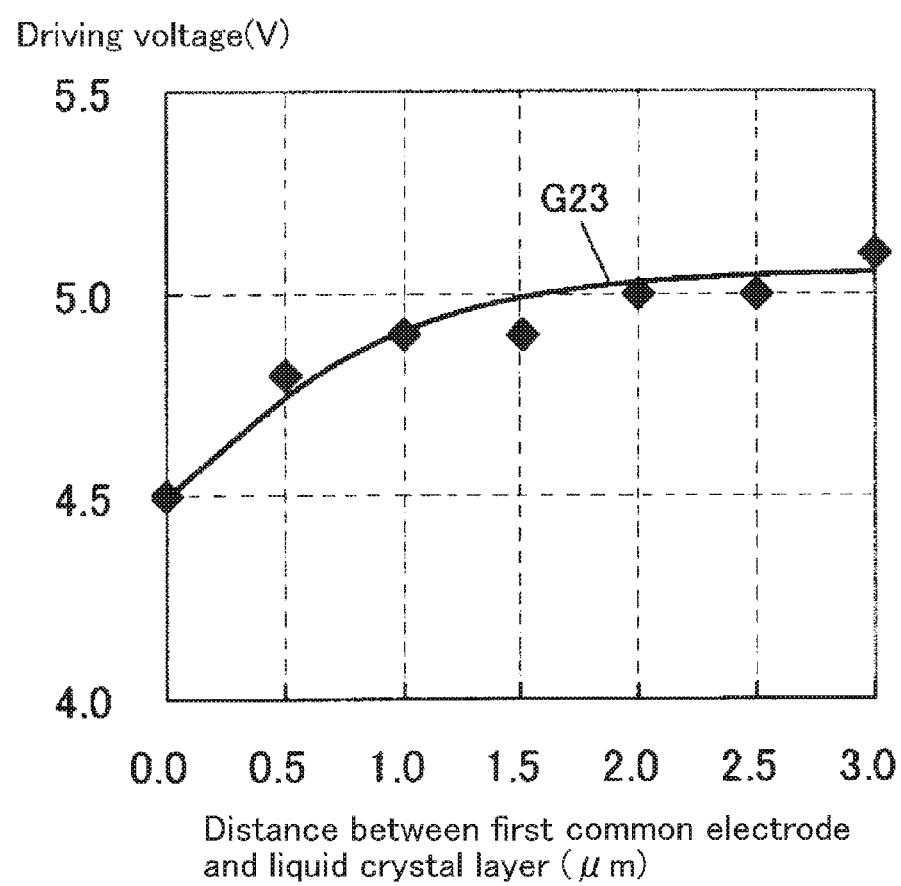
FIG. 46 is a graph for illustrating the relationship between the operating voltage and the distance between the first common electrode and the liquid crystal layer in the liquid crystal display device according to the ninth embodiment of the present invention.

FIG. 46 is a graph for illustrating the relationship between the driving voltage and the distance between the first common electrode and the liquid crystal layer in the liquid crystal display device according to the ninth embodiment of the present invention, and shows a voltage (driving voltage) applied between the wall pixel electrode SE and the pseudo-wall common electrode for a display (white display) with a predetermined transmittance in the case where the distance H6 between the first common electrode and the liquid crystal layer (see FIG. 43) varies in the structure according to the ninth embodiment in FIG. 42.

As is clear from the curve G23 in FIG. 46, the driving voltage Vpc is 4.5V in the case where the distance H6 between the first common electrode CE1 and the liquid crystal layer LC is 0 μm. In addition, when H6=0.5 μm, H6=1.0 μm, H6=1.5 μm, H6=2.0 μm, H6=2.5 μm and H6=3.0 μm, Vpc is 4.8V, 4.8V, 4.9V, 5.0V, 5.0V and 5.1V, respectively.

Thus, in the structure according to the ninth embodiment as well, the driving voltage Vpc tends to increase as the distance H6 between the first common electrode CE1 and the liquid crystal layer LC increases. However, the increase in the driving voltage Vpc tends to saturate, and the increase is gradual when the distance H6 between the first common electrode CE1 and the liquid crystal layer LC is 1.5 μm or greater. That is to say, it is clear for the liquid crystal display device according to the ninth embodiment to be able to provide a high transmittance for white display while limiting the increase of the driving voltage Vpc by setting the distance H6 between the first common electrode CE1 and the liquid crystal layer LC to 1.5 μm or greater. Accordingly, it is preferable for the liquid crystal display device according to the ninth embodiment to be formed so that the distance H6 between the first common electrode CE1 and the liquid crystal layer LC is 1.5 μm or greater. Furthermore, it is preferable for the driving voltage Vpc to be approximately 5.0V.

In the liquid crystal display device according to the ninth embodiment, the first common electrodes CE1 are formed on the overcoat layer OC on the lower layer side (on the first substrate SU1 side) so that the distance between the first common electrodes CE1 and the second common electrodes CE2 is greater than the thickness of the liquid crystal layer LC (structure for driving for inverting the display pixel by pixel). However, even in the liquid crystal display devices where the height of the wall pixel electrodes SE and the thickness of the liquid crystal layer LC are approximately the same as in the first embodiment, the same effects as those described above can be gained for the misalignment in the case where the distance between the first common electrode CE1 and the second common electrode CE2 is greater than the thickness of the liquid crystal layer LC, and the driving for inverting the display column by column is carried out.

Tenth Embodiment

Figure 47:
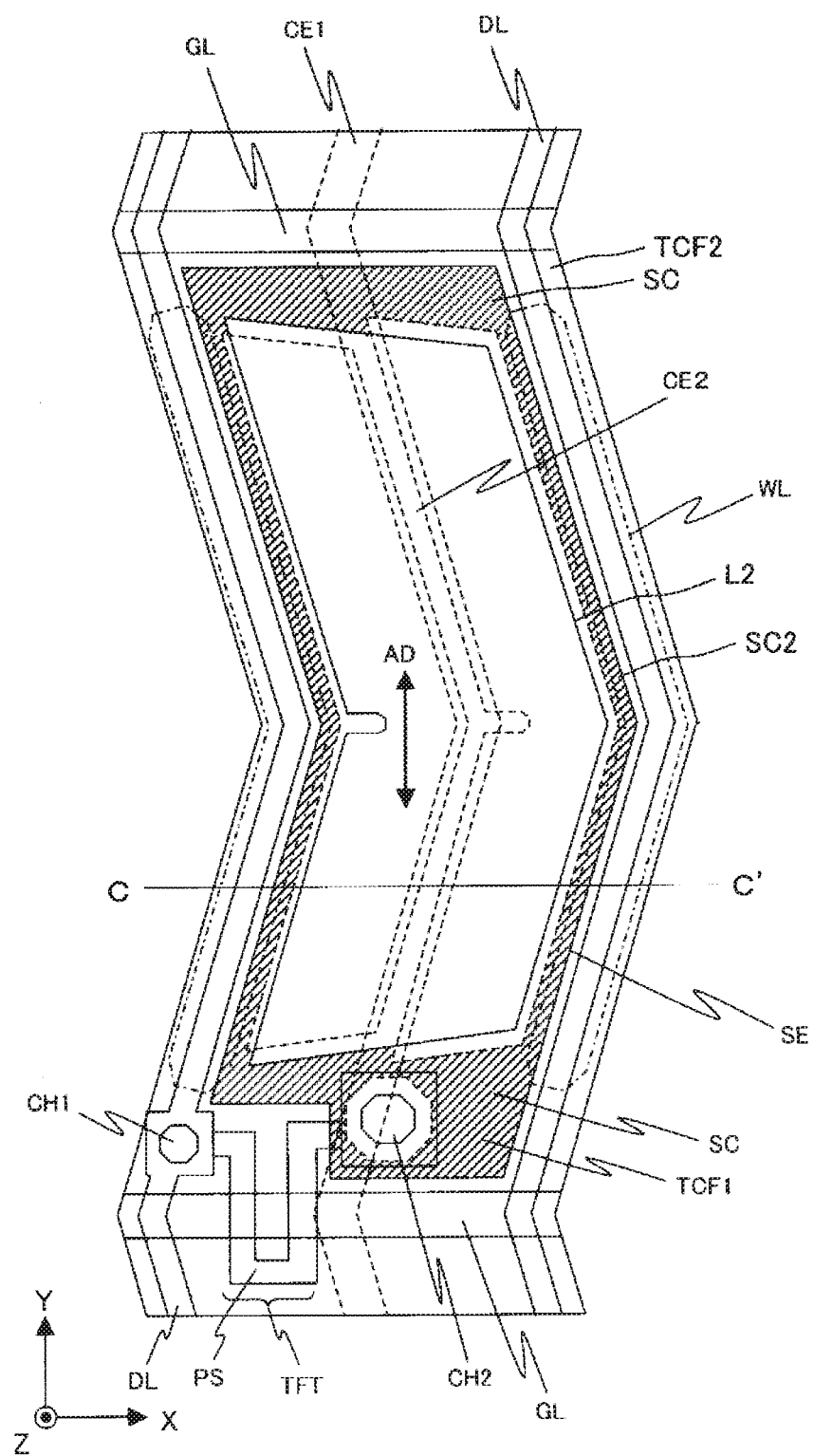
FIG. 47 is a plan diagram for schematically illustrating the structure of the liquid crystal display device according to the tenth embodiment of the present invention.
Figure 48:
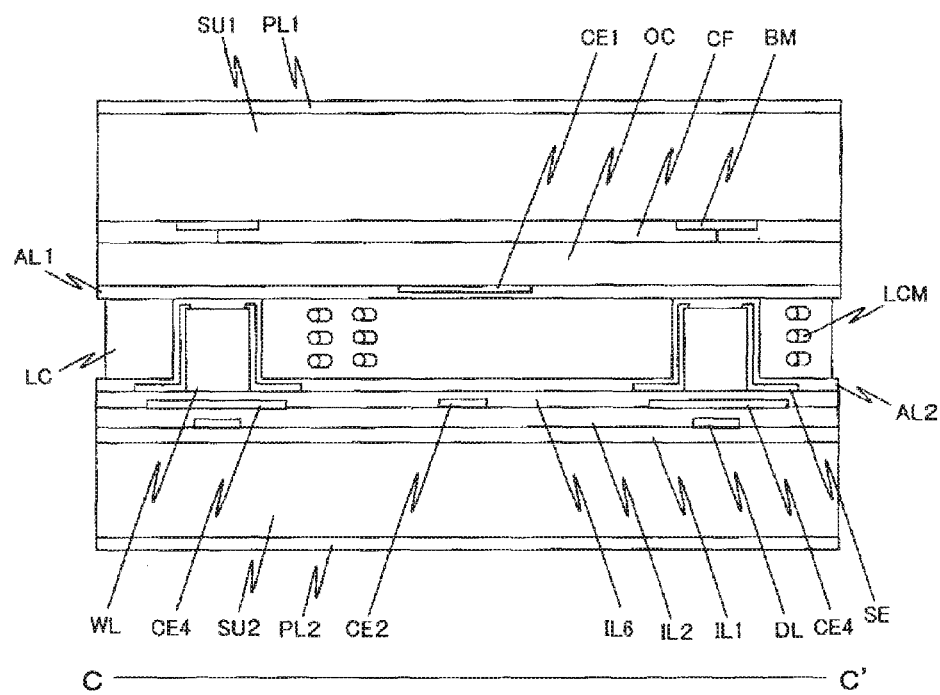
FIG. 48 is a cross-sectional diagram along line C-C' in FIG. 47.
Figure 49:
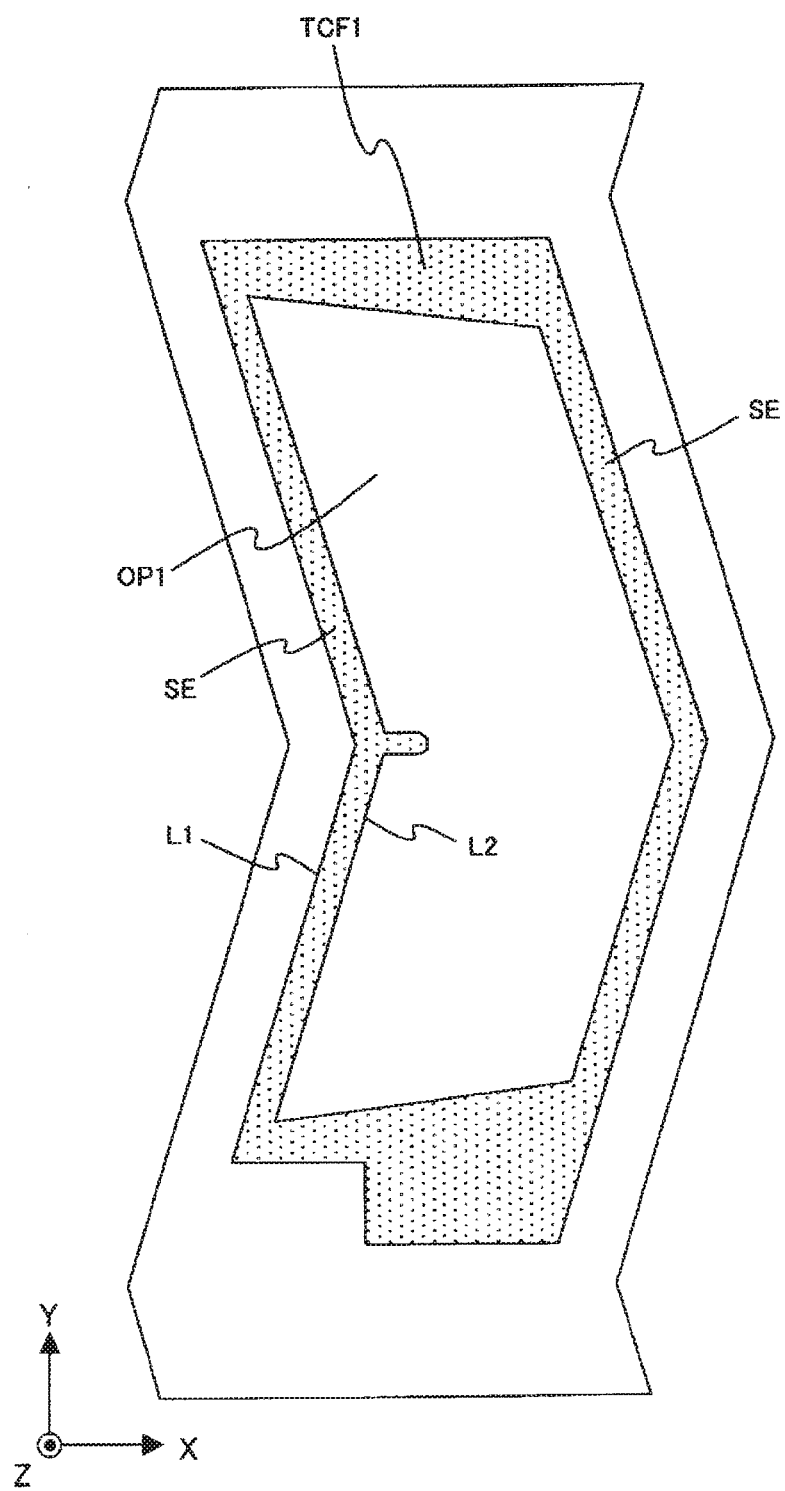
FIG. 49 is a diagram for illustrating the structure of a first transparent conductive film for forming a wall pixel electrode in the liquid crystal display device according to the tenth embodiment.
Figure 50:
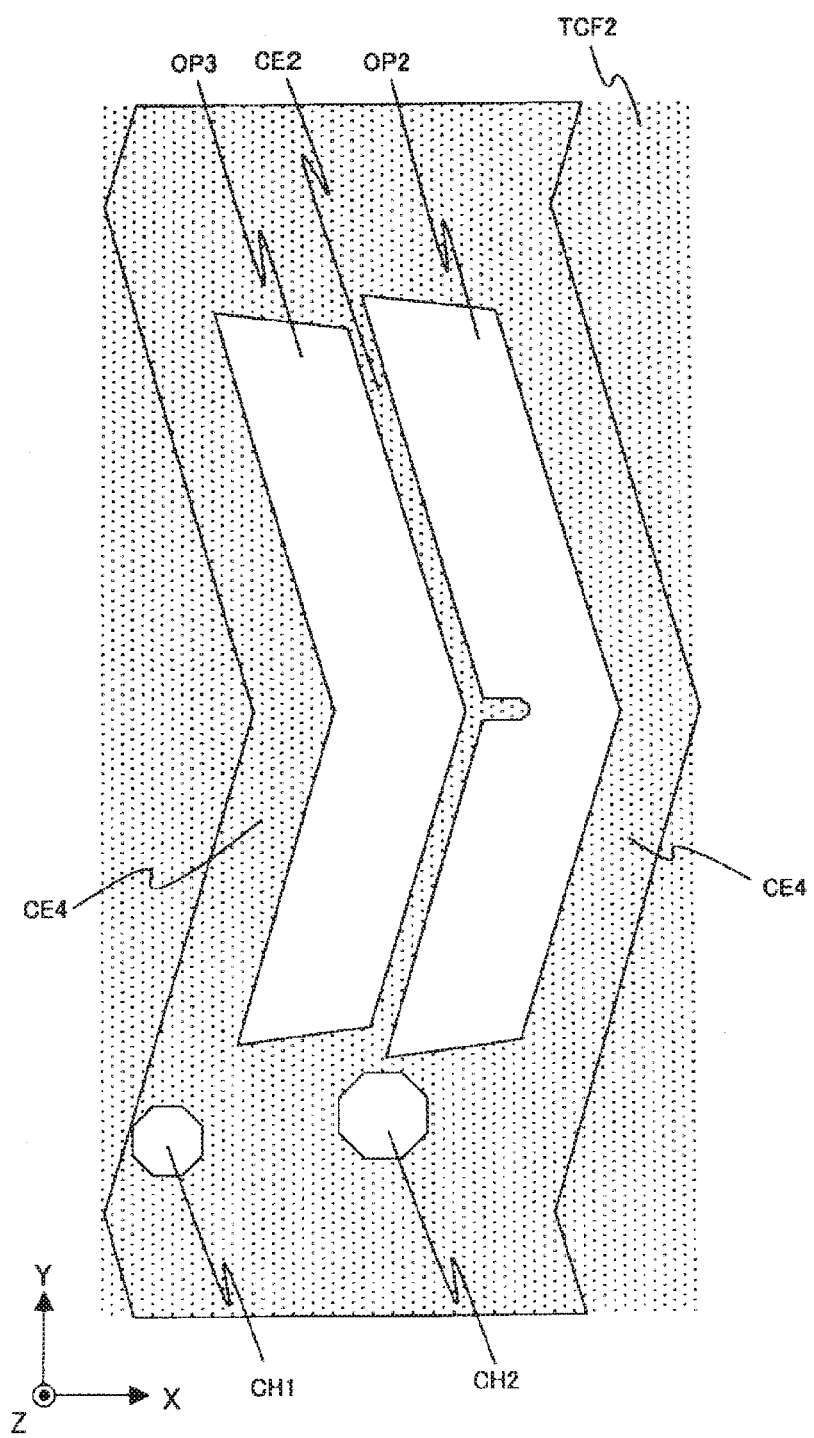
FIG. 50 is a diagram for illustrating the structure of a second transparent conductive film for forming the second common electrode and the fourth common electrode in the liquid crystal display device according to the tenth embodiment.

FIG. 47 is a plan diagram for schematically illustrating the structure of the liquid crystal display device according to the tenth embodiment of the present invention, and FIG. 48 is a cross-sectional diagram along line C-C' in FIG. 47. In addition, FIG. 49 is a diagram for illustrating the structure of the first transparent conductive film for forming wall pixel electrodes in the liquid crystal display device according to the tenth embodiment, and FIG. 50 is a diagram for illustrating the structure of the second transparent conductive film for forming second common electrodes and fourth common electrodes in the liquid crystal display device according to the tenth embodiment. Here, the liquid crystal display device according to the tenth embodiment has the same structure as the liquid crystal display device according to the first embodiment, expect the structures of the fourth common electrodes CE4 and the sixth insulating film IL6. Accordingly, in the following, the structures of the fourth common electrodes CE4 and the sixth insulating film IL6 are described in detail.

In the liquid crystal display device according to the first embodiment, the second transparent conductive film TCF2 for forming the second common electrodes CE2 and the first transparent conductive film TCF1 for forming the wall pixel electrodes SE overlap in end portions of pixels in the proximity to the gate lines GL (hatched regions SC in FIG. 2) so that capacitors are formed, and no electrical field is applied to the liquid crystal layer LC in these regions SC, which are therefore non-opening portions (non-transmittance regions). Meanwhile, in IPS mode liquid crystal display devices, common electrodes in plate form and linear pixel electrodes overlap so that capacitors are formed in opening portions. Thus, the electrodes used to apply a voltage to the liquid crystal layer can also be used as a capacitor so that the aperture ratio and the transmittance can be increased.

In contrast, as is clear from FIG. 48, in the liquid crystal display device according to the tenth embodiment, the second common electrodes CE2 and the fourth common electrodes CE4 are provided between the first insulating layer IL1 and the second insulating layer IL2, and the wall bases WL are formed on the third insulating layer IL3. Furthermore, wall pixel electrodes SE are formed in a layer above them in such a manner that the flat portions HP of the wall pixel electrodes SE overlap the fourth common electrodes CE4 with the second insulating layer IL2 in between. These portions where the flat portion HP of a wall pixel electrode SE and a fourth common electrode CE4 overlap are capacitors.

In the liquid crystal display device according to the tenth embodiment in particular, the fourth common electrodes CE4 are provided so as to be placed inside the flat portions HP of the wall pixel electrodes SE. If they are placed outside the flat portions HP of the wall pixel electrodes SE, an electrical field concentrates between a wall pixel electrode SE and a fourth common electrode CE4 that are in proximity to each other so that the electrical field to be applied to the liquid crystal layer LC is greatly weakened, which lowers the transmittance. In the tenth embodiment, the fourth common electrodes CE4 are provided in side the flat portions HP of the wall pixel electrodes SE so that the intensity of the electrical field to be applied to the liquid crystal layer LC can be maintained.

In FIG. 47, broken lines show the outlines of first common electrodes CE1 and second common electrodes CE2, and one-dot chain lines show the outlines of wall bases WL. As described above, the second common electrodes CE2 are provided in a layer beneath the wall pixel electrodes SE, and therefore, contact holes CE2 pass through the second common electrodes CE2, and thus, in FIG. 47, the contact hole CH2 is surrounded by a broken line showing the border with a second common electrode CE2. The portions where a second common electrode CE2 and a wall pixel electrode SE overlap function as capacitors, and the hatched portion in FIG. 47 is a capacitor. As is clear from the comparison of the liquid crystal display device according to the tenth embodiment in FIG. 47 with that in FIG. 2, the capacitors in the tenth embodiment are located closer to the gate lines GL, and as a result, the wall bases WL run closer to the gate lines GL so that the openings (transmission portions) are greater. Here, the liquid crystal display device according to the tenth embodiment in FIG. 47 and that according to the first embodiment in FIG. 2 have capacitors with the same area, and the liquid crystal display device according to the tenth embodiment has greater openings (transmission portions) because parts of the capacitors are provided in the vicinity of the drain lines DL.

As shown in FIG. 47, the liquid crystal display device according to the tenth embodiment has pixel regions between the drain lines DL and between the gate lines GL, like the liquid crystal display device according to the first embodiment. In addition, each pixel region is made of an upper region and a lower region aligned in the longitudinal direction (Y direction) where the upper region and the lower region are inclined in different directions so that they are symmetrical relative to the Y direction, and the structure allows the upper region and the lower region to be connected in the center portion of the pixel. In the upper region and the lower region as well, an initial alignment process in the direction shown by the arrow AD in the figure is carried out so that the liquid crystal molecules are initially aligned in the same direction.

As shown in FIG. 48, the liquid crystal display device according to the tenth embodiment also has such a structure where a first substrate SU1 on which color filters are formed and a second substrate SU2 on which thin film transistors are formed are provided so as to face each other with a liquid crystal layer LC in between. In addition, a first polarizing plate PL1 is provided on the outer side (display side) of the first substrate SU1 and a second polarizing plate PL2 is provided on the outer side (rear side) of the second substrate SU2.

As in the liquid crystal display device according to the first embodiment, a black matrix BM, color filters CF, an overcoat layer OC, first common electrodes CE1 and a first alignment film AL1 are formed in this order on the first substrate SU1 on the liquid crystal side.

Meanwhile, a first insulating film ILL drain lines DL, a second insulating film IL2 and second common electrodes CE2 are formed in this order on the second substrate SU2 on the liquid crystal side. In the liquid crystal display device according to the tenth embodiment, fourth common electrodes CE4 are formed in the same layer as the second common electrodes CE2 so as to overlap at least the wall pixel electrodes SE. A sixth insulating film IL6 is formed on the entire surface of the second substrate SU2 in a layer above the fourth common electrodes CE4 and the second common electrodes CE2 so as to cover the fourth common electrodes CE4 and the second common electrodes CE2. The wall bases WL and the flat portions of the wall pixel electrodes SE are formed in a layer above the sixth insulating film IL6, and the vertical portions and the top portions of the wall pixel electrodes SE are formed on the sidewalls and the top surface of the wall bases WL, respectively, and a second alignment film AL2 is formed so as to cover the surfaces exposed from these.

In the liquid crystal display device according to the tenth embodiment in particular, as shown in FIG. 50, a second transparent conductive film TCF2 is formed on the entire surface of the first substrate SU1, and openings OP2 and OP3 are created in the second transparent conductive film TCF2 within the transmission region of each pixel so that the region sandwiched between the two openings OP2 and OP3 forms a second common electrode CE2. In addition, the region sandwiched between the opening OP2 of a pixel created in the second transparent conductive film TCF2 and the opening OP3, not shown, of its adjacent pixel forms a fourth common electrode CE4.

In addition, as shown in FIG. 49, the first transparent conductive film TCF1 for forming wall pixel electrodes SE has a portion in annular form along drain lines DL and gate lines GL where the region (hatched region) between the outer periphery L1 and the inner periphery (periphery of the opening OP1) L2 is the portion formed of the first transparent conductive film TCF1. In the liquid crystal display device according to the tenth embodiment, the portions that run in the longitudinal direction of each pixel are wall pixel electrodes SE, like in the liquid crystal display device according to the first embodiment.

In the liquid crystal display device according to the tenth embodiment, the structure allows the first transparent conductive film TCF1 and the second transparent conductive film TCF2 to overlap with the sixth insulating film IL6 in between in the regions within the pixels on the upper end and lower end sides, like in the liquid crystal display device according to the first embodiment. Furthermore, as is clear from FIG. 50, a fourth common electrode CE4 is formed of the second transparent conductive film TCF2 in the region sandwiched between the opening OP2 of a pixel created in the second transparent conductive film TCF2 and the opening OP3, not shown, of its adjacent pixel, that is to say, the second transparent conductive film TCF2 in the region between the pixel and its adjacent pixel, and the structure allows the fourth common electrode CE4 to overlap a wall pixel electrode SE with the sixth insulating film IL6 in between.

This structure of the liquid crystal display device according to the tenth embodiment allows the hatched region SC in FIG. 47 to surround the transmission region of the pixel along the periphery of the pixel region so that this region SC works as a capacitor for this pixel. That is to say, in the liquid crystal display device according to the tenth embodiment, the structure provides parts of a capacitor in the side regions of a pixel region made of an upper end portion and a lower end portion in the width direction (Y direction), and at the same time in the side regions in the longitudinal direction (X direction) of the pixel region, like in the liquid crystal display device according to the first embodiment.

Here, the fourth common electrodes CE4 and the wall pixel electrodes SE are formed so that the regions where the flat portions for forming wall pixel electrodes SE and the fourth common electrodes CE overlap have a large area, and thus, the capacitors can be made large. Though in the tenth embodiment of the present invention the fourth common electrodes are formed in the liquid crystal display device according to the first embodiment, the invention is not limited to this. In other examples, the fourth common electrodes can be formed in the liquid crystal display device according to any of the second to fourth and sixth to ninth embodiments so that the capacitors can be made large, and the same effects as in the tenth embodiment can be gained.

As described above, the liquid crystal display device according to the tenth embodiment has such a structure that capacitors are formed using wall pixel electrodes SE, that is to say, parts of the capacitors are formed of the regions SC2 where the wall pixel electrodes SE that run in the longitudinal direction and the sixth insulating film IL6 overlap each other with the sixth insulating film IL6 in between. Accordingly, in the case where capacitors having the same capacitance as in the first embodiment are formed, the area of parts of the capacitors provided in the end portions of pixels in the proximity of the gate lines GL can be made smaller, that is to say, the area of the overlapping regions SC formed on the upper end and the lower end sides of the pixel regions in the longitudinal direction can be reduced. As a result, the same effects as in the first embodiment can be gained, and in addition, the area of the transmission regions where it is possible to drive liquid crystal molecules without lowering the capacitance can be increased so that the aperture ratio can be increased to 69% relative to 63% in the first embodiment, and thus, special effects can be gained such that the transmittance can be increased by approximately 10% as compared to the first embodiment.

Though in the second to fourth embodiments of the invention a thin film layer having a large thickness (thick film layer) is formed on either the first substrate SU1 or the second substrate SU2, and at the same time, the structure allows the wall pixel electrodes to be taller than the thickness of the liquid crystal layer, the structure may allow the first substrate SU1 and the second substrate SU2 to both have a thick film layer formed thereon.

Though the invention made by the present inventors is described in detail in reference to the embodiments, the present invention is not limited to the above-described embodiments, and various modifications are possible as long as the gist of the invention is not deviated from.

What is claimed is:

1. A liquid crystal display device, comprising: a second substrate having scan signal lines which run in an X direction and are aligned in a Y direction and video signal lines which run in the Y direction and are aligned in the X direction; and a first substrate that is provided so as to face said second substrate with a liquid crystal layer in between, with pixel regions between said scan signal lines and between said video signal lines being arranged in a matrix, characterized in that the liquid crystal display device comprises:

protrusions formed in borders between adjacent pixels and protruding from said second substrate on the liquid crystal side;

first electrodes made of sidewall electrodes formed on sidewalls of protrusions, and lower end side electrodes which extend from said sidewall electrodes on bottoms of the protrusions and run along said second substrate on the liquid crystal side, each of said first electrodes being made of at least a pair of sidewall electrodes formed along sides that face each other with a pixel region in between and a lower end side electrode located between the sidewall electrodes; and second electrodes made of first linear electrodes which are formed within said pixel regions on said first substrate side and run in the direction in which said first electrodes run, and second linear electrodes which are formed within said pixel regions on said second substrate side and run so as to face said first linear electrodes with said liquid crystal layer in between, wherein said first electrodes that reach from a lower side portion on said second substrate side on which said sidewall electrodes are formed to an upper side portion on said first substrate side have a height that is greater than a thickness of said liquid crystal layer in the pixel region sandwiched by said first electrodes, the liquid crystal display device has a first insulating thick film formed on said second substrate on the liquid crystal side and a first trench created in said first insulating thick film so as to run along a side of a pixel region, and a side portion of a sidewall electrode on the bottom side is integrally connected to a lower end side electrode at the bottom of said first trench.

2. The liquid crystal display device according to claim 1, wherein said first trench penetrates through said first insulating thick film so that a surface of a thin film layer is exposed from beneath, and a protrusion is provided and stands on a surface of the thin film layer that is exposed beneath through said first trench, and said lower end side electrode is formed along the surface of the thin film layer exposed beneath through said first trench.

3. A liquid crystal display device, comprising: a second substrate having scan signal lines which run in an X direction and are aligned in a Y direction and video signal lines which run in the Y direction and are aligned in the X direction; and a first substrate that is provided so as to face said second substrate with a liquid crystal layer in between, with pixel regions between said scan signal lines and between said video signal lines being arranged in a matrix, characterized in that the liquid crystal display device comprises:

protrusions formed in borders between adjacent pixels and protruding from said second substrate on the liquid crystal side;

first electrodes made of sidewall electrodes formed on sidewalls of protrusions, and lower end side electrodes which extend from said sidewall electrodes on bottoms of the protrusions and run along said second substrate on the liquid crystal side, each of said first electrodes being made of at least a pair of sidewall electrodes formed along sides that face each other with a pixel region in between and a lower end side electrode located between the sidewall electrodes; and second electrodes made of first linear electrodes which are formed within said pixel regions on said first substrate side and run in the direction in which said first electrodes run, and second linear electrodes which are formed within said pixel regions on said second substrate side and run so as to face said first linear electrodes with said liquid crystal layer in between, wherein said first electrodes that reach from a lower side portion on said second substrate side on which said sidewall electrodes are formed to an upper side portion on said first substrate side have a height that is greater than a thickness of said liquid crystal layer in the pixel region sandwiched by said first electrodes, the liquid crystal display device has an insulating film on which said protrusions are provided and stand and a second insulating thick film formed so as to cover said insulating film and said first electrodes, said second insulating thick film is formed so that the film thickness in a region sandwiched between a pair of first electrodes is greater than the film thickness in a top portion of said protrusions, and said first electrodes has a height that is greater than the thickness of said liquid crystal layer in a region sandwiched between a pair of first electrodes.

4. The liquid crystal display device according to claim 3, wherein said first substrate comprises color filters for a color display, a light blocking film formed at least in a region between said color filters, and a flattening layer which is formed in a layer above said color filters and said light blocking film and flattens a surface on the liquid crystal side, the liquid crystal display device has a second trench created in said flattening layer so as to run along a side of a pixel region, and the top side of a protrusion is placed in said second trench.

5. A liquid crystal display device, comprising: a second substrate having scan signal lines which run in an X direction and are aligned in a Y direction and video signal lines which run in the Y direction and are aligned in the X direction; and a first substrate that is provided so as to face said second substrate with a liquid crystal layer in between, with pixel regions between said scan signal lines and between said video signal lines being arranged in a matrix, characterized in that the liquid crystal display device comprises:

protrusions formed in borders between adjacent pixels and protruding from said second substrate on the liquid crystal side;

first electrodes made of sidewall electrodes formed on sidewalls of protrusions, and lower end side electrodes which extend from said sidewall electrodes on bottoms of the protrusions and run along said second substrate on the liquid crystal side, each of said first electrodes being made of at least a pair of sidewall electrodes formed along sides that face each other with a pixel region in between and a lower end side electrode located between the sidewall electrodes; and second electrodes made of first linear electrodes which are formed within said pixel regions on said first substrate side and run in the direction in which said first electrodes run, and second linear electrodes which are formed within said pixel regions on said second substrate side and run so as to face said first linear electrodes with said liquid crystal layer in between, wherein said first electrodes that reach from a lower side portion on said second substrate side on which said sidewall electrodes are formed to an upper side portion on said first substrate side have a height that is greater than a thickness of said liquid crystal layer in the pixel region sandwiched by said first electrodes, said first electrodes are made of a first conductive film in annular form around the sides of the pixels, said second linear electrodes are made of a second conductive film which is formed so as to cover the entire surface of the second substrate on the liquid crystal side, is aligned in a direction of a width of the pixels, and has two openings created so as to sandwich the second linear electrode, and said first conductive film and said second conductive film overlap along the sides of each pixel, and the region that overlaps is in annular form surrounding the pixel region.

6. The liquid crystal display device according to claim 5, wherein said pixel regions are made of at least first pixel regions where said first electrodes and said second electrodes run in a first direction and second pixel regions where said first electrodes and said second electrodes run in a second direction.

7. A liquid crystal display device, comprising: a second substrate having scan signal lines which run in an X direction and are aligned in a Y direction and video signal lines which run in the Y direction and are aligned in the X direction; and a first substrate that is provided so as to face said second substrate with a liquid crystal layer in between, with pixel regions between said scan signal lines and between said video signal lines being arranged in a matrix, characterized in that the liquid crystal display device comprises:

protrusions formed in borders between adjacent pixels and protruding from said second substrate on the liquid crystal side;

first electrodes made of sidewall electrodes formed on sidewalls of protrusions, and lower end side electrodes which extend from said sidewall electrodes on bottoms of the protrusions and run along said second substrate on the liquid crystal side, each of said first electrodes being made of at least a pair of sidewall electrodes formed along sides that face each other with a pixel region in between and a lower end side electrode located between the sidewall electrodes;

second electrodes made of first linear electrodes which are formed within said pixel regions on said first substrate side and run in the direction in which said first electrodes run, and second linear electrodes which are formed within said pixel regions on said second substrate side and run so as to face said first linear electrodes with said liquid crystal layer in between; and fourth electrodes formed on said first substrate and placed so as to overlap said first electrodes as viewed from above, wherein a same signal is supplied to said fourth electrodes and said second electrodes said first substrate comprises color filters for a color display, a light blocking film formed at least in a region between said color filters, and a flattening layer which is formed in a layer above said color filters and said light blocking film and flattens a surface on the liquid crystal side, and said fourth electrodes are formed in a layer closer to said liquid crystal layer than said flattening layer.

8. The liquid crystal display device according to claim 7, wherein said first linear electrodes are formed in a layer closer to said first substrate than said flattening layer.

9. A liquid crystal display device, comprising: a second substrate having scan signal lines which run in an X direction and are aligned in a Y direction and video signal lines which run in the Y direction and are aligned in the X direction; and a first substrate that is provided so as to face said second substrate with a liquid crystal layer in between, with pixel regions between said scan signal lines and between said video signal lines being arranged in a matrix, characterized in that the liquid crystal display device comprises:

protrusions formed in borders between adjacent pixels and protruding from said second substrate on the liquid crystal side;

first electrodes made of sidewall electrodes formed on sidewalls of protrusions, and lower end side electrodes which extend from said sidewall electrodes on bottoms of the protrusions and run along said second substrate on the liquid crystal side, each of said first electrodes being made of at least a pair of sidewall electrodes formed along sides that face each other with a pixel region in between and a lower end side electrode located between the sidewall electrodes;

second electrodes made of first linear electrodes which are formed within said pixel regions on said first substrate side and run in the direction in which said first electrodes run, and second linear electrodes which are formed within said pixel regions on said second substrate side and run so as to face said first linear electrodes with said liquid crystal layer in between; and fourth electrodes formed on said first substrate and placed so as to overlap said first electrodes as viewed from above, wherein a same signal is supplied to said fourth electrodes and said second electrodes, and said first linear electrodes and said fourth electrodes are formed in different layers.

10. The liquid crystal display device according to claim 9, wherein said first electrodes are made of a first conductive film in annular form around the sides of the pixels, said second linear electrodes are made of a second conductive film which is formed so as to cover the entire surface of the second substrate on the liquid crystal side, is aligned in a direction of a width of the pixels, and has two openings created so as to sandwich the second linear electrode, and said first conductive film and said second conductive film overlap along the sides of each pixel, and the region that overlaps is 1n annular form surrounding the pixel region.

11. A liquid crystal display device, comprising: a second substrate having scan signal lines which run in an X direction and are aligned in a Y direction and video signal lines which run in the Y direction and are aligned in the X direction; and a first substrate that is provided so as to face said second substrate with a liquid crystal layer in between, with pixel regions between said scan signal lines and between said video signal lines being arranged in a matrix, characterized in that the liquid crystal display device comprises:

protrusions formed in borders between adjacent pixels and protruding from said second substrate on the liquid crystal side;

first electrodes made of sidewall electrodes formed on sidewalls of protrusions, and lower end side electrodes which extend from said sidewall electrodes on bottoms of the protrusions and run along said second substrate on the liquid crystal side, each of said first electrodes being made of at least a pair of sidewall electrodes formed along sides that face each other with a pixel region in between and a lower end side electrode located between the sidewall electrodes;

second electrodes made of first linear electrodes which are formed within said pixel regions on said first substrate side and run in the direction in which said first electrodes run, and second linear electrodes which are formed within said pixel regions on said second substrate side and run so as to face said first linear electrodes with said liquid crystal layer in between; and fourth electrodes formed on said first substrate and placed so as to overlap said first electrodes as viewed from above, and a same signal is supplied to said fourth electrodes and said second electrodes, wherein said pixel regions are made of at least first pixel regions where said first electrodes and said second electrodes run in a first direction and second pixel regions where said first electrodes and said second electrodes run in a second direction.

* * * * *